United States Patent
Lange et al.

(10) Patent No.: US 10,563,498 B2
(45) Date of Patent: Feb. 18, 2020

(54) ADJUSTABLE BENT HOUSINGS WITH MEASUREMENT MECHANISMS

(71) Applicant: HALLIBURTON ENERGY SERVICES, INC., Houston, TX (US)

(72) Inventors: Gustav Lange, Millet (CA); Kennedy John Kirkhope, Leduc (CA)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 183 days.

(21) Appl. No.: 15/551,890

(22) PCT Filed: Mar. 6, 2015

(86) PCT No.: PCT/US2015/019073
§ 371 (c)(1),
(2) Date: Aug. 17, 2017

(87) PCT Pub. No.: WO2016/140688
PCT Pub. Date: Sep. 9, 2016

(65) Prior Publication Data
US 2018/0030827 A1 Feb. 1, 2018

Related U.S. Application Data

(63) Continuation of application No. PCT/US2015/018995, filed on Mar. 5, 2015, and a
(Continued)

(51) Int. Cl.
*E21B 47/02* (2006.01)
*E21B 47/024* (2006.01)
(Continued)

(52) U.S. Cl.
CPC ............ *E21B 47/024* (2013.01); *E21B 7/067* (2013.01); *E21B 23/002* (2013.01);
(Continued)

(58) Field of Classification Search
CPC .... E21B 23/002; E21B 44/005; E21B 47/024; E21B 47/022; E21B 7/067; E21B 47/122; G01B 7/30
See application file for complete search history.

(56) References Cited

U.S. PATENT DOCUMENTS 3,743,034 A * 7/1973 Bradley .................... E21B 7/06
175/61
3,903,974 A * 9/1975 Cullen .................... E21B 7/068
166/297

(Continued)

FOREIGN PATENT DOCUMENTS

EP 0287149 A2 10/1988
WO WO-9208962 A2 5/1992

OTHER PUBLICATIONS

Korean Intellectual Property Office, International Search Report and Written Opinion, PCT Application No. PCT/US2015/019073, dated Nov. 16, 2015, 15 pages, Korea.

(Continued)

*Primary Examiner* — Robert E Fuller
*Assistant Examiner* — Christopher J Sebesta

(57) ABSTRACT

Adjustable drill string housings are described for use in the directional drilling of wellbores, e.g. wellbores for hydrocarbon recovery wells. The adjustable drill string housings permit adjustment of a bend angle in the housings without removing the housings from a wellbore. In some exemplary embodiments, the bend angle can be adjusted by changing the internal stresses in a support member carried by the housings. In other embodiments, the bend angle may be adjusted by causing failure of sacrificial support members carried by the housings, and the failure may be caused by delivering chemicals through a chemical delivery system to the sacrificial support members. Methods of operating the
(Continued)

adjustable drill string housings include multi-lateral drilling operations wherein the bend angle is adjusted when a casing window has been detected.

19 Claims, 26 Drawing Sheets

Related U.S. Application Data continuation of application No. PCT/US2015/019039, filed on Mar. 5, 2015, and a continuation of application No. PCT/US2015/019070, filed on Mar. 5, 2015, and a continuation of application No. PCT/US2015/019062, filed on Mar. 5, 2015, and a continuation of application No. PCT/US2015/019051, filed on Mar. 5, 2015.

(51) Int. Cl.
*E21B 7/06* (2006.01)
*E21B 44/00* (2006.01)
*E21B 23/12* (2006.01)
*E21B 47/12* (2012.01)
*G01B 7/30* (2006.01)

(52) U.S. Cl.
CPC .......... *E21B 44/005* (2013.01); *E21B 47/122* (2013.01); *G01B 7/30* (2013.01)

(56) References Cited

U.S. PATENT DOCUMENTS

| | | |
|---|---|---|
| 4,338,723 A | 7/1982 | Benjamin |
| 4,651,436 A | 3/1987 | Gaal |
| 4,932,482 A | 6/1990 | DeLucia |
| 5,048,621 A | 9/1991 | Bailey et al. |
| 5,117,927 A | 6/1992 | Askew |
| 5,139,094 A | 8/1992 | Prevedel et al. |
| 5,445,230 A | 8/1995 | Wattenburg et al. |
| 6,158,529 A | 12/2000 | Dorel |
| 6,158,533 A | 12/2000 | Gillis et al. |
| 6,394,193 B1 | 5/2002 | Askew |
| 6,799,646 B1 | 10/2004 | Daigle et al. |
| 6,843,332 B2 | 1/2005 | Eppink et al. |
| 7,882,904 B2 | 2/2011 | von Gynz-Rekowski et al. |
| 7,909,117 B2 | 3/2011 | Van Steenwyk et al. |
| 8,302,705 B2 | 11/2012 | Downton |
| 8,360,172 B2 | 1/2013 | Santelmann |
| 8,434,567 B2 | 5/2013 | Menezes et al. |
| 2005/0150692 A1 | 7/2005 | Ballantyne et al. |
| 2006/0169495 A1 | 8/2006 | Kolle |
| 2007/0163810 A1 | 7/2007 | Underwood et al. |
| 2008/0034856 A1* | 2/2008 | Van Steenwyk ........ E21B 7/067 73/152.46 |
| 2009/0032302 A1* | 2/2009 | Downton ................ E21B 7/067 175/38 |
| 2010/0032212 A1* | 2/2010 | Van Steenwyk ........ E21B 7/067 175/61 |
| 2010/0065143 A1 | 3/2010 | Johnson |
| 2011/0100716 A1* | 5/2011 | Shepherd .......... A61F 13/15747 175/73 |
| 2012/0013339 A1 | 1/2012 | Kuckes |
| 2012/0160567 A1 | 6/2012 | Belew et al. |
| 2014/0131106 A1 | 5/2014 | Coull et al. |
| 2014/0174831 A1 | 6/2014 | Sitka |
| 2014/0284103 A1* | 9/2014 | Niina ..................... E21B 47/00 175/24 |

OTHER PUBLICATIONS

Korean Intellectual Property Office, International Search Report and Written Opinion, PCT Application No. PCT/US2015/018995, dated Nov. 11, 2015, 11 pages, Korea.

Korean Intellectual Property Office, International Search Report and Written Opinion, PCT Application No. PCT/US2015/019039, dated Nov. 10, 2015, 11 pages, Korea.

Korean Intellectual Property Office, International Search Report and Written Opinion, PCT Application No. PCT/US2015/019070, dated Nov. 11, 2015, 10 pages, Korea.

Korean Intellectual Property Office, International Search Report and Written Opinion, PCT Application No. PCT/US2015/019062, dated Nov. 11, 2015, 11 pages, Korea.

Korean Intellectual Property Office, International Search Report and Written Opinion, PCT Application No. PCT/US2015/019051, dated Nov. 13, 2015, 12 pages, Korea.

\* cited by examiner

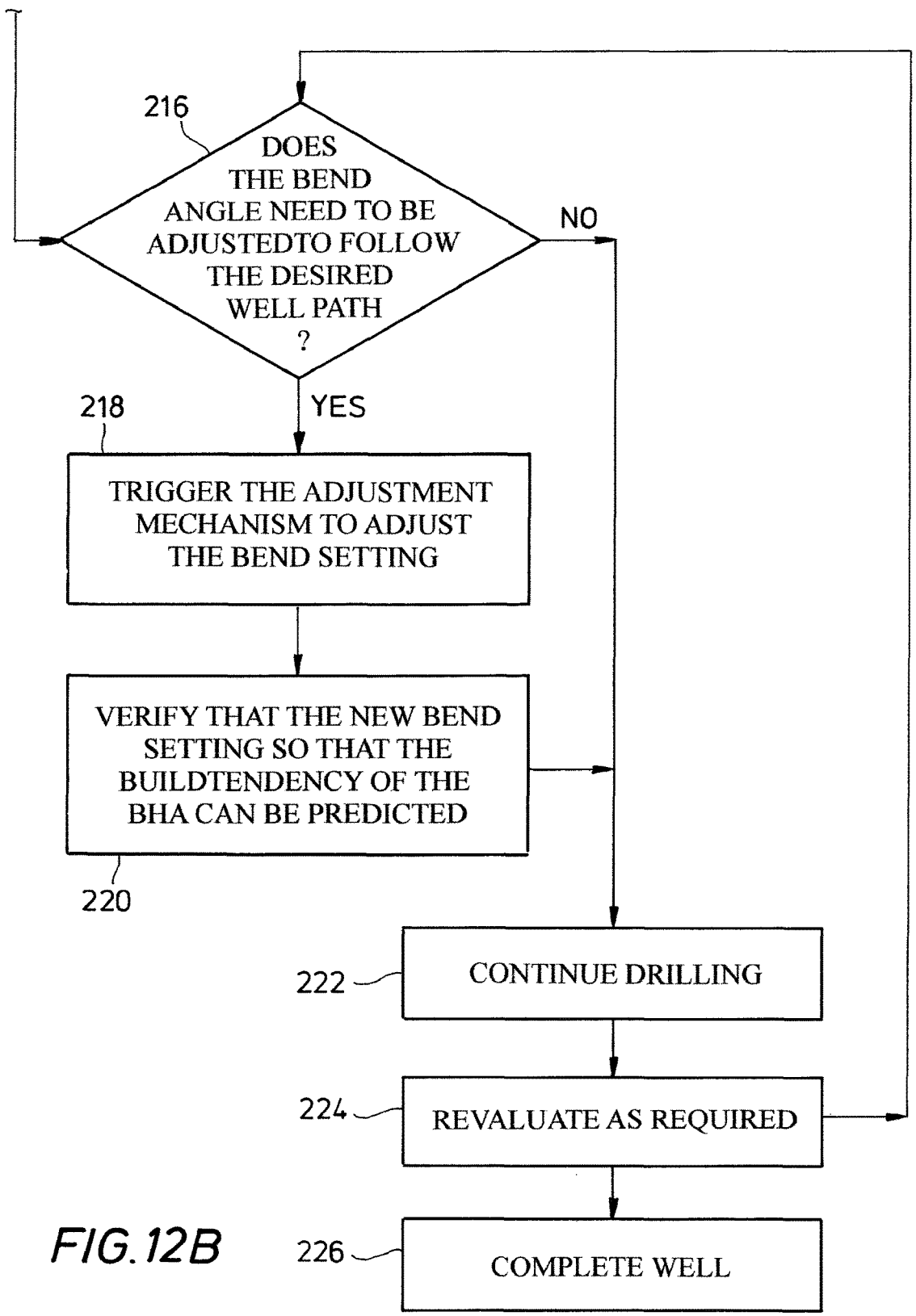

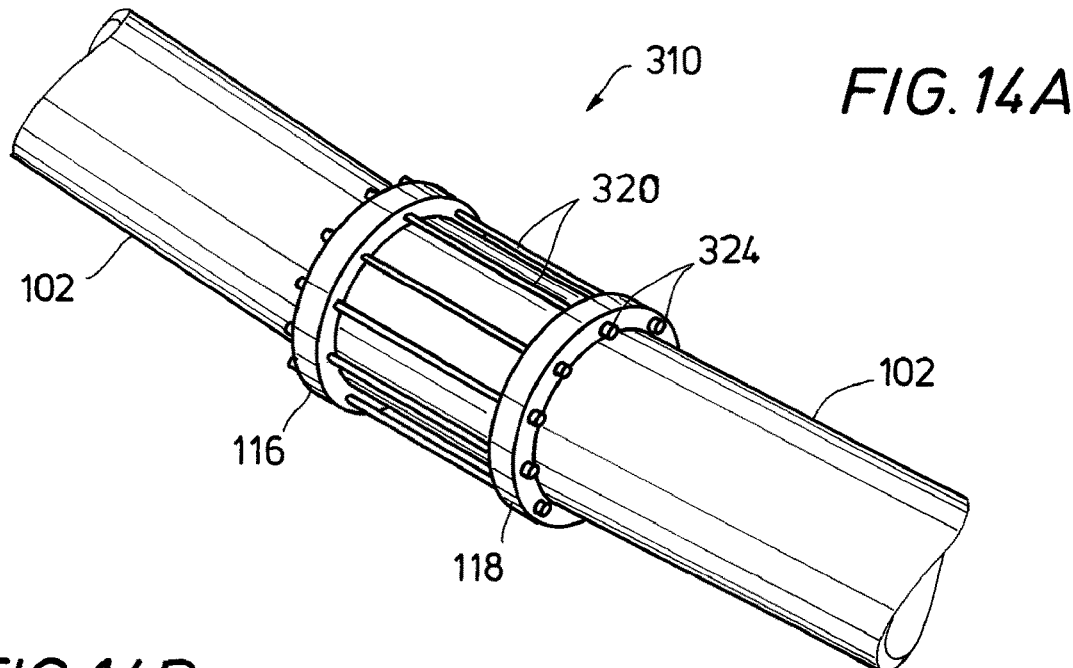
FIG. 14A
FIG. 14B
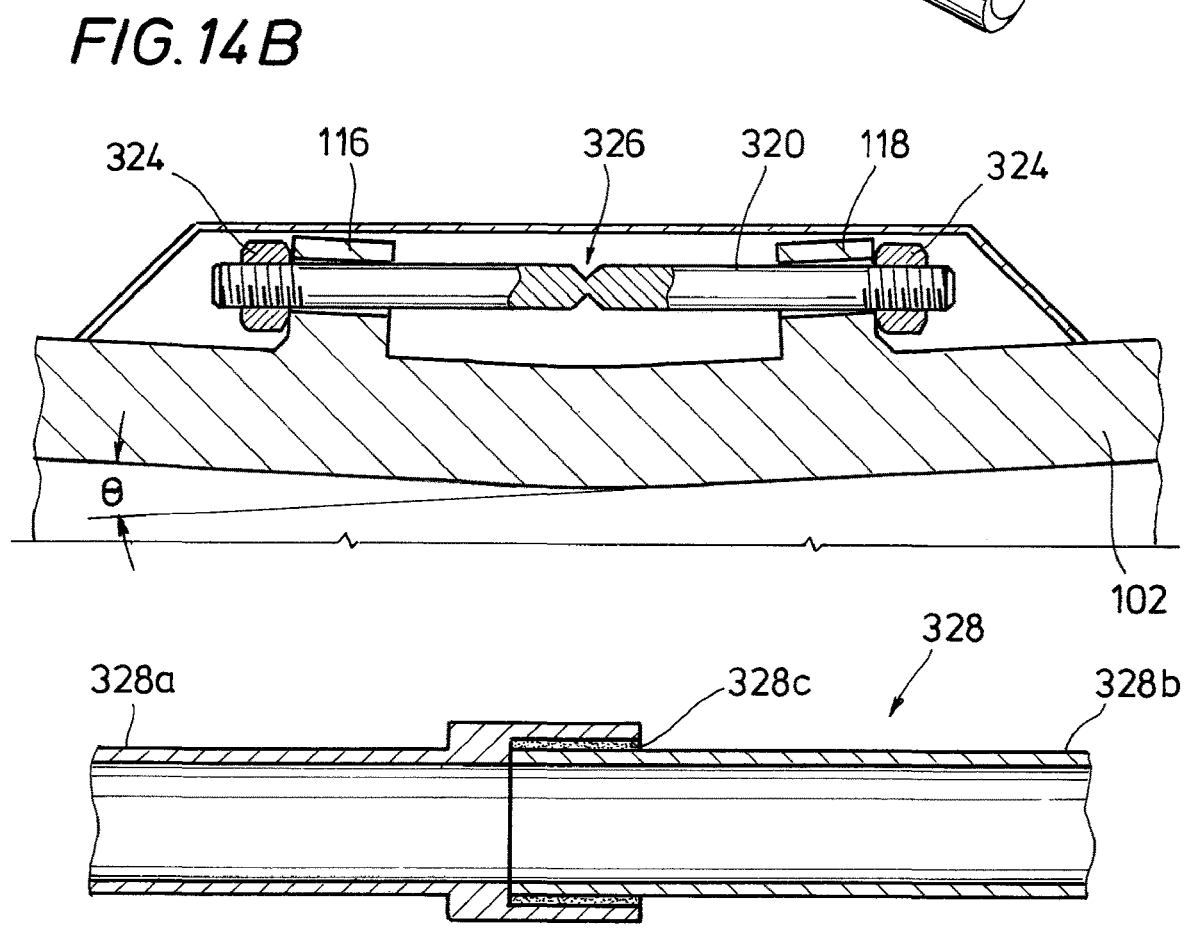
FIG. 15

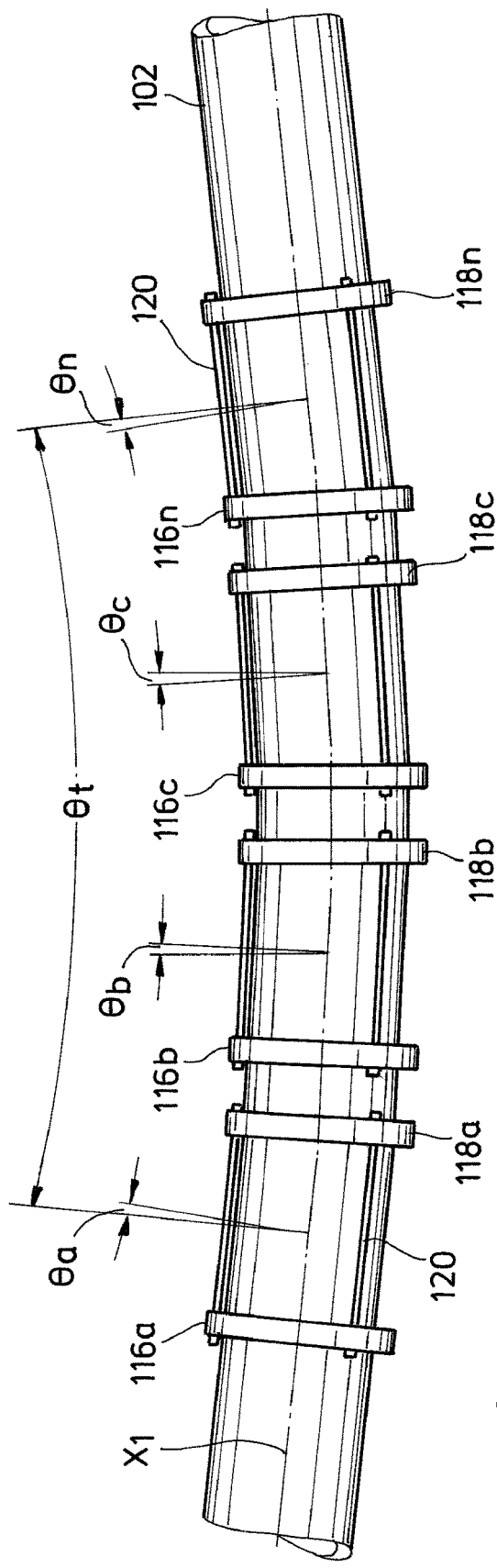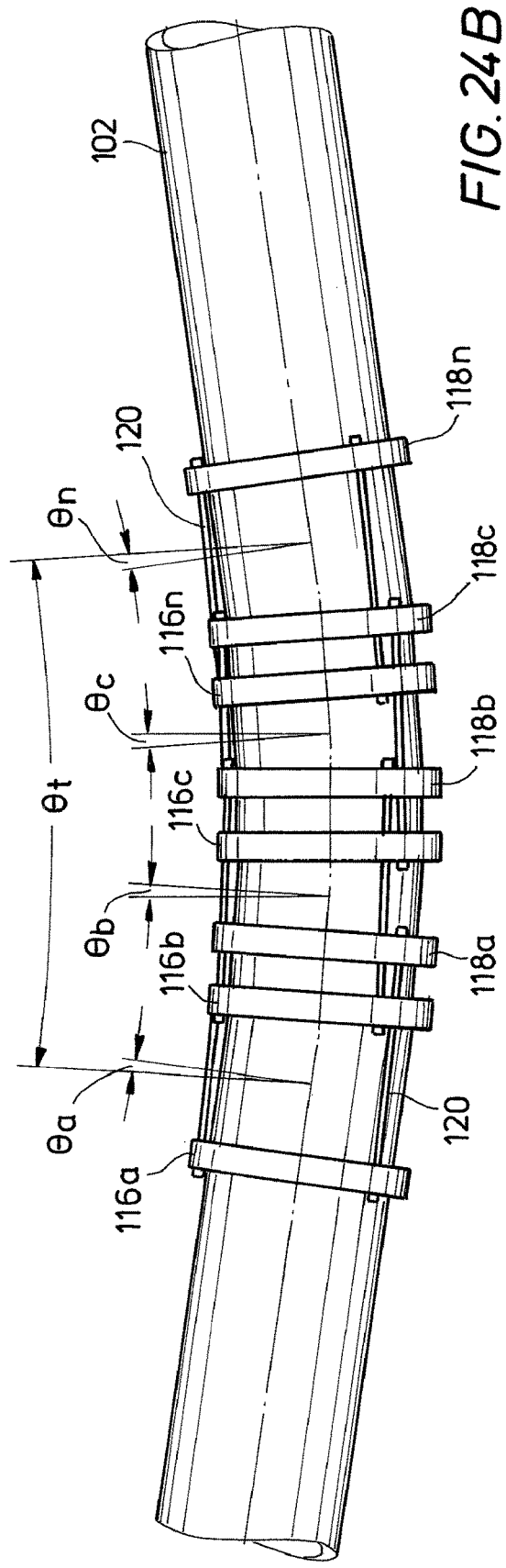

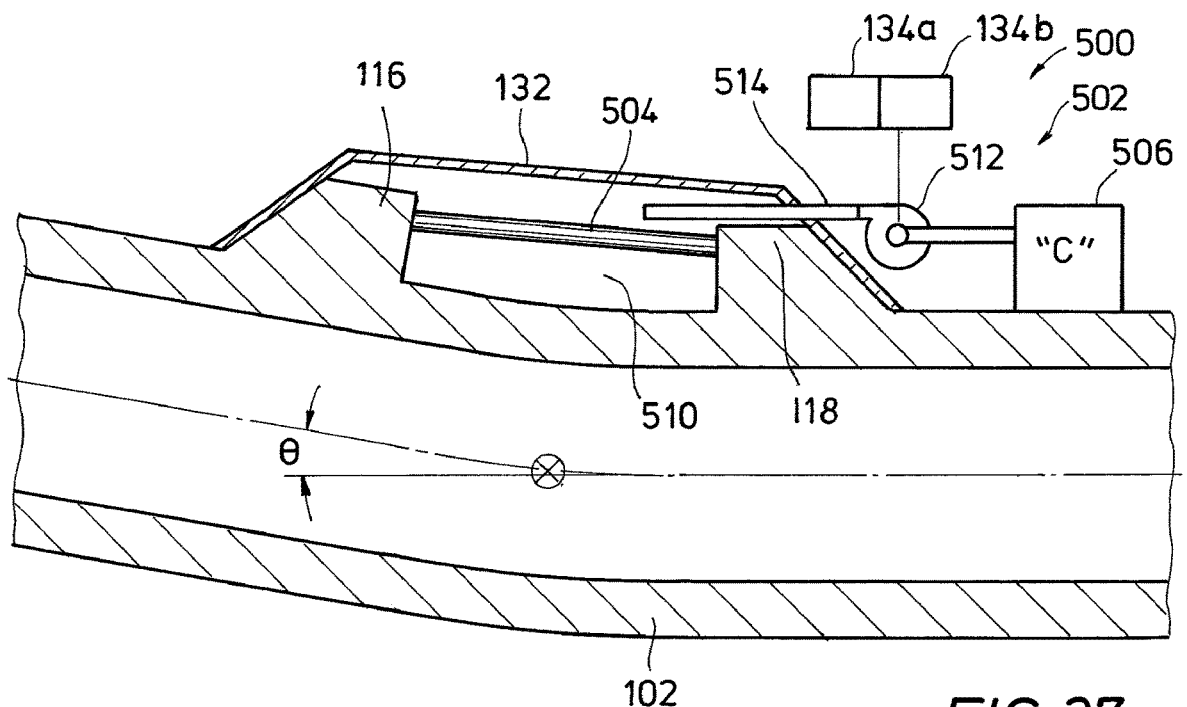
FIG. 27
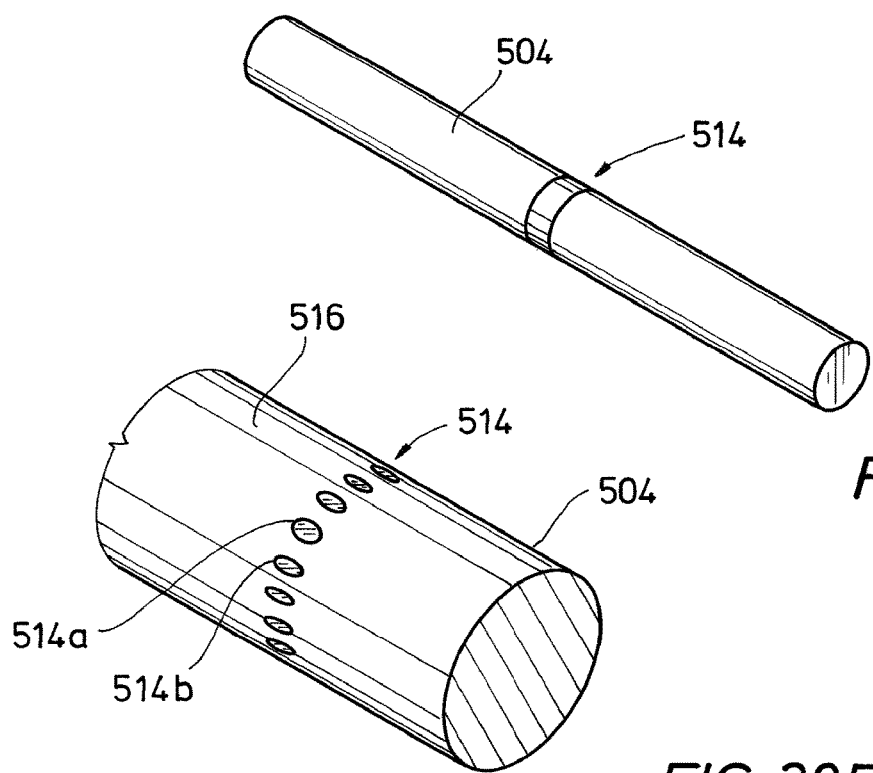
FIG. 28A
FIG. 28B

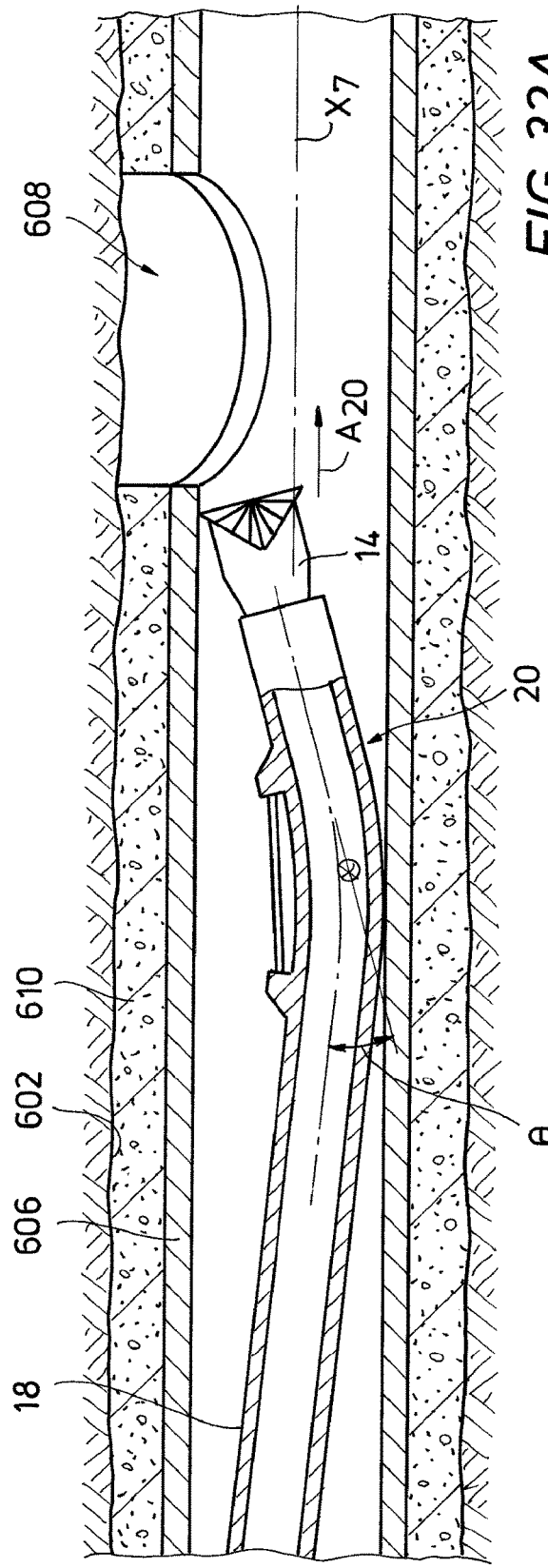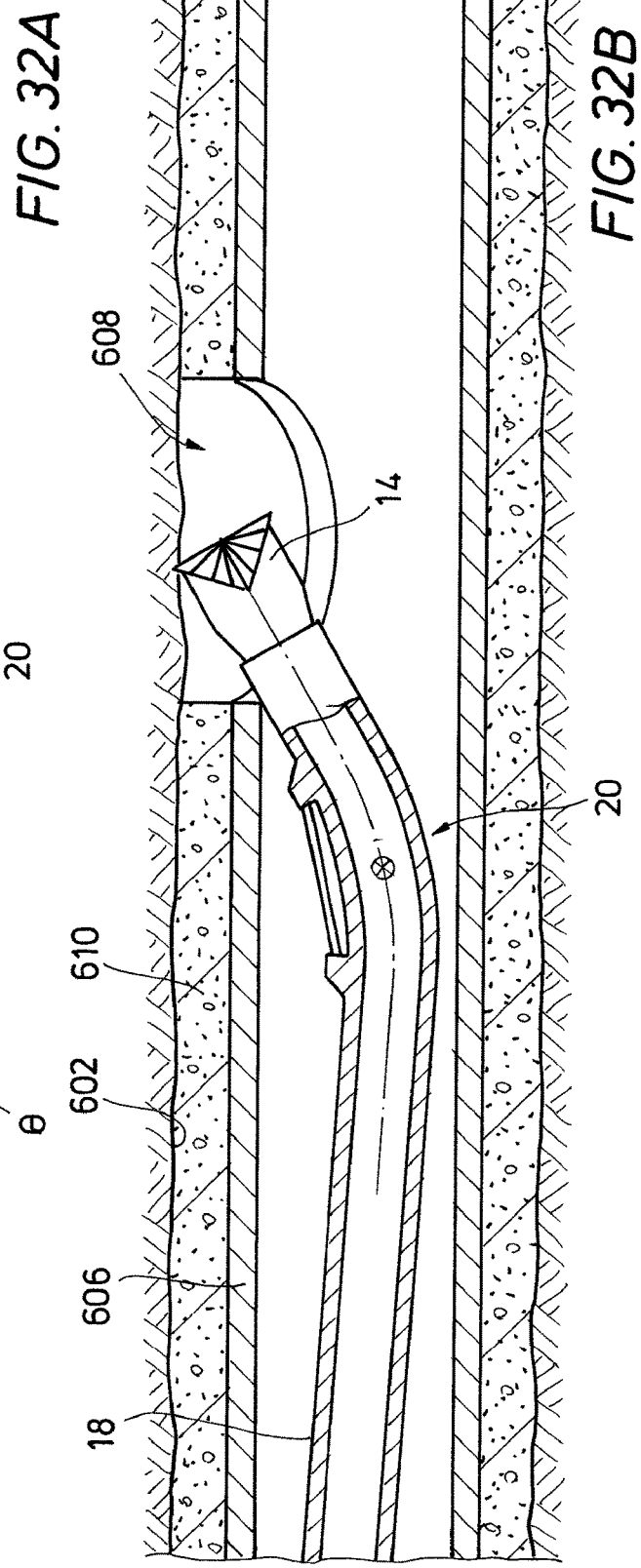

ADJUSTABLE BENT HOUSINGS WITH MEASUREMENT MECHANISMS

CROSS-REFERENCE TO RELATED APPLICATIONS

This application is a U.S. national stage patent application of International Patent Application No. PCT/US2015/019073, filed on Mar. 6, 2015, which claims priority to each of the International Patent Applications including PCT/US2015/019051; PCT/US2015/019062; PCT/US2015/019070; PCT/US2015/019039 and PCT/US2015/018995, which were filed on Mar. 5, 2015. The benefit of each of the applications above is claimed and the disclosure of each is incorporated herein by reference in its entirety.

BACKGROUND

1. Field of the Invention

The present disclosure relates generally to directional drilling, e.g., directional drilling for hydrocarbon recovery wells. More particularly, embodiments of the disclosure relate to systems, tools and methods employing an adjustable bent housing for controlling the direction in which a drilling bit cuts a wellbore.

2. Background Art

Directional drilling operations involve controlling the direction of a wellbore as it is being drilled. The direction of a wellbore refers to both its inclination relative to vertical, and its azimuth or angle from true north or magnetic north. Usually the goal of directional drilling is to reach a target subterranean destination with a drill string. It is often necessary to adjust a direction of the drill string while directional drilling, either to accommodate a planned change in direction or to compensate for unintended and unwanted deflection of the wellbore. Unwanted deflection may result from a variety bottom hole assembly (BHA) and the techniques with which the wellbore is being drilled.

Some directional drilling techniques involve rotating a drill bit with a positive displacement motor (mud motor) and a bent housing included in the BHA. The BHA can be connected to a drill string or drill pipe extending from a surface location, and the mud motor can be powered by circulation of a fluid or "mud" supplied through the drill string. The BHA can be steered by sliding, e.g., operating the mud motor to rotate the drill bit without rotating the bent housing in the BHA. With the bend in the bent housing oriented in a specific direction, continued drilling causes a change in the wellbore direction.

When an adjustment in a drilling angle is necessary, the entire drill string may be removed from the wellbore in order to replace the bent housing with another bent housing that defines a different bend angle. In other instances, an adjustable bent housing may be provided that permits an adjustment to over a range of bend angles once the drill string is removed from the wellbore. It should be appreciated that removing the drill string to replace the bent housing or to adjust the bend angle can be expensive and time consuming.

BRIEF DESCRIPTION OF THE DRAWINGS

The disclosure is described in detail hereinafter on the basis of embodiments represented in the accompanying figures, in which:

FIGS. 12A and 12B are a flowchart illustrating an operational procedure for forming an adjustable drill string housing and operating the adjustable drill string housing in a directional drilling operation in accordance with example embodiments of the disclosure;

FIG. 14A is a schematic perspective view of a bent housing including a plurality of sacrificial support members supported between upper and lower flanges in accordance with other exemplary embodiments of the disclosure;

FIG. 14B is of a schematic cross-sectional view of one of the sacrificial support members of FIG. 14A;

FIG. 15 is a schematic cross-sectional view of a two-piece support member having a sacrificial connection mechanism in accordance with other exemplary embodiments of the disclosure;

FIGS. 24A and 24B are side-views of adjustment mechanisms including longitudinally spaced support members in accordance with exemplary embodiments of the disclosure;

FIG. 27 is a cross-sectional schematic side-view of a bent housing including an energy delivery system operable to transfer energy from a remote location to a support member for triggering an adjustment in a bend angle of the bent housing according with example embodiments of the present disclosure;

FIGS. 28A and 28B are partial perspective views of support members illustrating target areas thereon for receiving energy from the energy delivery system of FIG. 27;

FIGS. 32A through 32C are cross-sectional schematic side-views of a drill string illustrating a procedure for altering a bend angle of a drill string housing upon detection of a lateral casing window in accordance with exemplary embodiments of the disclosure.

DETAILED DESCRIPTION

Figure 1:
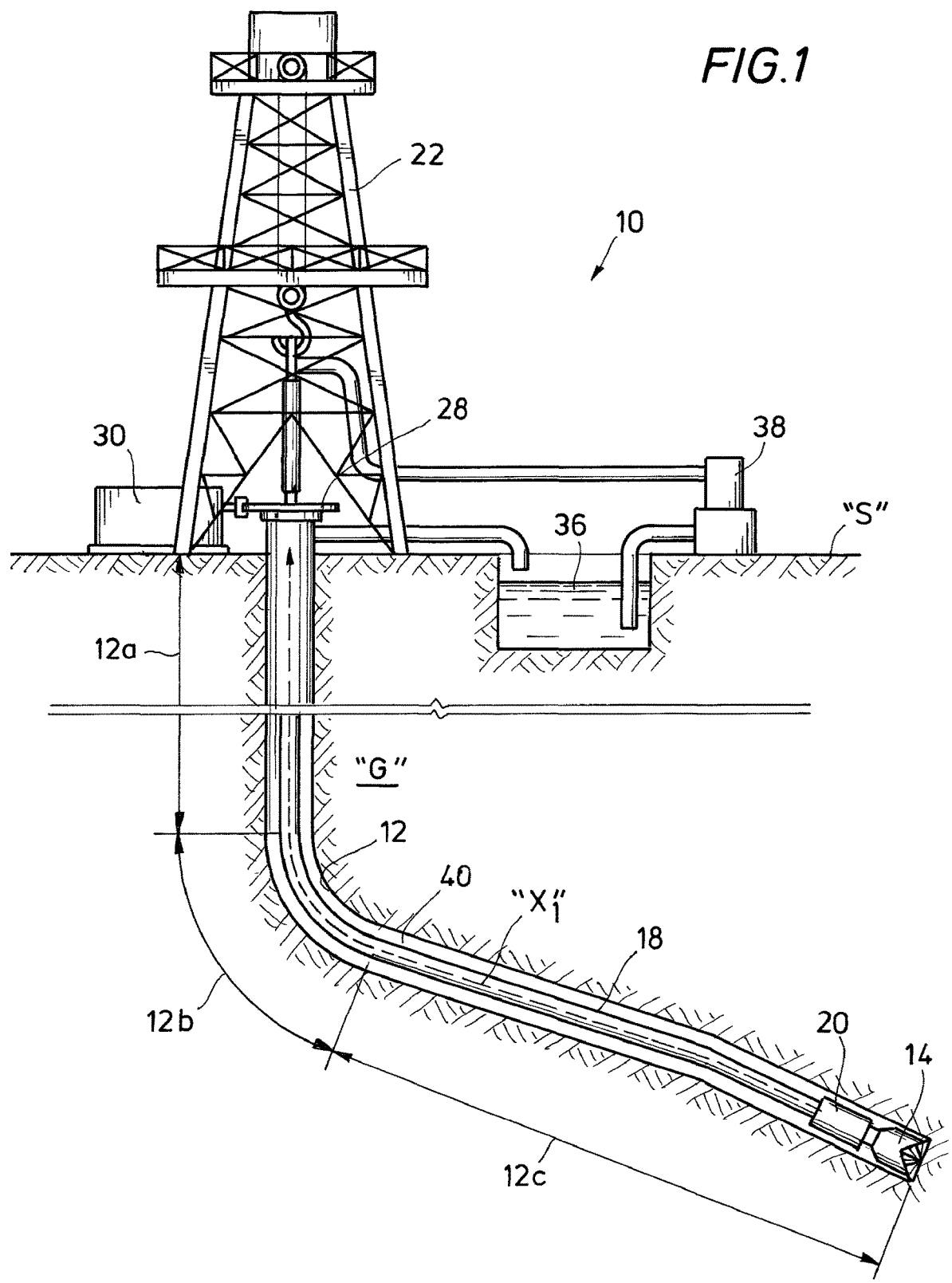
FIG. 1 is a cross-sectional schematic side-view of a directional wellbore drilled with a BHA in accordance with example embodiments of the disclosure.

In the interest of clarity, not all features of an actual implementation or method are described in this specification. Also, the "exemplary" embodiments described herein refer to examples of the present invention. In the development of any such actual embodiment, numerous implementation-specific decisions may be made to achieve specific goals, which may vary from one implementation to another. Such would nevertheless be a routine undertaking for those of ordinary skill in the art having the benefit of this disclosure. Further aspects and advantages of the various embodiments and related methods of the invention will become apparent from consideration of the following description and drawings.

The present disclosure may repeat reference numerals and/or letters in the various examples. This repetition is for the purpose of simplicity and clarity and does not in itself dictate a relationship between the various embodiments and/or configurations discussed. Further, spatially relative terms, such as "below," "lower," "above," "upper," "up-hole," "down-hole," "upstream," "downstream," and the like, may be used herein for ease of description to describe one element or feature's relationship to another element(s) or feature(s) as illustrated in the figures. The spatially relative terms are intended to encompass different orientations of the apparatus in use or operation in addition to the orientation depicted in the figures.

FIG. 1 illustrates a drilling system 10 for drilling a directional wellbore 12 in accordance with example embodiments of the disclosure. The wellbore 12 extends from a surface location "S" through a geologic formation "G" along a curved longitudinal axis $X_1$ to define a vertical section 12a, a build section 12b and a tangent section 12c. The tangent section 12c is the deepest section of the wellbore 12, and generally exhibits lower build rates (changes in the inclination of the wellbore 12) than the build section 12b.

A rotary drill bit 14 is provided at a down-hole location in the wellbore 12 (illustrated in the tangent section 12c) for cutting into the geologic formation "G." A drill string 18 extends between the drill bit 14 and the surface location "S," and in some exemplary embodiments, a bottom hole assembly (BHA) 20 is provided within the drill string 18 proximate the drill bit 14. The BHA 20 can be operable to rotate the drill bit 14 with respect to the drill string 18. The term "bottom hole assembly" or "BHA" may be used in this disclosure to describe various components and assemblies disposed proximate to the drill bit 14 at the down-hole end of drill string 18. Examples of components and assemblies (not expressly illustrated in FIG. 1) which may be included in the BHA 20 include, but are not limited to, a bent sub or housing, a mud motor, a near bit reamer, stabilizers, and other down hole instruments. Various types of well logging tools (not expressly shown) and other down-hole instruments associated with directional drilling of a wellbore 12 may also be included.

At a surface location "S" a drilling rig 22 is provided to facilitate drilling of the wellbore 12. The drilling rig 22 includes a turntable 28 that rotates the drill string 18 and the drill bit 14 together about the longitudinal axis $X_1$. The turntable 28 is selectively driven by an engine 30, and can be locked to prohibit rotation of the drill string 18. To rotate the drill bit 14 with respect to the drill string 18, mud 36 can be circulated down-hole by mud pump 38. The mud 36 is pumped through the drill string 18 and passed through a mud motor (not expressly illustrated in FIG. 1) in the BHA to turn the drill bit 14. The mud 36 can be expelled through openings (not shown) in the drill bit 14 to lubricate the drill bit 14, and then returned to the surface location through an annulus 40 defined between the drill string and the geologic formation "G."

Figure 2:
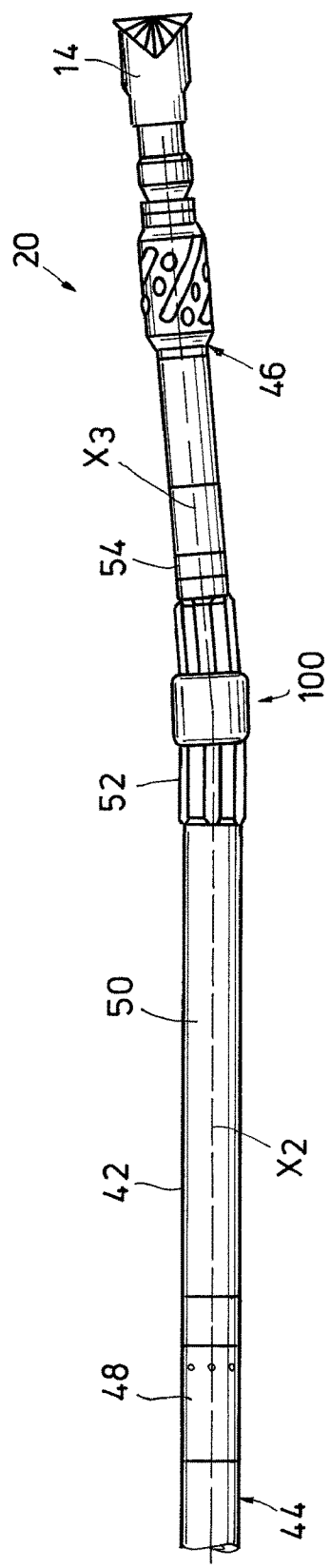
FIG. 2 is a schematic drawing of the BHA of FIG. 1 having a bent housing including an adjustment mechanism for controlling a bend angle of the bent housing in accordance with example embodiments of the disclosure.

Referring now to FIG. 2, the BHA 20 includes a housing 42 defining an upper end 44 and a lower end 46. The main function of the housing 42 is to contain and protect the various components of the BHA 20. The upper end 44 of the housing 42 is threaded to permit coupling the BHA 20 to the drill string 18 (FIG. 1). Below the upper end 44 of the housing, a dump sub 48 is optionally provided in the BHA 20 to permit fluid flow between the drill string 18 (FIG. 1) and the annulus 40 (FIG. 1) in certain conditions when the BHA 20 is down-hole. A power unit 50 is provided below the dump sub 48 for generating rotational motion. In one or more exemplary embodiments, the power unit 50 comprises a progressive cavity positive displacement pump, which converts hydraulic energy into mechanical energy in the form of a rotating rotor (not shown) disposed therein. In some embodiments, the rotor can be induced to rotate eccentrically about an upper longitudinal axis $X_2$ by circulating mud 36 through the power unit 50. In other embodiments, other types of down-hole motors, including electric motors, may be provided in the power unit 50 to provide the rotational energy. A transmission unit 52 is coupled to a lower end of the power unit 50 for transmitting rotational motion down-hole. In some embodiments, the transmission unit 52 may include a flexible drive shaft (see, e.g., constant velocity shaft 140 in FIGS. 5 and 6), which receives eccentric rotational motion from the power unit 50, and transmits concentric rotational motion (about longitudinal axis $X_3$) to a bearing assembly 54 coupled below the power unit 50. The rotational motion generated in the power unit 50 can thus be transmitted to the drill bit 14 through the transmission unit 52 and the bearing assembly 54. In the illustrated embodiment, a bent housing 100 couples the power unit 50 and transmission unit 52.

Although the terms "bent housings" and "bent subs" are sometimes used synonymously, a "sub" is typically a bent section installed in the drill string 18 above the power unit used in the directional drilling of well bores. A "housing", on the other hand, is generally interconnected between the power unit 50 and the bearing assembly 54, and, in addition to providing an angular offset, also accommodates the drive shaft connecting the power unit 50 to the bearing assembly 54. Although aspects of the present disclosure are described in terms of an adjustable drill housing or bent housing 100, it should be appreciated that aspects of the disclosure may be practiced in a bent sub as well. The bent housing 100 defines a bend angle θ (see FIG. 3) between the longitudinal axis $X_2$ of the portions of the BHA 20 above the bent housing 100 and a longitudinal axis $X_3$ of the portions of the BHA 20 below the bent housing 100. In some example embodiments, one or more of the other components of the BHA 20 described above also comprises a bent housing, 100.

Bent Housing with Adjustment Mechanisms

Figure 3:
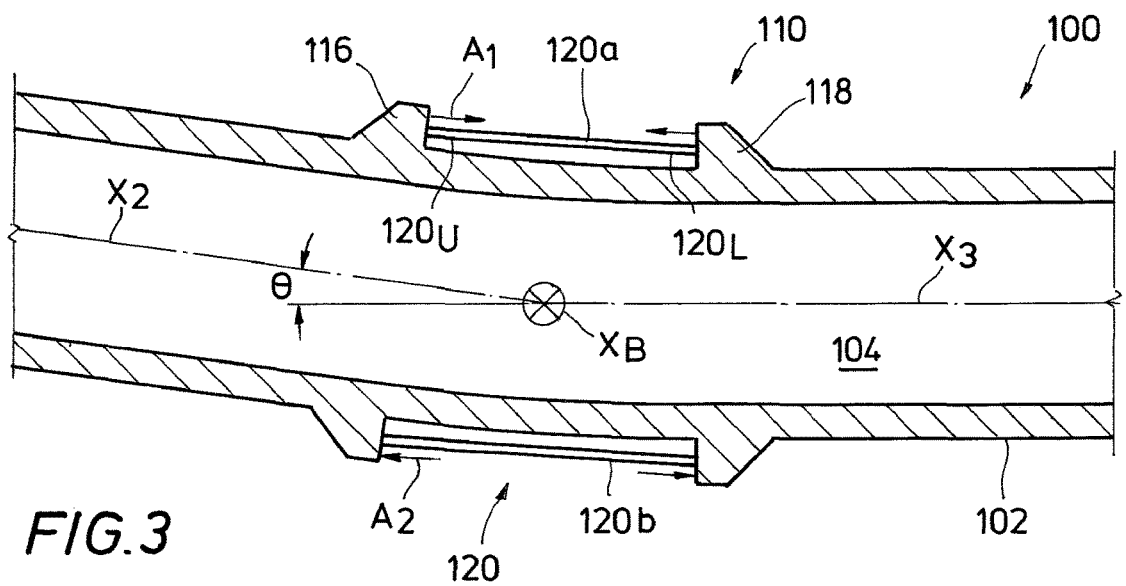
FIG. 3 is a cross-sectional schematic view of the bent housing of FIG. 2 illustrating a plurality of support members of the adjustment mechanism.

Referring to FIG. 3, bent housing 100 includes an annular member 102 and an internal passageway 104 extending therethrough. In some embodiments, the annular member 102 is prefabricated in a bent configuration either by physical bending or by a machining operation to create an angular offset. In some exemplary embodiments, the annular member 102 is constructed monolithically, e.g., from a single continuous piece of material, and in some other exemplary embodiments, the annular member 102 may be constructed of two or more bodies coupled to one another by threaded connectors, welding, or other coupling mechanisms to define upper and lower ends 102a, 102b of the annular member 102. An angle θ may thereby be defined between the upper and lower longitudinal axes $X_2$ and $X_3$, which extend thorough upper and lower ends 102a, 102b of the annular member 102, respectively. An initial bend angle $\theta_0$ in the range of about 0° to about 6° may be defined by the annular member 102 by the prefabrication process, although other initial bend angles $\theta_0$ are contemplated within the scope of the present disclosure.

An adjustment mechanism 110 is provided for adjusting the bend angle θ. The bent housing 100 may be referred to as "down-hole adjustable" since the adjustment mechanism 110 is operable to adjust the bend angle θ while the bent housing 100 is in the wellbore 12 (FIG. 1) without requiring that the bent housing 100 be withdrawn to the surface location "S." The bent housing 100 is therefore distinguishable from "surface adjustable" bent housings, which are generally adjusted prior to insertion into the wellbore 12 and remain fixed until withdrawn and readjusted. As one skilled in the art will recognize, various aspects of the present disclosure may be practiced in connection with down-hole adjustable bent housings, with surface adjustable bent housings, and/or both down-hole adjustable and surface adjustable bent housings. A bend axis $X_B$ is defined through the intersection of the axes $X_2$ and $X_3$ and extends perpendicularly to longitudinal axes $X_2$ and $X_3$. The bend axis $X_8$ defines a longitudinal location of the angular offset in the bent housing 100.

In some exemplary embodiments, an upper flange 116 extends radially outward from the annular member 102 at an up-hole location with respect to the bend axis $X_B$. Similarly, a lower flange 118 extends from the annular member 102 at a down-hole location with respect to the bend axis $X_B$. The upper and lower flanges 116, 118 can be formed integrally with the material of the annular member 102 or coupled thereto by fasteners, welding or other recognized construction methods. In some example embodiments, the annular flanges 116, 118 can extend radially around the entire annular wall 102, and in some example embodiments, the flanges 116, 118 can be radially segmented such that the flanges 116, 118 protrude from the annular member 102 only at the radial location where support members 120 are disposed. Support members 120 (designated in FIG. 3 as 120a and 120b) extend between the upper and lower flanges 116, 118, and upper and lower ends $120_U$ and $120_L$ of the support members 120 are respectively supported thereby. Internal stresses can be selectively and adjustably imparted to the support members 120 to alter the bend angle θ. For example, the bend angle θ can be decreased by imparting a tensile stress in an interior-angle support member 120a and/or a compressive stress can be imparted to an exterior-angle support member 120b. The tensile forces in the interior-angle support member 120a urge flanges 116, 118 toward one another in the direction of arrows $A_1$, and the compressive forces urge flanges 116, 118 away from one another on a radially opposite side of the annular member 102 in the direction of arrows $A_2$. The flanges 116, 118 are operable to transmit the internal stresses from the support members 120 to the annular member 102 to thereby alter the bend angle θ. The bend angle θ may similarly be decreased by imparting a tensile stress in the exterior-angle support member 120b and/or a compressive stress in the interior-angle support member 120a.

The support members 120 may exhibit various geometries in various exemplary embodiments. For example the support members 120 may comprise threaded rods, solid cylinders, and hollow tubes. The support members 120 may include round or polygonal cross-sections, and may be generally curved or straight in a longitudinal direction.

Figure 4:
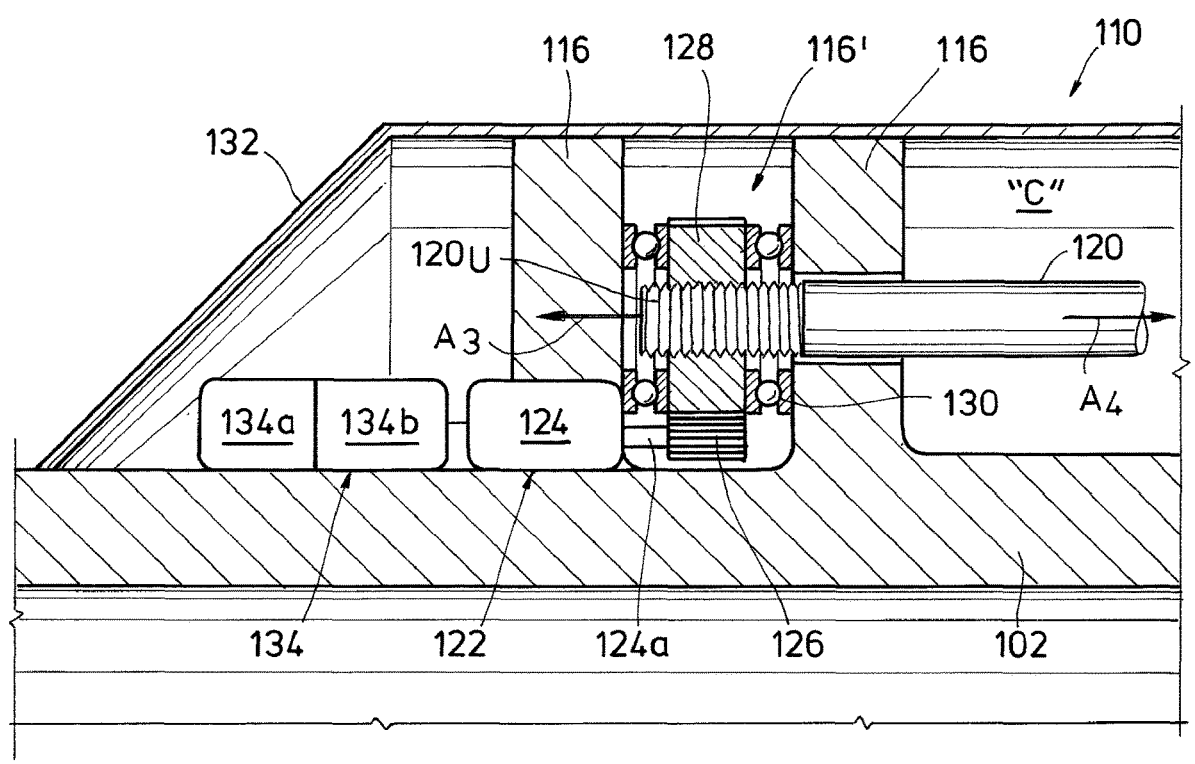
FIG. 4 is a cross-sectional schematic view of an electro-mechanical actuator for the adjustment mechanism of FIG. 3.

Referring to FIG. 4, adjustment mechanism 110 further includes at least one actuator 122 for selectively imparting internal stresses to support the members 120. In some embodiments, the actuator 122 comprises an electric motor 124 operably coupled to the support member 120 by a drive gear 126, and a torque nut 128. The drive gear 126 may be fastened to a shaft 124a of the electric motor 124, and may be induced to rotate therewith in response to activation of the electric motor 124. An outer diameter of the torque nut 128 engages the drive gear 124 such that rotational motion may be communicated between the drive gear 124 and the torque nut 128. Rotational motion of the torque nut 128 with respect to the upper flange 116 is supported by a pair of thrust bearings 130 disposed on opposite sides to the torque nut 128 and within a recess 116' defined within the upper flange 116. An inner diameter of the torque nut 128 is threaded onto the upper end 120u of the support member 120 such that rotational motion of the torque nut 128 induces generally longitudinal motion of the support member 120 with respect to the upper flange 116. Thus, the electric motor 124 may be activated to drive the upper end $120_U$ of the support member 120 in the longitudinal directions of arrows $A_3$ and $A_4$ with respect to the upper flange 116. The lower end $120_L$ (FIG. 3) of the support member 120 may be fixedly fastened to the lower flange 118 (FIG. 3) such that the longitudinal movement of the upper end $120_U$ of the support member 120 imparts tensile or compressive stresses to the support member 120, and thereby alters the bend angle θ (FIG. 3).

In some exemplary embodiments, a protective cover 132 may be provided over the adjustment mechanism 110. The protective cover 132 can be attached to the annular member 102 and/or the upper and lower flanges 116, 118 in a manner that is permits the upper and lower flanges 116, 118 to move toward and away from one another as the bend angle θ is adjusted. Together with the annular member 102, the protective cover 132 may define a sealed chamber in which a lubricant, insulating fluid, or other specialized chemical solution "C" may be maintained. The chemical solution "C" may be an anti-corrosive of other fluid selected to prevent premature failure of the support member 120. In some embodiments, the specialized chemical solution "C" may comprise an electrolyte fluid "E" (FIG. 16A) to facilitate failure of a support member 332 (FIG. 16A) as described below. In some embodiments, the protective cover 132 may act as a stabilizer or offset pad that engages the geologic formation "G" (FIG. 1).

Analyses have been performed to determine characteristics associated with altering the bend angle θ with the adjustment mechanism 110. A simulated tensile load of 100,000 lbs. was applied between the upper and lower flanges 116 and 118 of a mathematical model of the annular member 102. The simulated load was applied at a radial distance of 2.5 inches from the axes $X_2$ and $X_3$, thus simulating a tensile load in an interior-angle support member 120a. A change in the bend angle θ of 0.4° was observed in the model. To achieve a 0.4° change in the bend angle θ, an electric motor 124 can be selected that is capable of producing 500 in-lbs. of torque or more. A gear ratio of 12:1 between the torque nut 128 and the drive gear 126 was determined to permit the electric motor 124 to generate sufficient stress in the interior-angle support member 120a.

To achieve the same 0.4° change in the bend angle θ, complimentary tensile and compressive loads of 50,000 lbs. were simulated in support members 120 disposed on opposing radial sides of the annular member. The simulated support members 120 were supported between upper and lower flanges 116 and 118 at the radial positions of the interior-angle support member 120a and the exterior-angle support member 120b. It was determined that a motor capable of generating approximately 225 in-lbs. of torque could produce the 50,000 lbs. compressive and tensile loads.

In some exemplary embodiments, the actuator 122 is remotely operable from the surface location "S" (FIG. 1). The actuator 122 may include a control unit 134 having a communication unit 134a, and a controller 134b. The communication unit 134a may facilitate communication between the actuator 122 and the surface location "S" or other down-hole components. The communication unit 134a can provide a bi-directional telemetry system employing any combination of wired or wireless communication technologies. In some embodiments, the communication unit 134a can produce a short hop EM signal that can be communicated within the wellbore 12 (FIG. 1) across the power unit 50 (FIG. 2), to a mud pulser (not shown) or similar tool for may transmit the signal to the surface location "S." In some embodiments, the communication unit 134a can include a switch (not shown) that is responsive to objects dropped from the surface location "S" such as balls, darts, RFID tags, etc. to trigger operation of the electric motor 124. In other embodiments, the communication unit 134a can receive signals from sensors or other feedback devices (not shown) disposed in the wellbore 12 (FIG. 1). The signals may be representative of down-hole parameters such as temperature or pressure in the wellbore 12 (FIG. 1). The electric motor 124 may then be triggered when the down-hole parameters are determined to be within a predetermined range.

The actuator 122 may also include controller 134b operably coupled to the electric motor 124 and the communication unit 134a. In some embodiments, the controller 134b may include a processor 134a and a computer readable medium 134b operably coupled thereto. The computer readable medium 64b can include a nonvolatile or non-transitory memory with data and instructions that are accessible to the processor 134a and executable thereby. In one or more embodiments, the computer readable medium 134b is preprogrammed with predetermined triggers for actuating or deactivating the electric motor 124, and may also be preprogrammed with predetermined sequences of instructions for operating the electric motor 124 in response to triggers received by the communication unit.

Figure 5:
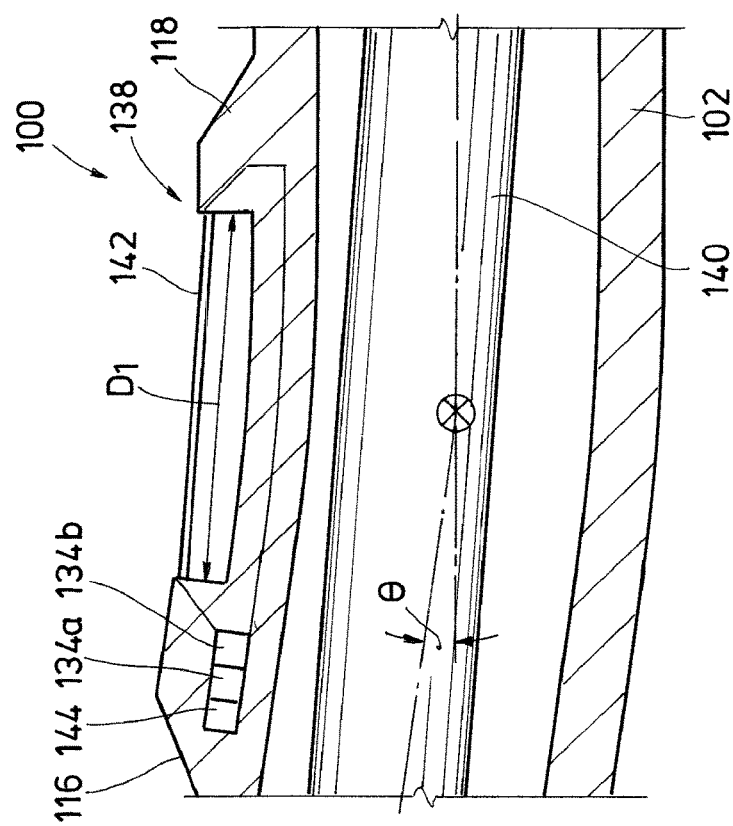
FIG. 5 is a cross-sectional schematic view of another bent housing having an externally disposed measurement mechanism for measuring the bend angle of the bent housing in accordance with example embodiments of the disclosure.

Referring now to FIG. 5, exemplary embodiments of a measurement mechanism 138 for measuring the bend angle θ of the bent housing 100 are illustrated. In some exemplary embodiments, the measurement mechanism 138 operates independently of adjustment mechanism 110 (FIG. 4) to measure a physical characteristic of the bent housing 100. The annular member 102 of the bent housing 100 is illustrated with a constant velocity (CV) shaft 140 extending therethrough. A feedback device 142 is supported between the upper and lower flanges 116, 118 and is operable to provide a signal from which the bend angle θ is determinable or estimable. In one or more exemplary embodiments, the feedback device 142 is operable to provide a signal representative of a longitudinal distance $D_1$, or a change in the longitudinal distance $D_1$, between the upper and lower flanges 116, 118, or a change in a longitudinal length of the support members 120 (FIG. 4). For example, in some exemplary embodiments, the feedback device 142 can comprise a potentiometer or a linear variable differential transformer (LVDT). In some embodiments, feedback devices 142 may be incorporated into one or more of the support members 120 (FIG. 4), or feedback devices 142 may be provided independently of the support members 120 (FIG. 4). Since a change in the bend angle θ is associated with a corresponding change in the longitudinal distance $D_1$, the bend angle θ may be determined from the signal provided by the feedback device 142.

In some exemplary embodiments, the feedback device 142 can be electrically coupled in an electrical circuit that includes the communication unit 134a, controller 134b (FIG. 4) and a power source 144. In some embodiments, power source 144 may comprise a battery, or a self-contained turbine operable to generate electricity responsive to the flow of wellbore fluids therethrough. In some embodiments, power source 144 comprises a connection with the surface location "S," e.g., an electric or hydraulic connection to the surface location through which power for the feedback device 142, communication unit 134a and/or controller 134b may be provided. In some embodiments, the controller 134b may be preprogrammed with instructions thereon for determining a bend angle θ from signals received from the feedback device 142. The instructions may include instructions to transmit the bend angle θ to the surface location "S" via the communication unit 134a, and or instructions to operate the electric motor 124 (FIG. 4) based on the bend angle θ determined.

Figure 6:
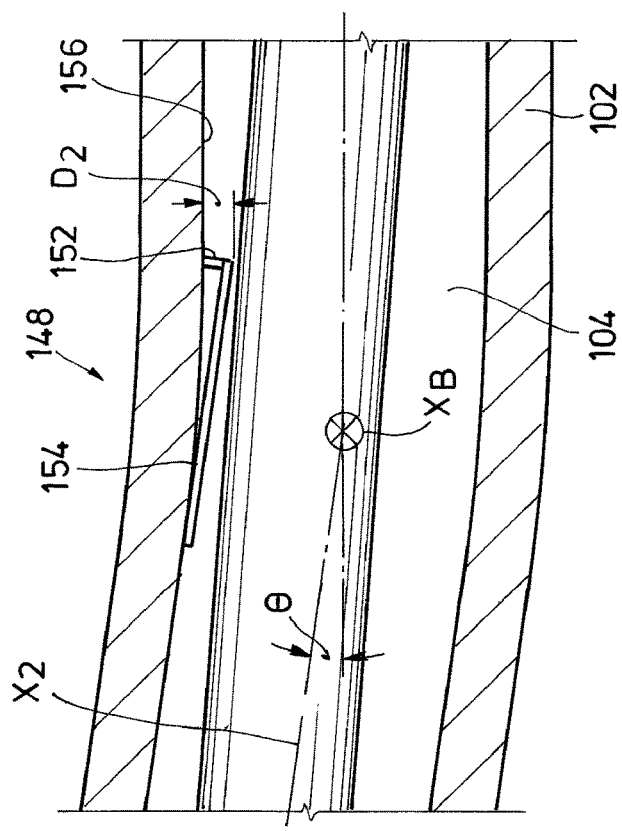
FIG. 6 is a cross-sectional schematic view of another bent housing having an internally disposed measurement mechanism in accordance with example embodiments of the disclosure.

Referring to FIG. 6, another exemplary embodiment of a measurement mechanism 148 includes a feedback device 152 disposed on an interior of the annular member 102, e.g., within the internal passageway 104. The feedback device 152 is supported between a reference beam 154 and an interior surface 156 of the annular member 102. In some embodiments, the reference beam 154 may be a substantially rigid member fixedly coupled to the interior surface 156, such that the reference beam 154 extends generally parallel with longitudinal axis $X_2$. The reference beam 154 overhangs the bend axis $X_B$ such that a change in the bend angle θ corresponds to a change in a distance $D_2$ between an end of the reference beam 154 and the interior surface 156. The feedback device 152 may comprise any of the mechanisms described above for the feedback device 142 (FIG. 5) and may similarly be coupled can be electrically coupled in an electrical circuit that includes the communication unit 134a, controller 134b and a power source 144 (FIG. 5). The feedback device 152 may thus be operable to provide confirmation or error signals to the surface location to indicate a status of the adjustment mechanism 110 (FIG. 4).

Referring now to FIGS. 7A through 7D, a plurality of radially spaced adjustment mechanisms 110 may be employed to influence a drilling direction of the drill string 18 to which the bent housing 100 is coupled. A clockwise rotational progression of the bent housing 100 with respect to a coordinate axis 156 is illustrated as indicated by arrow $A_5$. The rotational progression may be intentionally induced from the surface location "S" (FIG. 1), e.g., with the turn table 28 (FIG. 1), or the progression may be inadvertently induced by characteristics of the geologic formation "G" contacting the drill string 18.

Figure 7A:
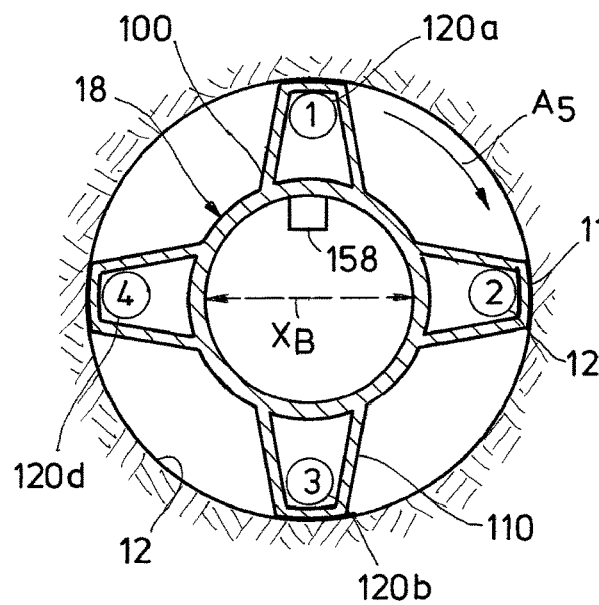
FIGS. 7A through 7D are cross-sectional schematic top-views of a bent housing in a wellbore illustrating a rotational progression of the bent housing during a directional drilling operation in accordance with example embodiments of the disclosure.
Figure 7B:
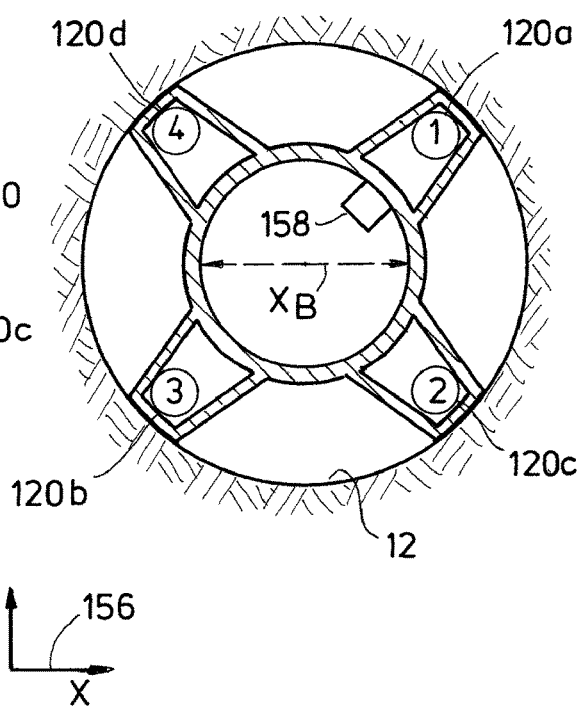
Figure 7C:
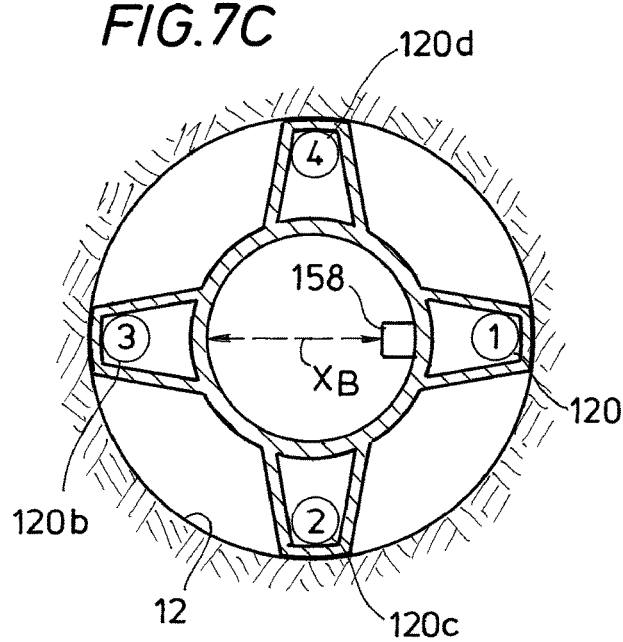
Figure 7D:
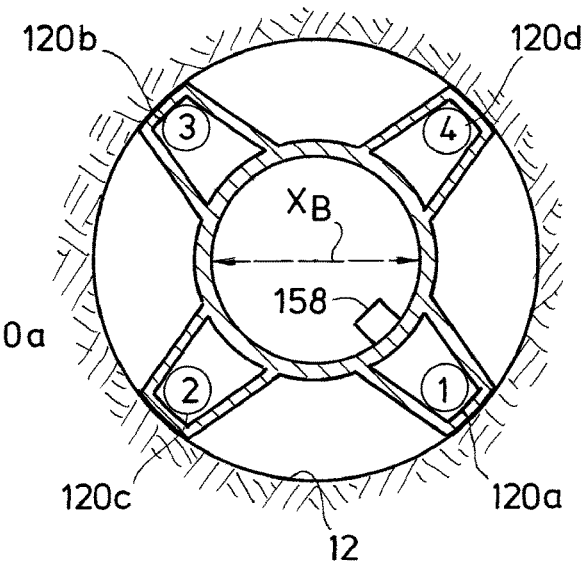

The bent housing 100 is initially arranged in the wellbore 12 as illustrated in FIG. 7A. To build in a positive y-direction, the support member 120a may be placed in tension while the support member 120b is placed in compression. The bent housing 100 will then have a bias to bend in the y-direction about the bend axis $X_B$. When the bent housing 100 arrives at the orientation of FIG. 7B, support members 120a and 120d may be placed in tension while support members 120b and 120c are placed in compression. Similarly, when the bent housing 100 reaches the orientation of FIG. 7C, support member 120d may be placed in tension while support member and 120c is placed in compression, and when the bent housing 100 reaches the orientation of FIG. 7D, support members 120b and 120d may be placed in tension while support members 120 a and 120c are placed in compression. In this manner, the bent housing 100 may be continuously or continually adjusted to maintain the bias to bend in the positive y-direction as throughout the rotational progression. In some exemplary embodiments the internal forces within the support members 120, e.g., the tensile and compressive forces, may be adjusted as the bent housing 100 is in motion along the rotational progression. Constant and real time adjustments may be made in this manner to maintain the bias to bend in the desired direction. It should be appreciated that although four support members 120a through 120d are illustrated, more or fewer support members 120 may be provided without departing from the scope of the present disclosure.

In some exemplary embodiments, a feedback device 158 may be provided for determining an orientation of the bent housing 110 in the wellbore 12. The feedback device 158 may comprise an inclinometer or similar tool. In some embodiments, the feedback device 158 may be operably coupled to the control unit 134 (FIG. 4) of the adjustment mechanisms 110, and the control units 134 may be preprogrammed with instructions for operating the actuators 122 (FIG. 4) to impart the appropriate tensile and compressive loads to the support members 120a through 120d based on the orientation determined by the feedback device 158.

Figure 8A:
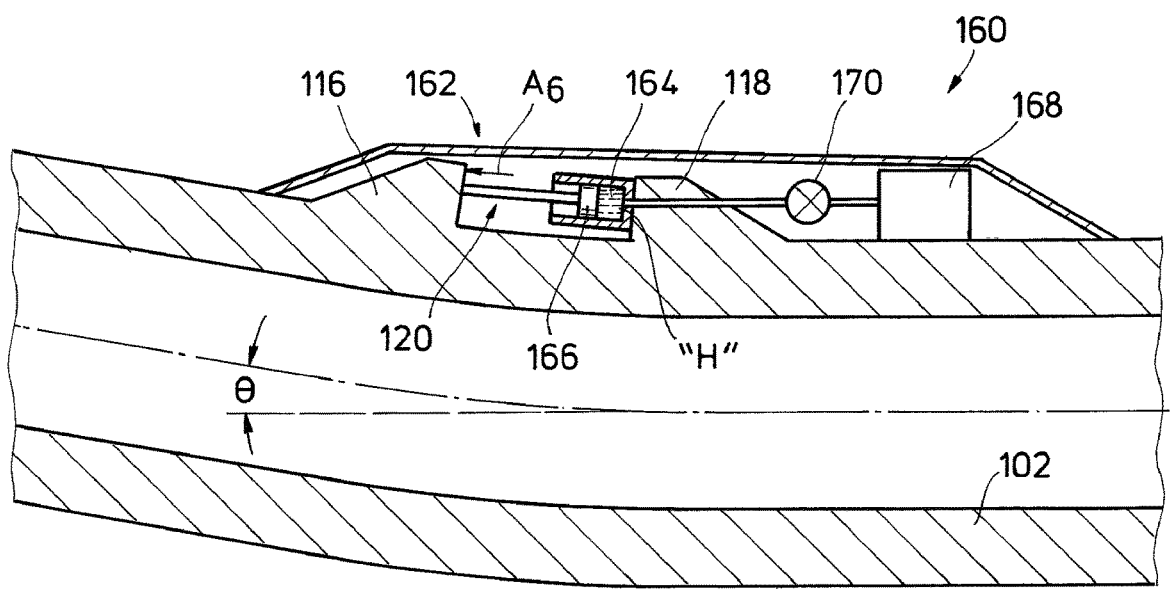
FIGS. 8A and 8B are cross-sectional schematic views of a bent housing including one or more hydraulically actuated adjustment mechanisms in accordance with example embodiments of the disclosure.
Figure 8B:
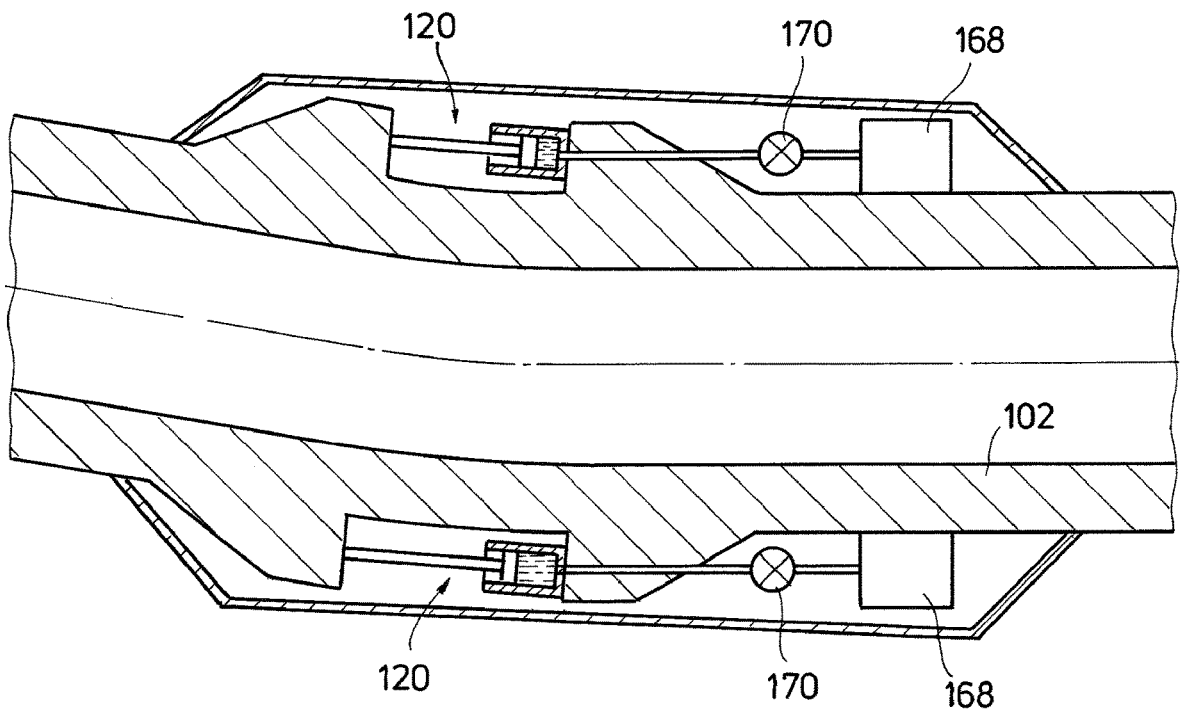

Referring now to FIGS. 8A and 8B, an adjustment mechanism 160 for altering the bend angle θ is illustrated. The adjustment mechanism 160 includes a hydraulic actuator 162 having a chamber 164 for hydraulic fluid "H" and a piston 166 disposed between upper and lower flanges 116, 118 on an interior-angle radial side of the annular member 102. In some exemplary embodiments, a fixed quantity of hydraulic fluid "H" is sealed within the chamber 164. An increase in the pressure and volume of the hydraulic fluid "H" urges the piston 166 toward the upper flange 116 in the direction of arrow $A_6$, thereby placing the piston 166 in compression and urging the upper and lower flanges 116, 118 away from one another, and thereby decreasing the bend angle θ. The compressive stresses in the piston 166 are transferred through the flanges 116, 118 to the annular member 102, and thus, the piston 166 serves as a support member 120. Since down-hole temperatures generally increase with depth, and since increasing temperatures will induce an increase of the pressure and temperature in the hydraulic fluid "H," the adjustment mechanism 160 may decrease the bend angle θ as the wellbore 12 (FIG. 1) is drilled deeper. Increasing temperatures will generally increase a volume of the hydraulic fluid "H," and resistance to volume changes generates an increase in pressure of the hydraulic fluid "H." In some example embodiments, the adjustment mechanism 160 may automatically decrease the bend angle θ to guide the wellbore 12 (FIG. 1) from the build section 12b (FIG. 1) to the tangent section 12c (FIG. 1) with generally lower build rates. This automatic change in the bend angle θ could permit the entire wellbore 12 (FIG. 1) to be drilled in sliding mode, e.g., by operation of the power unit 50 (FIG. 2) to rotate the drill bit 14 (FIG. 2) without rotation of the entire drill string 18 (FIG. 1) from the surface location "S" (FIG. 1). Operation of the drill bit 14 (FIG. 2) in the sliding mode rather than a rotating mode may significantly decrease operational alternating stresses throughout the drill string 18 (FIG. 1), and thereby produce reliability improvements.

In one or more other embodiments, the chamber 164 is fluidly coupled to a reservoir 168, which may be filled with a high pressure supply of hydraulic fluid "H" or a pump (not shown) may be coupled to the reservoir to pressurize the reservoir. A valve 170 is disposed between the chamber 164 and the reservoir 168. The valve 170 may be remotely operable to selectively permit hydraulic fluid "H" to flow from the reservoir 168 to the chamber 164. In one or more exemplary embodiments, the valve 170 may be coupled to the communication unit 134*a* (FIG. 4) and the controller 134*b* (FIG. 4) to permit remote operation from the surface location "S" (FIG. 1) and/or operation according to a predetermined set of instructions programmed into the controller 134*b* (FIG. 4). To decrease bend angle θ, the valve 170 may be opened to permit hydraulic fluid "H" to flow into the chamber 164, to thereby urge the piston 166 in the direction of arrow $A_6$, and to thereby urging the upper and lower flanges 116, 118 away from one another.

Although the adjustment mechanism 160 is described in terms of decreasing the angle θ, the adjustment mechanism 160 may also be employed to increase the bend angle θ. For example, in some embodiments, the piston 166 and chamber 164 may additionally or alternatively be disposed on an exterior-angle radial side of the annular member 102 (illustrated in FIG. 8B). As described above, separating the upper and lower flanges 116, 118 on an exterior-angle radial side of the annular member 102 may serve to increase the bend angle θ.

Figure 9:
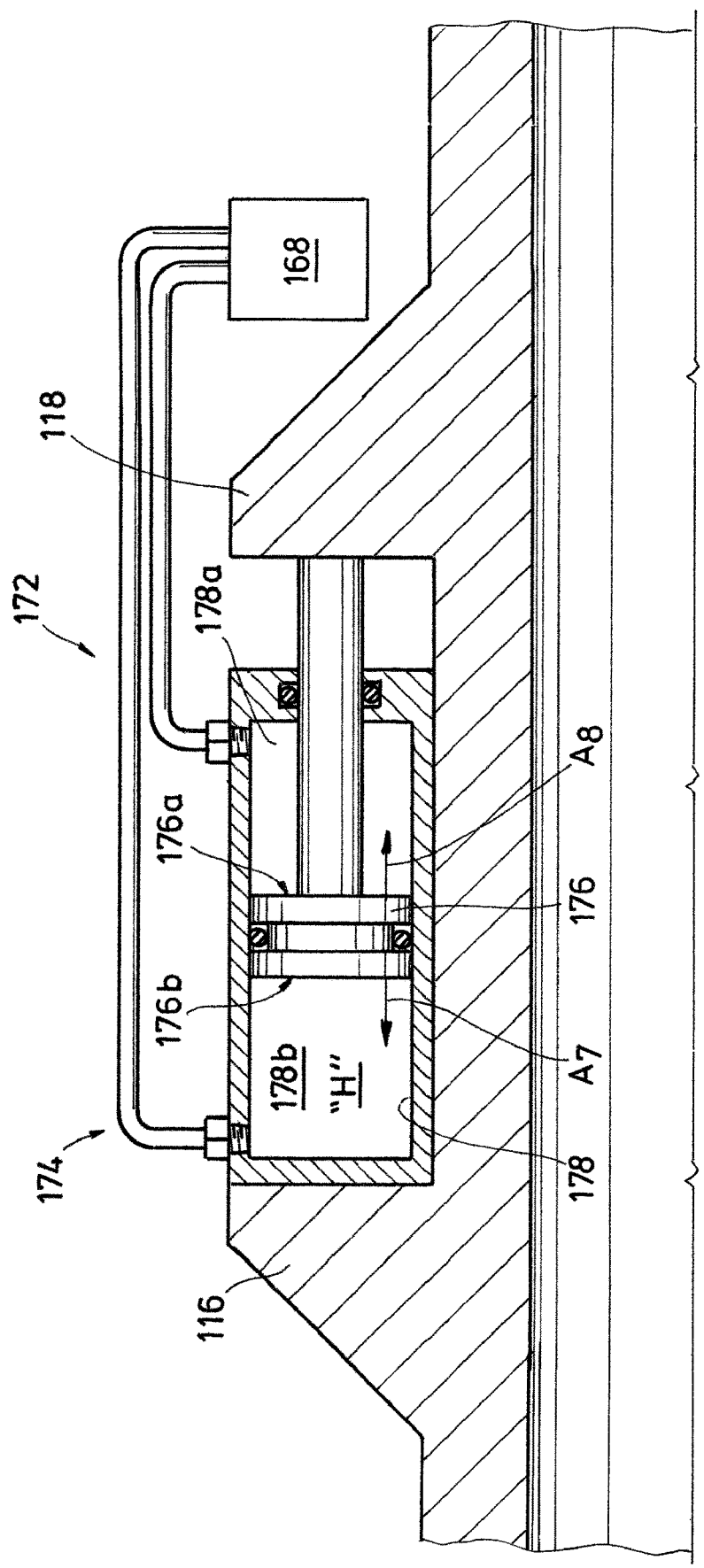
FIG. 9 is a cross-sectional schematic view of bent housing including another hydraulically actuated adjustment mechanism employing a dual action piston in accordance with example embodiments of the disclosure.

In other example embodiments, as illustrated in FIG. 9, an adjustment mechanism 172 may include a hydraulic actuator 174 with a "double acting" piston 176. The double acting piston 176 is disposed in a chamber 178, and axially divides the chamber 178 into two fluidly isolated sub-chambers 178*a*, 178*b*. Each sub-chamber 178*a*, 178*b* is fluidly coupled to the reservoir 168. Valves 170 (FIG. 8), pumps (not shown) or other mechanisms may be coupled between the sub-chambers 178*a*, 178*b* and the reservoir 168 such that hydraulic fluid "H" may be selectively withdrawn from either sub-chamber 178*a* or 178*b*, and simultaneously provided to the other sub-chamber, 178*a* or 178*b*. The hydraulic fluid "H" imparts a force to a first face 176*a* of the piston 176 to urge the piston 176 in the direction of arrow A, and thereby urge the upper and lower flanges 116, 118 toward one another. Similarly, the hydraulic fluid "H" imparts a force to a second face 176*b* of the piston 176 to urge the piston 176 in the direction of arrow $A_8$ and thereby urge the upper and lower flanges 116, 118 away from one another. Thus, the dual acting piston 176 may be operable to both increase and decrease the bend angle θ (FIG. 8).

Figure 10:
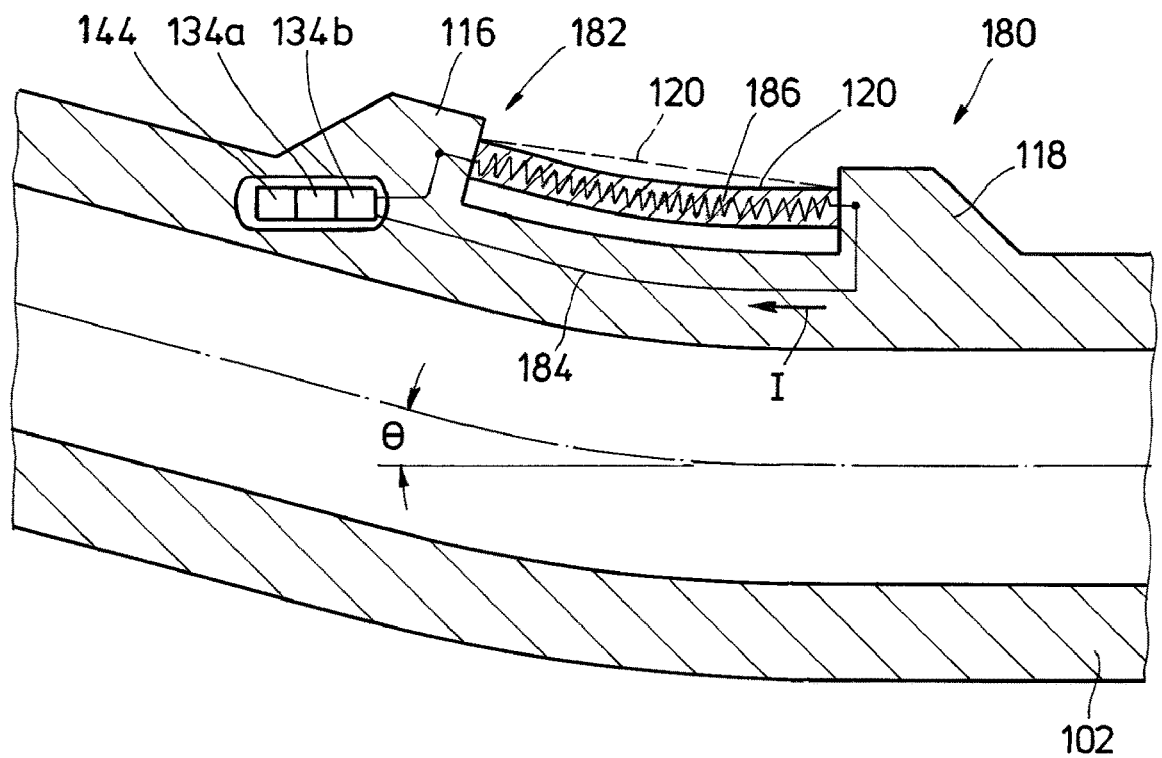
FIG. 10 is a cross-sectional schematic view of a bent housing including a thermally actuated adjustment mechanism in accordance with example embodiments of the disclosure.

Referring now to FIG. 10, an adjustment mechanism 180 for altering the bend angle θ is illustrated. The adjustment mechanism 180 includes a thermal actuator 182. The thermal actuator 182 includes a support member 120 disposed between the upper and lower flanges 116, 118. In some exemplary embodiments, the support member 120 is constructed at least partially of a shape memory alloy such as Nitinol. The support member 120 may thus be operable to change shape between at least first and second operational configurations responsive to at least a threshold temperature change. For example, the first configuration of the support member 120 may be a curved, bent or deformed configuration, which is maintained at a relatively low temperature. The second operational configuration can be a relatively straight configuration (as illustrated in phantom), which is maintained at a relatively high temperature. In some exemplary embodiments, the support member 120 may transition between the first and second operational configurations at a transition temperature in the range of about 150° C. to about 160° C. Since the support member 120 will exhibit a relatively lesser length in the first curved configuration than in the second straight configuration, the support member 120 may be moved between the first and second operational configurations to urge the upper and lower flanges 116, 118 toward and away from one another, respectively. In one or more example embodiments of operation, the change between the first and second operational configurations can be triggered by an increase in the down-hole temperature as the wellbore 12 (FIG. 1) is drilled to deeper depths.

In one or more embodiments, the thermal actuator 182 may include a heating circuit 184 for selectively inducing the support member 120 to change between the first and second operational configurations. In some embodiments, the heating circuit 184 may include the communication unit 134*a*, controller 134*b* and power source 144. In some embodiments, the heating circuit 184 may comprise a cartridge heater having a heating element 186 extending through or adjacent the support member 120. In some exemplary embodiments, the heating element 186 may be a resistive heating element. In some other exemplary embodiments, the material of the support member 120 may be coupled in the heating circuit, and may thus serve as a resistive heating element. In operation, a current I can be selectively induced to flow through the heating circuit 184 to heat the support member 120 to above the transition temperature, and thereby induce the support member 120 to change from the first configuration to the second operational configuration. The current I may be interrupted to allow the support member 120 to cool and return to the first configuration. In other exemplary embodiments, the heating element 186 may comprise an induction heating coil arranged to heat the support member 120 by electromagnetic induction. An alternating current may be supplied through the heating element 186 to induce eddy currents in the support member to generate heat therein.

Figure 11:
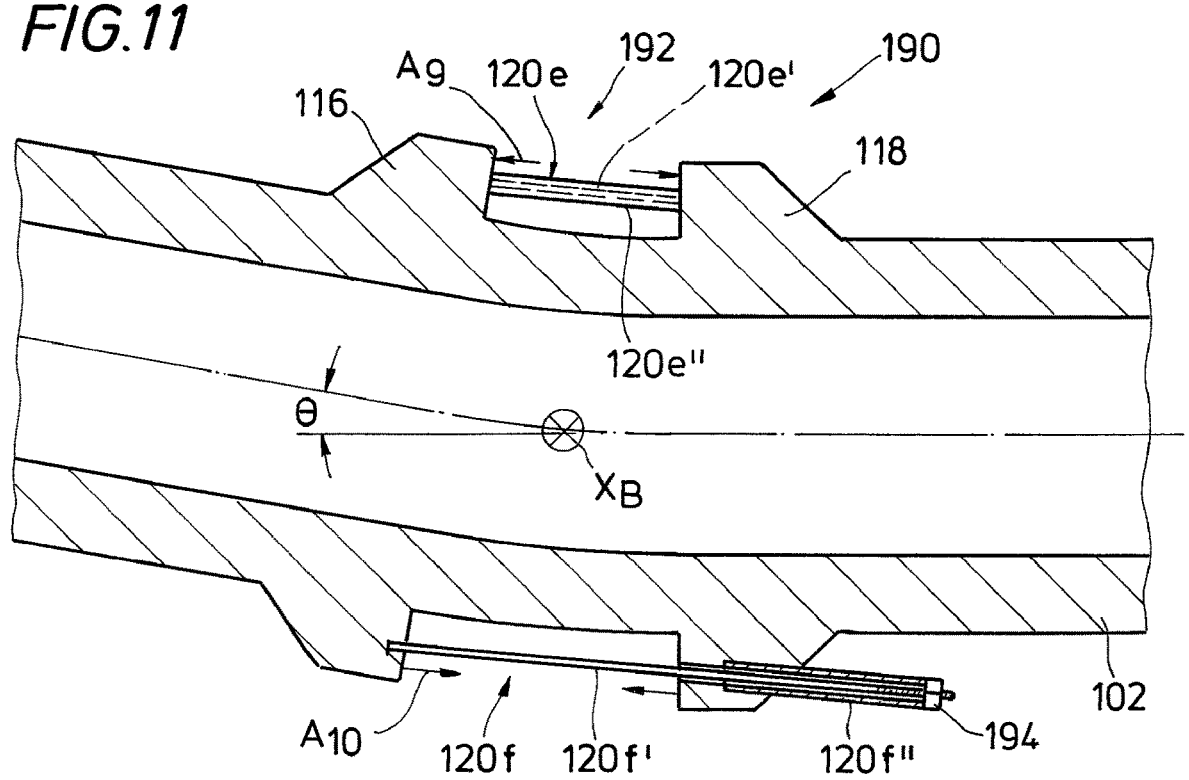
FIG. 11 is a cross-sectional schematic view of a bent housing including another thermally actuated adjustment mechanism in accordance with example embodiments of the disclosure.

Referring now to FIG. 11, an adjustment mechanism 190 for altering the bend angle θ is illustrated. The adjustment mechanism 190 includes a thermal actuator 192 with an interior-angle support member 120*e* and an-exterior angle support member 120*f*.

In some exemplary embodiments, the interior support member 120*e* may comprise a solid structure that is responsive to heat to expand to separate the flanges 116, 118. In some other exemplary embodiments, the interior-angle support member 120*e* includes an inner support member 120*e*' (illustrated in phantom) and an outer expansion sleeve 120*e*'' disposed around the inner support member 120*e*'. The inner support member 120*e*' may be secured to the upper and lower flanges 116, 118 in a floating manner that permits relative movement of the upper and lower flanges 116, 118 toward and away from one another about the bending axis $X_B$. The outer expansion sleeve 120*e*'' is constructed of a material having a dissimilar coefficient of thermal expansion α with respect to the annular member 102. For example, in some exemplary embodiments, the outer expansion sleeve 120e" may have a higher coefficient of thermal expansion α than the annular member 102. In some embodiments, the annular member 102 may be constructed of a steel alloy having a coefficient of thermal expansion $\alpha_{STEEL}$ of about $7.3 \times 10^{-6}$ in/in ° F. and the expansion sleeve 120e" may be constructed of beryllium copper having a coefficient of thermal expansion $\alpha_{BECU}$ of about $9.6 \times 10^{-6}$ in/in ° F. Thus, when the adjustment mechanism 190 is exposed to increasing temperatures, e.g., the increasing temperatures associated with drilling wellbore 12 (FIG. 1) to increasing depths, the expansion sleeve 120e" will expand to a greater degree than the annular member 102. Since the expansion sleeve 120e" is disposed between interior surfaces of the upper and lower flanges 116, 118, this expansion causes the expansion sleeve 120e" to exert an outwardly directed force on the upper and lower flanges 116, 118 in the direction of arrows $A_9$. Since this outwardly directed force is imparted to the upper and lower flanges 116, 118 on an interior-angle side of the annular member 102, the bend angle θ is decreased.

The exterior-angle support member 120f may also be arranged for decreasing the bend angle θ. The exterior-angle support member 120f includes an inner support member 120f' and an outer expansion sleeve 120f". The inner support member 120f extends between the upper flange 116, through lower flange 118 and to a torque nut 194 threaded or otherwise affixed to an end of inner support member 120f'. The outer expansion sleeve 120f" is disposed over the inner support member 120f and extends longitudinally between the torque nut 194 and a longitudinally exterior surface of the lower flange 118. Where the outer expansion sleeve 120f has a coefficient of thermal expansion α greater than that of the annular member 102, exposing the adjustment mechanism 190 to increasing temperatures operates to cause the expansion sleeve 120f to exert an outwardly directed force on the lower flange 118 and the torque nut 194 in the directions of arrows $A_{10}$. Since the torque nut 194 is threaded to an end of the inner support member 120f, the force applied to the torque nut 194 is transferred through the inner support member 120f' to the upper flange 116, thereby drawing the upper flange 116 toward the lower flange in the direction of arrow $A_{11}$. The upper and lower flanges 116, 118 are thereby urged toward one another on the exterior-angle side of the annular member 102, thereby decreasing the bend angle θ.

In other exemplary embodiments, expansion sleeves 120e" and 120f" may be arranged to increase the bend angle θ. For example, the radial positions of the expansion sleeves 120e" and 120f" may be reversed to cause the upper and lower flanges 116, 118 to be approximated on the interior angle side of the annular member 102 and separated on the exterior angle side of annular member 102. In some embodiments, the expansion sleeves 120e" and 120f" are arranged to impart forces of differing magnitudes to the upper and lower flanges 116, 118. In some embodiments, an external heat source, such as the heater 184 (FIG. 10), may be provided to impart external heat to the expansion sleeves 120e" and 120f". In other embodiments, the expansion sleeves 120e" and 120f" can have coefficients of thermal expansion α that are lower than the annular member 102.

Figure 12A:
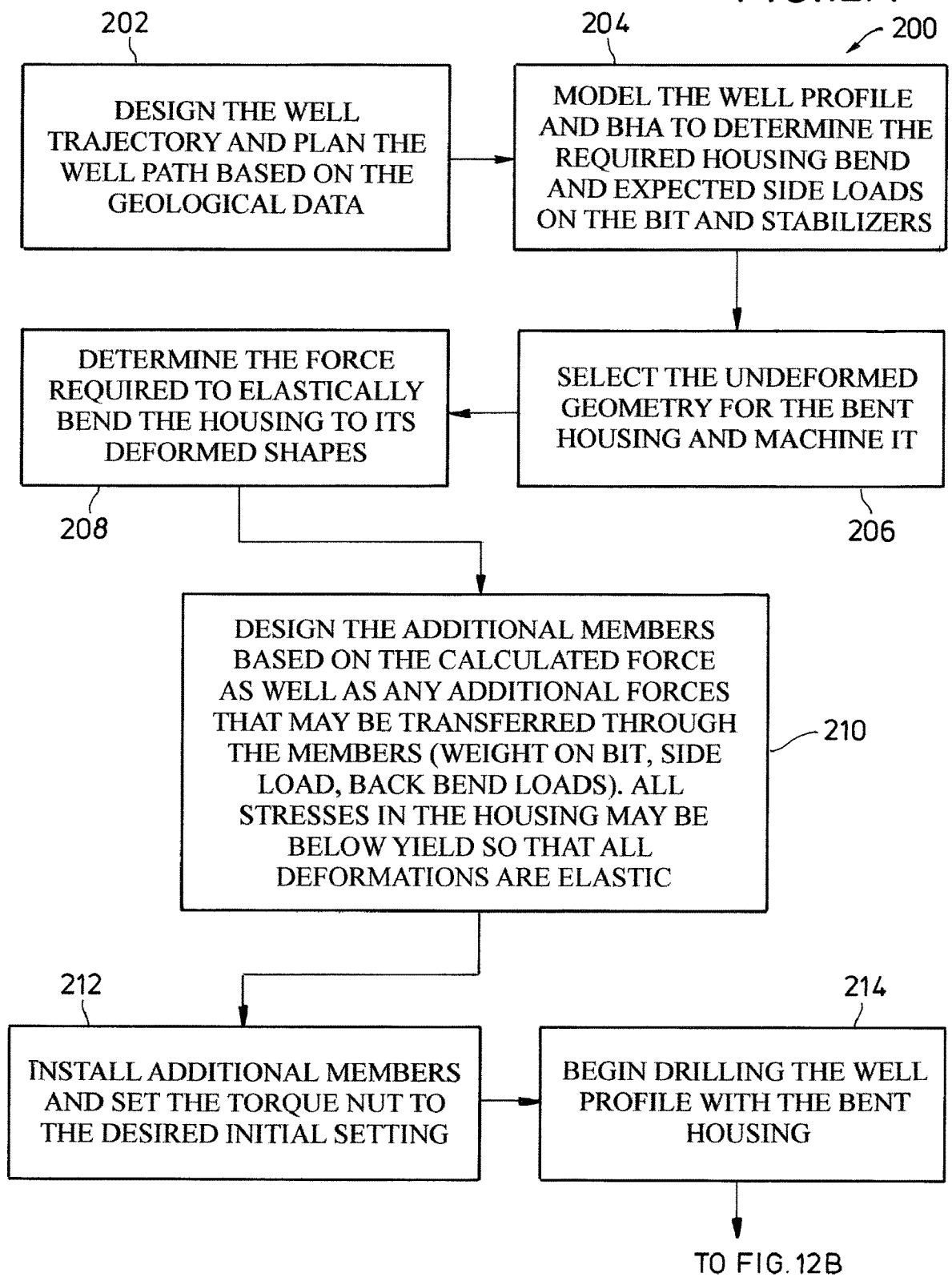

Referring to FIGS. 12A and 12B, an operational procedure 200 illustrates example embodiments of drilling a wellbore 12 (FIG. 1) with an adjustable bent housing 100 (FIG. 2). Initially, at step 202, a well profile is planned through the geologic formation "G." The well profile can be based on available geologic data to avoid obstacles, to reach a planned destination, or to achieve other objectives. Next, at step 204, the well profile and the a BHA 20 are modeled to determine the required bend angle θ or range of bend angles θ required for forming the wellbore 12. The expected side loads on the drill bit 14 and the BHA 20 may also be evaluated in step 204. Next, an initial bend angle $\theta_0$ for the BHA can be selected based on the planned well profile and the expected lateral loads. An annular member 102 having the selected initial bend angle $\theta_0$ may then be machined. Next, the forces required bend the annular member 102 to one or more adjusted bend angles θ are determined at step 208. The adjusted bend angles θ may facilitate achieving the planned well profile. Next, the support members 120 are designed based on the determined forces. The design of the support members 120 may also accommodate additional forces, such as weight on bit, lateral loads and backbend loads, expected to be transferred the support members 120. In some embodiments, the support members 120 can be designed to maintain all forces in the support members 120 and the annular member 102 in an elastic range such that the BHA 20 may be reused. Next, at step 212, the support members 120 may be installed on the annular member 102, and preloaded. In some exemplary embodiments, an appropriate preload can be applied by adjusting the position of a torque nut 128, 194 on the support member 120.

Next, drilling may be initiated at step 214 with a drill string 18 (FIG. 1) provided with the BHA 20 supported at an end thereof. In one or more exemplary embodiments, the drilling may be initiated with the initial bend angle $\theta_0$ in the BHA 20. At decision 216, the actual well profile of wellbore 12 being drilled is evaluated and compared to planned well profile to determine whether an adjustment to the bend angle θ would facilitate following the planned well profile. In some embodiments, at decision 216, a radial orientation of the annular member 102 in the wellbore 12 is determined, e.g., by querying feedback device 158 (FIG. 7A). The radial orientation of the annular member 102 in the wellbore 12 may facilitate determining whether the adjustment to the bend angle θ would facilitate following the planned well profile. In some exemplary embodiments, a selection of the radial support member 120 in which to trigger the changes in internal stresses from a plurality of support members 120 radially spaced around the annular member 120 is based on the radial orientation of the annular member 102 in the wellbore 12. If it is determined at decision 216 that an adjustment to the bend angle θ would facilitate following the planned well profile, the procedure 200 proceeds to step 218.

At step 218, an adjustment to the bend angle θ is triggered. In one or more exemplary embodiments, the adjustment to the bend angle θ can be triggered by transmitting an instruction signal to the communication unit 134a (FIG. 4) that may be recognized by the controller 134b. In response to receiving the instruction signal, the controller 134b may initiate a predetermined sequence of instructions stored thereon, which cause an actuator 122, 162, 174, 182, 192 to adjust the bend angle θ. For example, in various exemplary embodiments, the controller 134b may instruct the electric motor 124 (FIG. 4) to operate, the valve 170 (FIG. 8) to open, the piston 176 (FIG. 9) to move, and/or, the heating circuit 184 (FIG. 10) to operate to induce a change in the bend angle θ as described above. Next at step, 220 the adjusted bend angle θ may be verified. For example, in some embodiments, the controller 134b may query a measurement mechanism 138, 148 for an indication that the intended bend angle θ was achieved. Once it is verified that the intended bend angle θ was achieved drilling can continue (step 222). When it is determined at decision 216 that no adjustment is required, the procedure 200 may proceed directly to step 222, where drilling continues with the bend angle θ in existing configuration.

The procedure 200 can then proceed to step 224 where the bend angle is reevaluated. In some exemplary embodiments, the bend angle θ can be continuously or continually monitored and adjusted by returning to decision 216 as often as necessary to maintain drilling along the planned well profile. Once the wellbore 12 reaches its intended destination, the procedure 200 may end at step 226 and the wellbore 12 may be completed.

Sacrificial Support Members

Referring generally to FIGS. 13-26, devices, mechanisms and methods are illustrated for altering the bend angle of an adjustable drill-string housing by "sacrificing" a support member or a portion thereof at a down-hole location. In exemplary embodiments, the support members may maintain a preload in an annular member of the drill-string housing, and the preload may be released by inducing the support member to fail. The "failure" of the sacrificial support member may include various failure modes such as failure in tension, compression, torsion, shear, buckling, or other structural failures. In some embodiments, failure of a sacrificial support member may be induced by changing down-hole loads on the drill string, e.g., applying weight on bit, applying a torque to the drill string, and applying pressure through the drill string. In other embodiments, failure may be induced with actuators described below. Although sacrificing support members is generally described herein in terms of a structural failure of the sacrificial support member, as used herein, "failure" may include other processes that may be irreversible down-hole. For example, it should be appreciated that in some exemplary embodiments, the sacrificial support members may be induced to fail by un-fastening or rearranging a select component such that sacrificial support member no longer maintains the internal preload in the annular member. Thereafter, the select component may be refurbished or reset at a surface location "S" (FIG. 1) for subsequent use in the adjustable drill string housing.

Figure 13A:
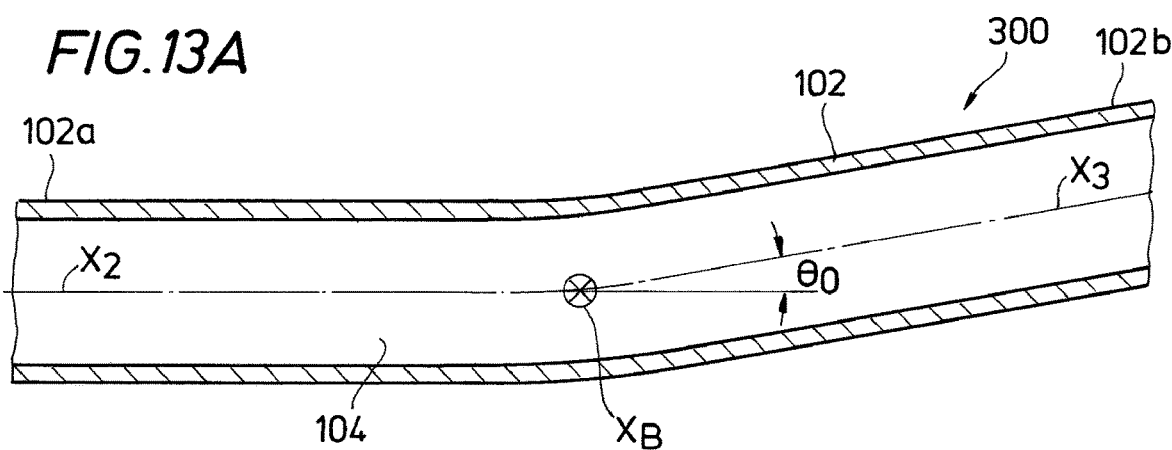
FIGS. 13A through 13C are cross-sectional schematic side-view of a bent housing illustrating a procedure employing a sacrificial support member for altering a bend angle of the bent housing in accordance with exemplary embodiments of the disclosure.
Figure 13B:
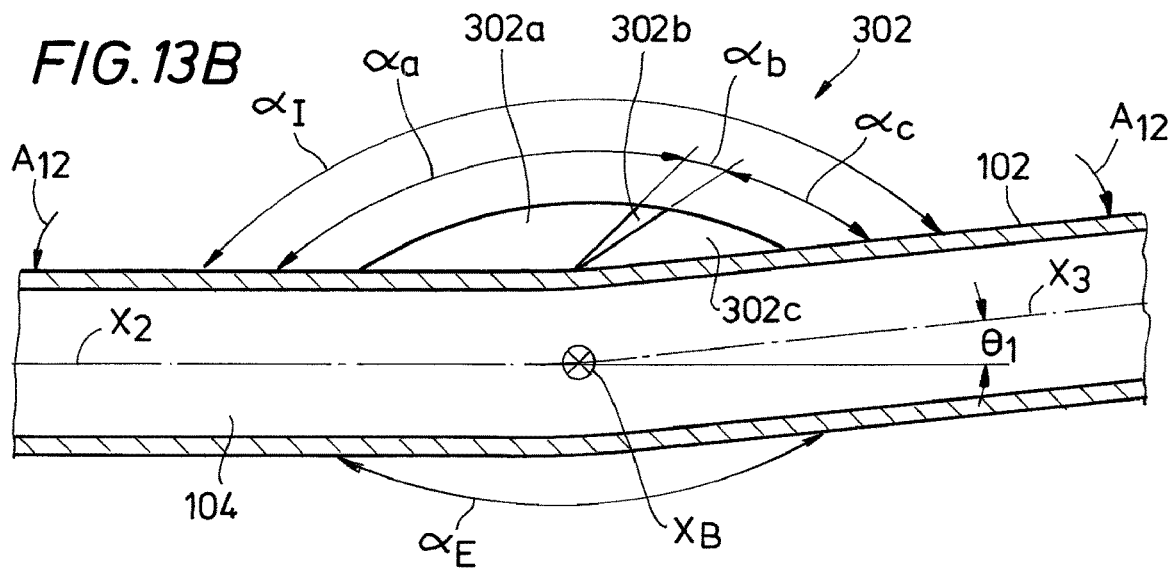
Figure 13C:
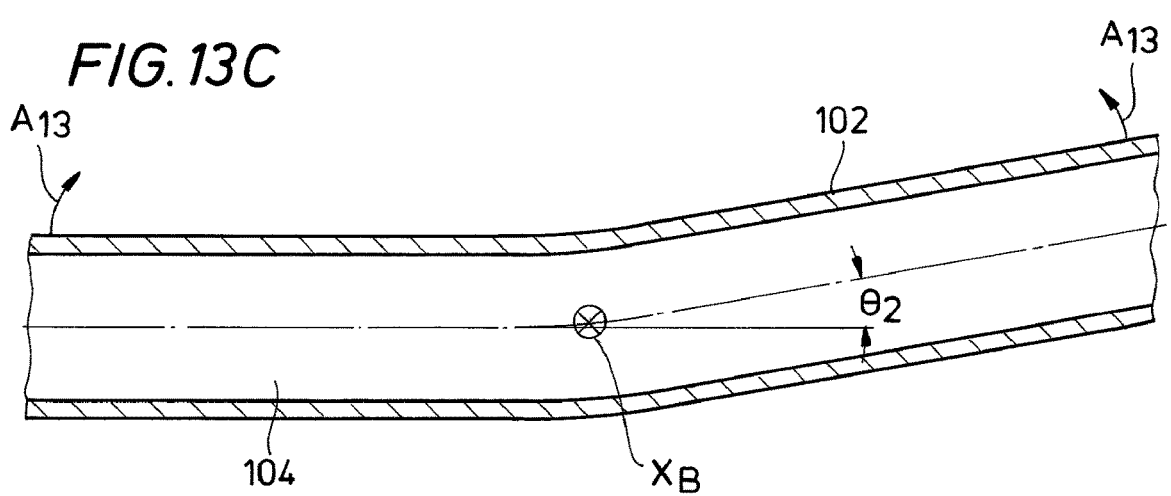

Referring to FIGS. 13A through 13C, bent housing 300 includes annular member 102 defining internal passageway 104 extending therethrough. As described above, the annular member 102 may be prefabricated with an initial bend angle $\theta_0$ (FIG. 13A) between the upper and lower longitudinal axes $X_2$ and $X_3$, which extend thorough upper and lower ends 102a, 102b of the annular member 102, respectively. Once constructed, the annular member 102 may be preloaded or pre-stressed to deform the annular member 102 to a first operational configuration with a first operational bend angle $\theta_1$ (FIG. 13B). A sacrificial support member 302 is affixed to the annular member 102 and extends across the bend axis $X_B$ to maintain the annular member 102 in the first operational configuration. The sacrificial support member 302 is removable down-hole to relieve at least a portion of the preload and permit the annular member 102 to relax toward a second operational configuration with second operational bend angle $\theta_2$ (FIG. 13C). As illustrated, the sacrificial support member 302 is affixed to an interior-angle ($\alpha_I$) radial side of the annular member 102, and wedges the annular member 102 toward the first operational configuration in the direction of arrows $A_{12}$. Thus the first operational bend angle $\theta_1$ is less than the initial bend angle $\theta_0$. In some exemplary embodiments, the second operational bend angle $\theta_2$ may be equal to the initial bend angle $\theta_0$.

In some exemplary embodiments, the sacrificial support member 302 may be constructed of at least one disintegrating material 302a, 302b, and/or 302c. The disintegrating material 302a, 302b, 302c may include sintered metallic powder compacts and/or non-metallic materials such as ceramics. The disintegrating materials 302a, 302b, 302c may be dissolvable or corroded in drilling fluids such as mud 36 (FIG. 1), or may be induced to disintegrate when exposed to a different trigger fluid. In some embodiments, the trigger fluid may be produced with a specialized trigger chemical (not shown) added to the mud 36. In some exemplary embodiments, each of the disintegrating materials 302a, 302b, 302c may be induced to disintegrate in response to the addition of a different trigger chemical such that a particular disintegrating material 302a, 302b, 302c may be selected for disintegration. Each of the disintegrating materials 302a, 302b, 302c extend over a different respective angular span $\alpha_a$, $\alpha_b$, $\alpha_c$ within the interior angle $\alpha_I$. The disintegration of any one of the disintegrating materials 302a, 302b, 302c permits the annular member 102 to relax a different amount in the direction of arrows $A_{13}$ toward the second operational configuration. For example, disintegration of disintegrating material 302b while disintegrating materials 302a and 302c remain intact, may permit the annular member 102 to relax to an intermediate configuration between the first and second operational configurations wherein the bend angle θ is between the first and second operational bend angles $\theta_1$ and $\theta_2$. In some exemplary embodiments, the disintegrating materials 302a, 302b, 302c may be sequentially dissolved to move the annular member to a plurality of intermediate configurations between the first and second operational configurations.

In other embodiments (not shown), disintegrating materials 302a, 302b, 302c may be placed in other locations on the annular member 102 such as within the internal passageway 104, within an exterior angle $\alpha_E$ or at other radial locations around the annular member 102. It should be appreciated that the placement of a disintegrating material 302a, 302b, 302c at different radial locations may permit selective bending of the annular member 102 about axes other than the bend axis $X_B$ illustrated.

Referring to FIGS. 14A and 14B, bent housing 310 includes a plurality of sacrificial support members 320 disposed radially about the annular member 102. In some embodiments, twelve (12) sacrificial support members may be provided between the upper and lower flanges 116, 118 of the annular member 102. Each of the sacrificial support members 320 may be individually induced to fail down-hole to move the annular member 102 to at least thirteen different operational configurations. A torque nut 324 is threaded onto each end of the sacrificial support members 320. The torque nuts 324 may be tightened or loosened to adjust the preload on the annular member 102. In some exemplary embodiments, a stress concentrator such as an annular groove 326 is provided in the support member 320 and defines a weakest point in the sacrificial support member 320. The support members 320 may be induced to fail at the annular groove 326 to relieve a portion of the preload applied by the torque nuts 324, and thereby adjust the bend angle θ of the annular member 102.

In some exemplary embodiments, the support members 320 may be induced to fail by the selective application of a trigger fluid or chemical to selectively induce corrosion of the sacrificial support member 320. In embodiments where the corrosion of the sacrificial support member 320 are described to induce failure in the sacrificial support member 320, any structural material of the sacrificial support member 320 may be characterized as a disintegrable material. In other embodiments, the sacrificial support members may be induced to fail by the application of sufficient loads to the sacrificial support members 320. For example, an operator may apply weight on bit with the annular member 102 in a particular orientation in the wellbore 12 (FIG. 1) to induce failure of at least one of the sacrificial support members 320. In other embodiments, the support members 320 may be selectively induced to fail by any of the techniques described herein below.

Referring to FIG. 15, a sacrificial support member 328 includes first and second portions 328a and 328b connected to one another with a bonding material 328c. The bonding material 328c may be constructed of a dissimilar material with respect to the first and second portions 328a, 326b such that the bonding material 328c may be induced to corrode more rapidly than the first and second portions 328a, 328b. For example, the bonding material may be constructed of any of the disintegrating materials 302a, 302b, 302c (FIG. 13B), and the first and second portions 328a, 328b may be constructed of stainless steel. In other embodiments, the first and second portions 328a, 328b may be coupled to one another by welding, brazing, soldering or a similar process, and the bonding material 328c may comprise a zinc-based solder. Corrosion of the bonding material 328c may disconnect the first and second portions 328a, 326b from one another, thereby relieving a preload from the annular member 102 (FIG. 14B).

In some embodiments, the bonding material 328c may alternatively or additionally be employed to bond the sacrificial support member 328 to the upper and lower flanges 116, 118 (FIG. 14B) or to another part of the annular member 102 (FIG. 14B). Corrosion of the bonding material 328c may thus disconnect the sacrificial support member 328 from the upper and lower flanges 116, 118 to thereby relieve at least a portion of the preload from the annular member 102 (FIG. 14B). In some other embodiments, the bonding material 328c may serve as sacrificial anode in a galvanic corrosion system 330 (FIG. 16A) as described below.

Figure 16A:
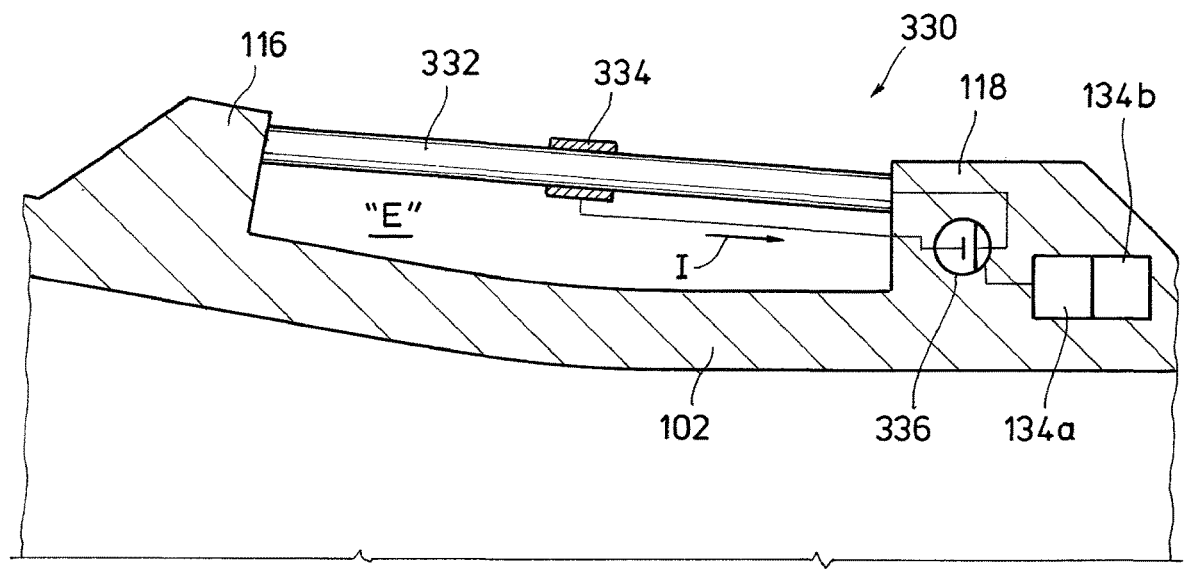
FIG. 16A is a schematic cross-sectional view of a galvanic corrosion system for a sacrificial support member in accordance with other exemplary embodiments of the disclosure.

Referring to FIG. 16A, galvanic corrosion system 330 includes a sacrificial support member 332 extending between upper and lower flanges 116, 118, which maintains a pre-load in the annular member 102. A cathode member 334 is arranged as a sleeve disposed around the sacrificial support member 332 (anode), and is constructed of a material having a different electrolytic potential than the sacrificial support member 332. Thus, when the sacrificial support member 332 and the cathode member 334 are submerged in an electrolyte fluid "E," an ion migration from the sacrificial support member 332 to the cathode member 334 accelerates the corrosion of the sacrificial support member 332. In some exemplary embodiments, the electrolyte fluid "E" may include drilling mud 36 (FIG. 1), or a specialized chemical solution "C" (FIG. 4) disposed under a protective cover 132 (FIG. 4). In some embodiments, an acidic electrolyte fluid "E" may be provided to accelerate a controlled corrosion of the sacrificial support member 332. In some exemplary embodiments, the electrolyte fluid "E" may also comprise basic fluids and/or salts.

In some exemplary embodiments, the cathode member 334 may be eliminated, and the flanges 116, 118 and/or the annular member 102 may serve as the cathode. In some embodiments, a current source 336 may be electrically coupled between sacrificial support member 332 and the cathode member 334 to impress a current I through the sacrificial support member 332, cathode member 334 and electrolyte "E." The current source 336 may include a direct current sources such as a battery, and the current I may further accelerate corrosion of the sacrificial support member 332, or in some embodiments, prevent corrosion of the sacrificial support member 332. In some exemplary embodiments, the communication unit 134a, controller 134b may be coupled to the current source 336 such that the current I may be selectively induced and interrupted from the surface location "S" (FIG. 1). In some exemplary embodiments, the controller 134b may include instructions for selectively connecting, disconnecting and/or reversing the polarity of the current source 336.

Figure 16B:
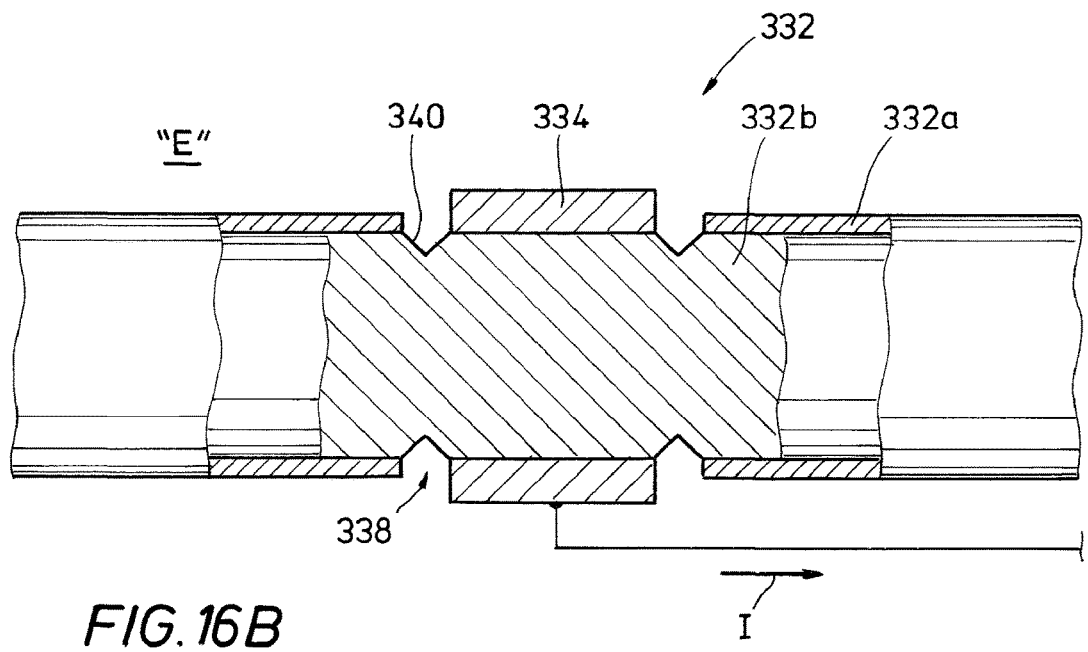
FIG. 16B is an enlarged cross-sectional view of a cathode sleeve member of the galvanic corrosion system of FIG. 16A.

Referring to FIG. 16B, in some embodiments, the sacrificial support member 332 includes a protective coating 332a disposed around an exterior surface thereof. The protective coating 332a may comprise a stainless steel tube or other structure that is more resistant to corrosion than a core 332b of the sacrificial support member 332. In some embodiments, the protective coating 332a includes at least one of paint, rubber, epoxy and a passive oxide film layer. The core 332b may be exposed to the electrolyte fluid "E" through one or more openings 338 defined in the protective coating 332a adjacent the cathode member 334. In some embodiments, stress concentrators 340 such as annular grooves may be positioned within the openings 338. The openings 338 and the stress concentrators 340 promote localized corrosion of the core 332b adjacent the cathode member 334 to thereby accelerate failure of the sacrificial support member 332. In some instances, the failure of sacrificial support member 332 at the stress concentrators 340 may be induced over a timespan of about an hour or less after inducing current I. In other instances, the current I may be induced for several hours to complete the failure of the sacrificial support member 332, which might otherwise take months or years to complete without the current I. In some embodiments, the protective coating 332a is selected to wear off the sacrificial support member 332 by inducing contact between the sacrificial support member 332 and the geologic formation "G" (FIG. 1) and or casing (see, e.g., casing 606 in FIG. 32A) in the wellbore 12 (FIG. 1).

Figure 17A:
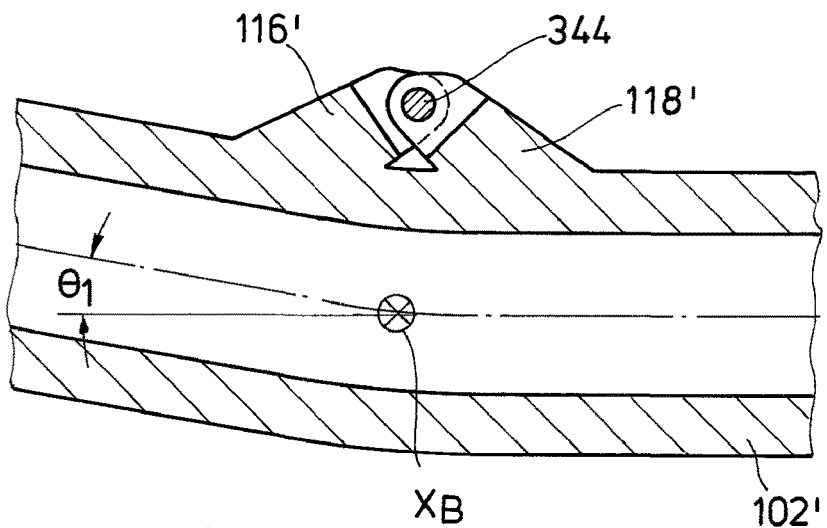
FIGS. 17A through 17C are schematic cross-sectional views of systems for inducing shear failure in sacrificial support members in accordance with other exemplary embodiments of the disclosure.
Figure 17B:
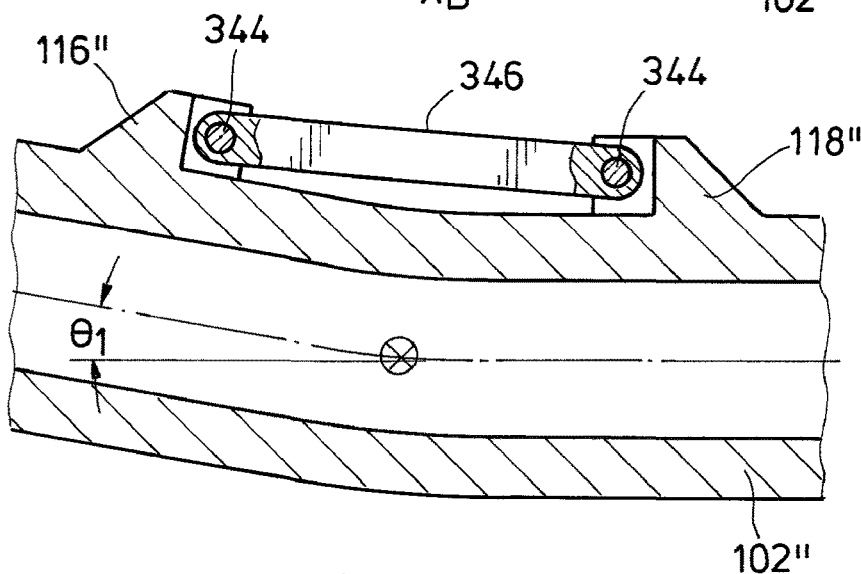
Figure 17C:
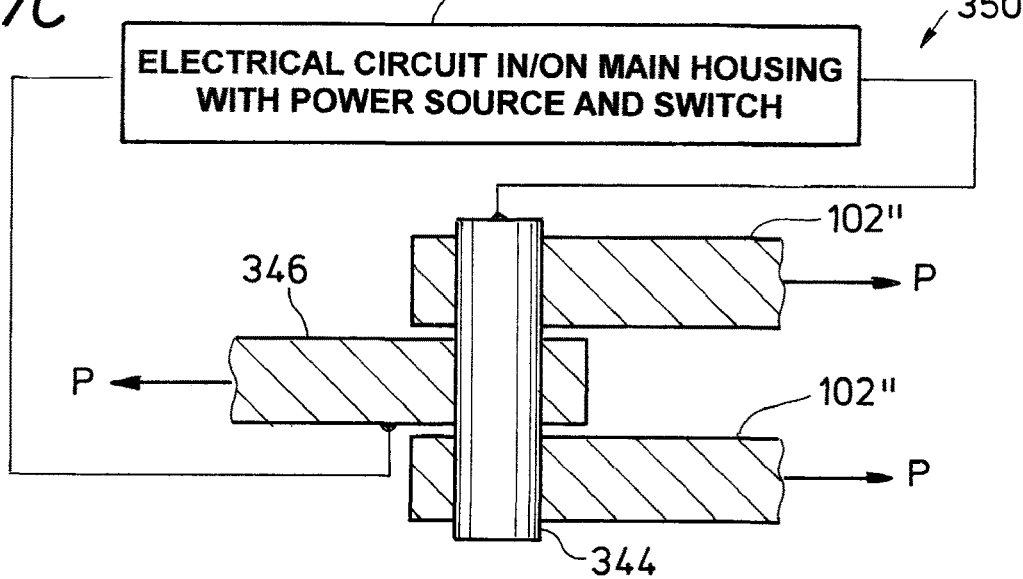

Referring now to FIGS. 17A through 17C, galvanic corrosion or other methods for inducing failure in sacrificial support members 344 may be employed to selectively induce shear failure in the sacrificial support members 344. It should be appreciated that the sacrificial support members 344 may be sufficiently robust to withstand a preload "P" (FIG. 17C) and any expected operational loads, while being sufficiently vulnerable to an intentionally induced failure to permit an expedient transition between first and second operational configurations of a tubular member 102', 102". Since shear failure is often more susceptible to stress concentration and other factors, the support members 344 may often be induced to fail more rapidly than a support member, e.g., support member 332 (FIG. 16A), subject primarily to compressive or tensile longitudinal forces.

In some exemplary embodiments, sacrificial support members 344 may be elongate, cylindrically-shaped or pin-shaped members that extend generally parallel to the bending axis $X_B$. The sacrificial support members 344 may be arranged to extend through a pair of overlapping upper and lower flanges 116', 118' (FIG. 17A) or through one or more plate members 346 (FIGS. 17B and 17C) that extend between longitudinally spaced upper and lower flanges 116" 118". Thus, the preload "P" applied to the respective annular members 102', 102" to achieve a particular first operational bend angle $\theta_1$ is manifest as shear forces in the sacrificial support members 344.

As illustrated in FIG. 17C, the sacrificial support member 344 may serve as a sacrificial anode in a galvanic corrosion system 350. The sacrificial support member 344 may be electrically coupled to circuitry 352 including the communication unit 134*a*, controller 134*b* and current source 336 (FIG. 16A). The circuitry 352 may also be coupled to plate member 346. The sacrificial support member 344 may be constructed of a material such as zinc, which has a greater electrolytic potential than the plate member 346. In some exemplary embodiments, the plate member 346 may be constructed of stainless steel. The sacrificial support member 344 may thus be induced to corrode and fail to relieve the preload "P," and thereby move the annular member 102" to a second operational configuration down-hole.

Figure 18:
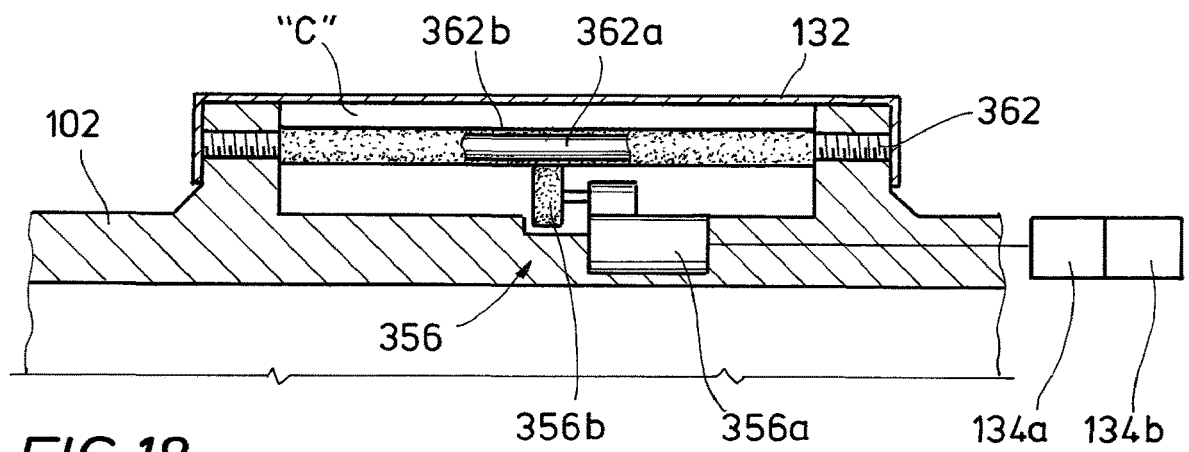
FIG. 18 is a schematic cross-sectional view of an electromechanical actuator for initiating failure of a sacrificial support member in accordance with exemplary embodiments of the disclosure.
Figure 19:
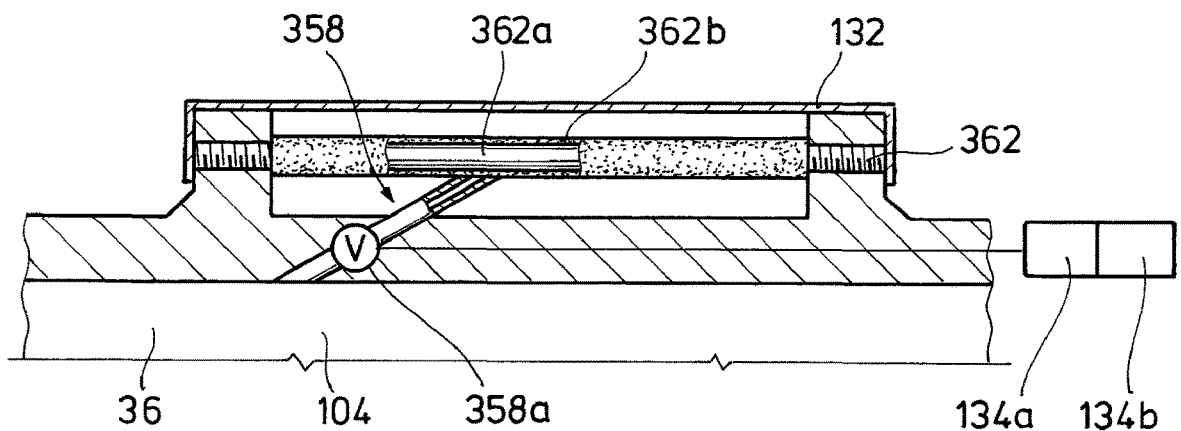
FIG. 19 is a schematic cross-sectional view of a fluidic actuator for initiating failure of a sacrificial support member in accordance with other exemplary embodiments of the disclosure.
Figure 20:
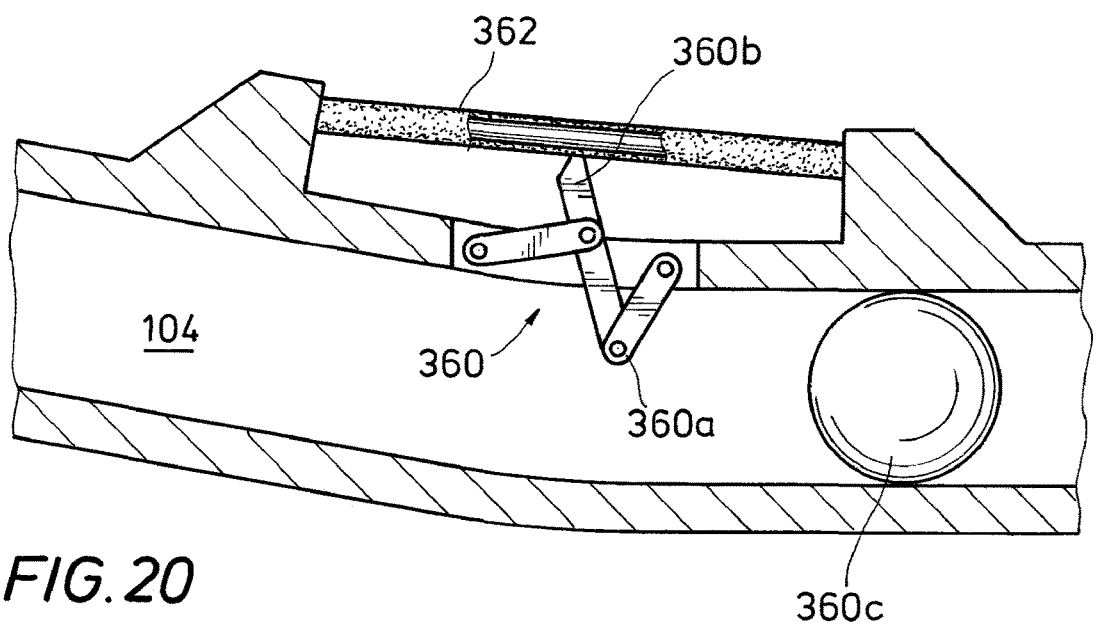
FIG. 20 is a schematic cross-sectional view of a mechanical actuator for initiating failure of a sacrificial support member in accordance with other exemplary embodiments of the disclosure.

Referring to FIGS. 18-20, actuators 356, 358 and 360 may be employed to initiate and/or accelerate corrosive failure of sacrificial support members 362. In some embodiments, the actuators 356, 358 and 360 may be employed to selectively penetrate a protective coating 362*a* that protects a core 362*b* of the sacrificial support member 362 from a corrosive environment. The protective coating 362*a* may include paint, rubber and/or epoxies. In some exemplary embodiments, the core 362*b* may be constructed of an iron material that is highly susceptible to corrosion by a chemical solution "C," such as a dilute nitric acid. The protective coating 362*a* may be a passive oxide layer pre-applied to the iron core 362*b* by exposing the iron core 362*b* to a relatively strong nitric acid solution. In operation, the protective coating 362*a* can be maintained intact in the chemical solution "C," and thus, the annular member 102 may be maintained in the first operational configuration. The chemical solution "C" may be contained under protective cover 132 (FIGS. 18 and 19) and/or exposed to the drilling mud 36. When an adjustment of the annular member 102 to a second operational configuration is desired, the actuator 356, 358 and 360 may be remotely controlled to mechanically cut, scratch, score, grind, scrape or abrade protective coating 362*a* down-hole. The core 362*b* may thereby be exposed to the chemical solution "C," and can be permitted to corrode until the sacrificial support member 362 fails.

The actuator 356 (FIG. 18) may include an electric motor 356*a* coupled to an abrasive medium 356*b* such as a grinding wheel, wire brush or sand paper arranged to engage the sacrificial support member 362. The electric motor 356*a* may be operatively coupled to the communication unit 134*a* and controller 134*b* for activation, or may be operatively coupled to a driveshaft (not shown) of a mud powered turbine or power unit 50 (see FIG. 2) through a clutch (not shown) or other mechanism.

In some other exemplary embodiments, the actuator 358 (FIG. 19) may include a control valve 358*a* disposed within a fluid passageway extending from the internal passageway 104 or another source of a pressurized and/or abrasive fluid. The control valve 358*a* may be opened to divert a flow mud 36 from the internal passageway 104 toward the sacrificial support member 362. The flow of mud 36 may be continued to abrade the protective coating 362*a* from the sacrificial support member 362, or may be continued until the sacrificial support member 362 fails. In one or more exemplary embodiments, the control valve 358*a* is operatively coupled to the communication unit 134*a* and controller 134*b*, and may be electronically actuated thereby. In some other embodiments, the control valve 358*a* may be operated by a pressure or temperature controlled piston (not shown), such that the control valve 358*a* may be operated in response to predetermined down-hole conditions.

In one or more other exemplary embodiments, the actuator 360 (FIG. 20) may include a linkage 360*a* coupled to the annular member 102 and extending into the internal passageway 104. The linkage 360*a* includes a cutting tool 360*b* extending toward the sacrificial support member 362. The cutting tool 360*b* may be operable to scrape the protective coating 362*a* from the sacrificial support member 362 in response to an object 360*c*, such as a ball or dart, moving through the internal passageway 104. In other exemplary embodiments, the linkage may be electronically or hydraulically actuated by a solenoid or piston (not shown).

Any of the actuators 356, 358 and 360 may be employed in conjunction with a galvanic corrosion system 330 (FIG. 16A) to accelerate the corrosion of the core 362*a* of the sacrificial support member 362. In some embodiments, any of the actuators 356, 358 and 360 may be employed with or without the galvanic corrosion system 330 to penetrate an external surface of the sacrificial support member 362 to structurally weaken, fully sever, buckle or otherwise induce failure of the sacrificial support member 362.

Figure 21A:
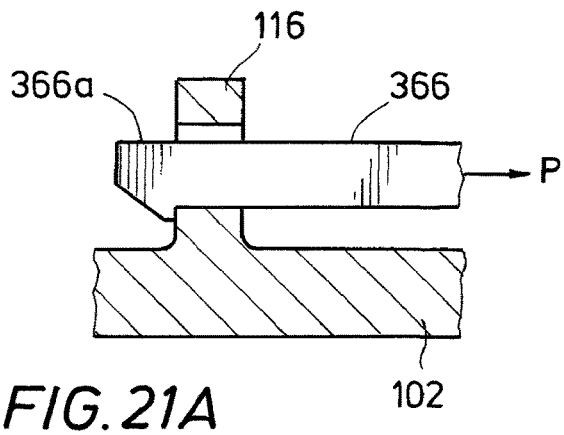
FIGS. 21A and 21B are schematic cross-sectional views of an adjustment mechanism including a latch member in respective latched and un-latched configurations in accordance with exemplary embodiments of the disclosure.
Figure 21B:
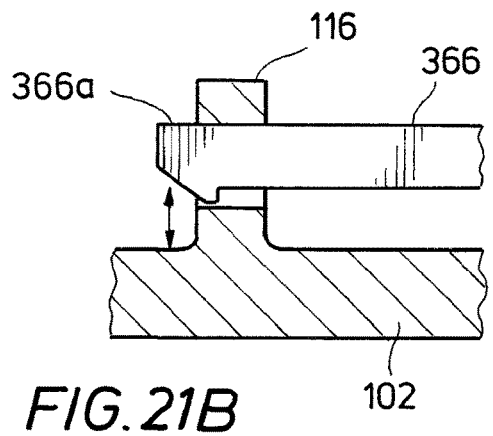

Referring to FIG. 21A through 21D, a sacrificial support member a 366 is illustrated with a latch 366*a* disposed at least one end thereof. The sacrificial support member 366 is operable to maintain a preload "P" in the annular member 102 while disposed in a latched position (FIG. 21A). In the latched position, the latch 366*a* may be engaged with the upper flange 116 as illustrated, and latched or fixedly coupled at a lower end (not shown) thereof to the lower flange 118 (FIG. 14A). Thus, in the latched position, the sacrificial support member 366 may be maintained in tension by the preload "P" to maintain the annular member 102 in a first operational configuration. The latch 366*a* is selectively movable to an unlatched position (FIG. 21B) to relieve the preload "P" and move the annular member 102 to a second operational configuration.

Various actuators may be provided to move the latch 366*a* from the latched position to the unlatched position one time while down-hole. In some embodiments, the latch 366*a* and the sacrificial support member 366 remain intact, and do not necessarily structurally or mechanically fail when moved to the unlatched position. Thus, the sacrificial support member 366 may be returned to the latched position, e.g., by returning the annular member 102 to the surface location "S" (FIG. 1), or by applying an appropriate weight on bit. As used herein, however, the term "failure" may include moving the latch 366*a* to the unlatched position at a down-hole location.

Figure 21C:
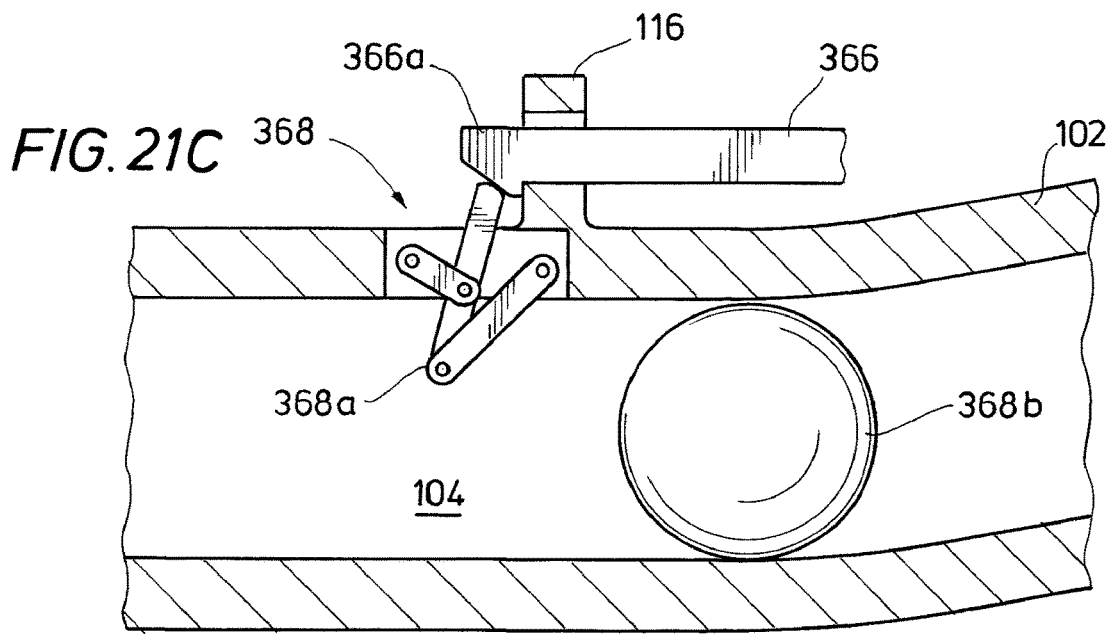
FIGS. 21C and 21D are cross-sectional views of a mechanical and fluidic actuator respectively for moving the latch member of FIGS. 21A and 21B from the latched to un-latched configurations in accordance with the disclosure.

As illustrated in FIG. 21C, an actuator 368 for moving the latch 366*a* from the latched to unlatched position may include a linkage 368*a* operatively coupled to the latch 366*a* and responsive to an object 368*b* moving through the internal passageway 104. The object 368*b* may include a ball, dart or other mass dropped through the drill string 18 (FIG. 1) from the surface location "S" (FIG. 1), and operates to engage the linkage 368*a* and push the linkage 368 radially outward to release the latch 366*a*.

Figure 21D:
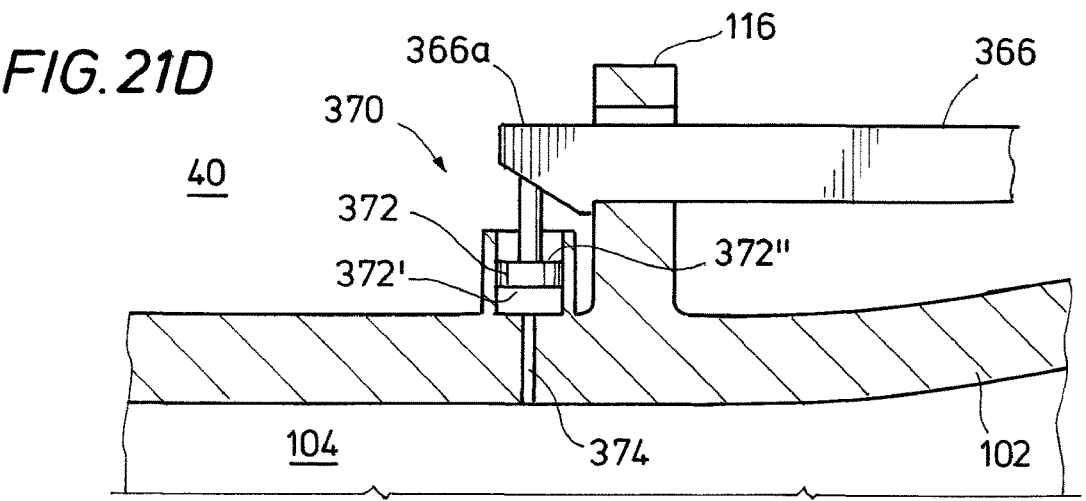

As illustrated in FIG. 21D, an actuator 370 may be provided for moving the latch 366*a* from the latched to unlatched position. The actuator 370 includes a piston 372 operably coupled to the latch 366*a* and responsive to a pressure differential between internal passageway 104 and the annulus 40. The piston 372 has a first pressure surface 372' in fluid communication with the internal passageway 104 through a passage 374 extending radially through the annular member 102. Thus, a fluid pressure within the internal passageway 104 pushes the piston 372 radially outward. The piston 372 has a second pressure face 372" in fluid communication with the annulus 40 such that a fluid pressure in the annulus 40 pushes the piston 372 radially inward. In operation, to transition the annular member 102 from the first operational configuration to the second operational configuration, an operator may increase the pressure in the internal passageway 104 to push the piston 372 and the latch 366a radially outwardly, and thereby release the latch 366a from the upper flange 116. In some embodiments, an operator at the surface location may increase the pressure in the internal passageway 104 by employing the mud pump 38 (FIG. 1) to increase the pressure of mud being pumped down-hole through the internal passageway 104.

Figure 22A:
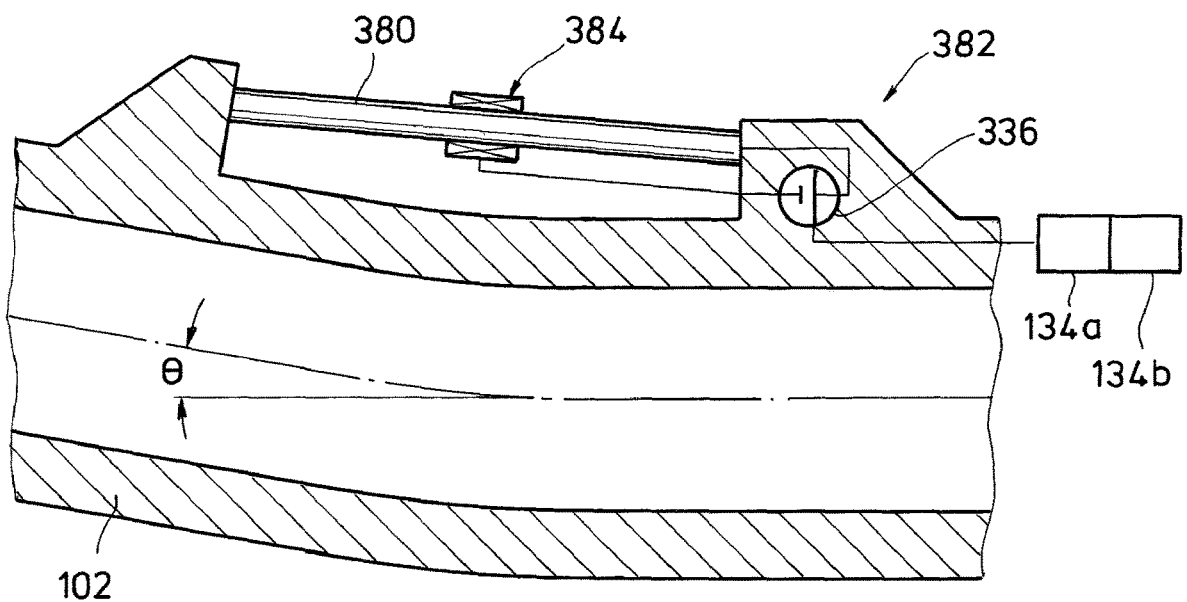
FIG. 22A is a schematic cross-sectional view of an adjustment mechanism including a thermal actuator for inducing failure in a sacrificial support members in accordance with exemplary embodiments of the disclosure.
Figure 22B:
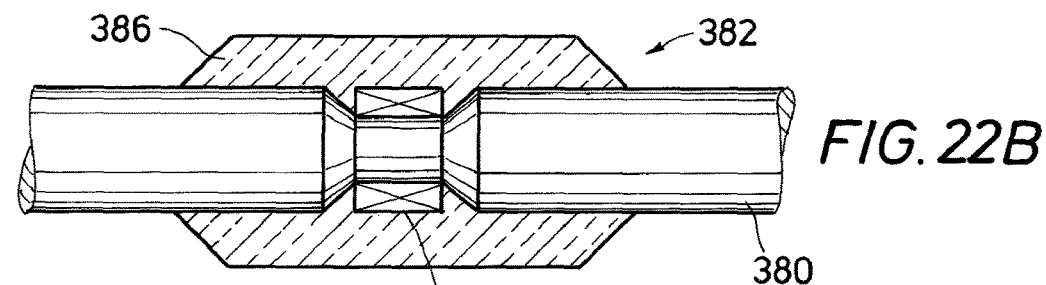
FIG. 22B is an enlarged cross-sectional view of an insulated heating sleeve of the thermal actuator of FIG. 22A.
Figure 23:
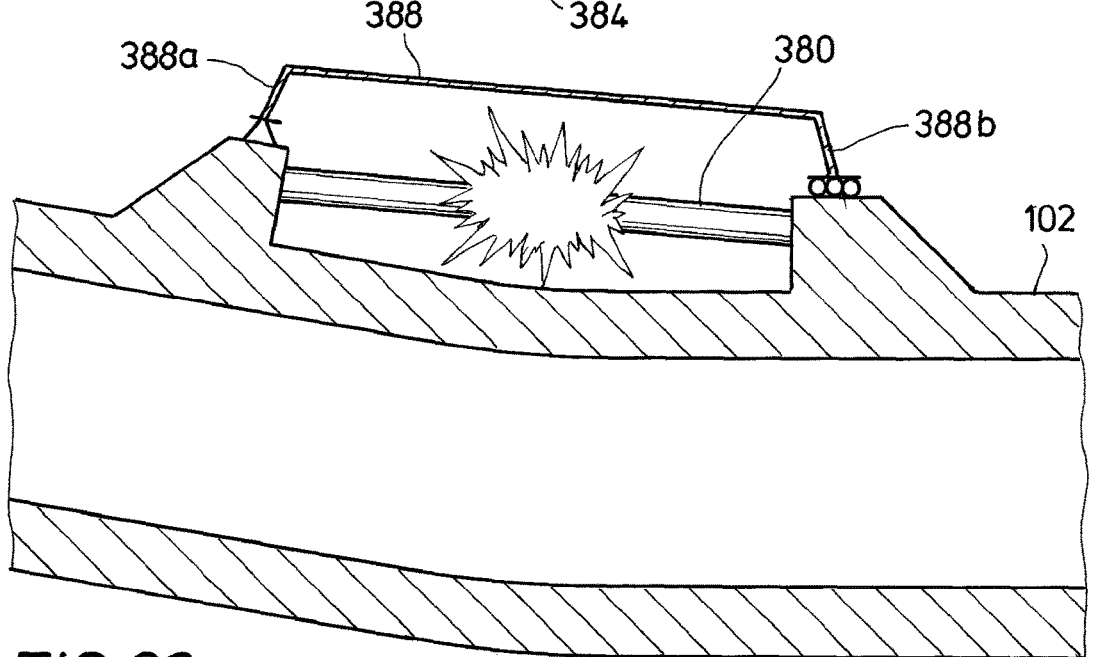
FIG. 23 is a cross-sectional side view of an adjustment mechanism including an explosive actuator for inducing failure in a sacrificial support member in accordance with exemplary embodiments of the disclosure.

Referring generally to FIGS. 22A through 23, thermal actuators may be employed to apply heat to sacrificial support members 380 to selectively induce failure therein. Thermal and structural analyses have been performed indicating that about a 10% reduction in yield strength may be observed by increasing the temperature of a steel member by about 350° C. from room temperature, e.g., about 22° C. Additional heating further reduces the yield strength at higher rates. In one or more exemplary embodiments, a sacrificial support member 380 may be designed with a safety factor of 1.1 to withstand the expected loading under normal operating conditions. When the bend angle θ is to be adjusted, the sacrificial support member 380 may be sufficiently heated to weaken the sacrificial support member 380 such that continued operation will cause failure of the sacrificial support member 380. In some embodiments, heat provided from the down-hole environment may be directed and/or be focused to the sacrificial support member 380, and in some embodiments, once the sacrificial support member 380 is sufficiently heated and weakened, a supplementary force may be supplied to facilitate failure of the sacrificial support member 380. For example, any of the actuators 356, 358 and 360 (FIGS. 18, 19 and 20, respectively) may be employed in conjunction with a thermal actuator described below.

As illustrated in FIGS. 22A and 22B, an actuator 382 may include a thermal sleeve 384 disposed on or adjacent the sacrificial support member 380. The thermal sleeve 384 may be selectively operated to produce and/or release heat to the sacrificial support member 380 and thereby structurally weaken the sacrificial support member 380. In some exemplary embodiments, the thermal sleeve 384 comprises a resistive heating element or coil that converts electricity passing therethrough into heat. In other embodiments, the thermal sleeve 384 may comprise an induction coil that excites eddy currents in the sacrificial support member 380 in response to an alternating current flowing through the thermal sleeve. The thermal sleeve 384 may be operably coupled to current source 336, communication unit 134a, and controller 134b. In some embodiments, the controller 134b includes a switch (not shown) that is operable from the surface location "S" (FIG. 1) to permit an operator to selectively trigger the thermal sleeve 384. To prevent heat loss from the sacrificial support member 380, a thermal insulation layer 386 may be provided over the thermal sleeve 384. The insulation layer 386 may extend over any portion of the sacrificial support member 380, or over the entire longitudinal length of the sacrificial support member 380.

Analysis has illustrated that where the sacrificial support member 380 is constructed of a cylindrical steel rod having a diameter of about 0.865 inches (about 22 mm) and a length of about 6.0 inches (15.2 cm), about 72.5 kJ are needed to induce a temperature change of 350° C. in the sacrificial support member 380. Where the current source 336 is a 24V battery, 72.5 kJ of heat may be generated with a 5 Amp current over a period of about 10 minutes. This timeframe is much less than would be required to withdraw the annular member 102 from the wellbore 12 (FIG. 1) to make an adjustment to the bend angle θ.

In other embodiments, the thermal sleeve 384 may comprise a thermite sleeve, which undergoes an exothermic oxidation reaction when ignited. In some embodiments, the oxidation reaction may release sufficient heat to fully sever the sacrificial support member 380, e.g., by heating the support member 380 to or above the melting point of the material from which the sacrificial support member 380 is constructed. In some embodiments, the oxidation reaction may release sufficient heat to weaken the sacrificial support member 380 to facilitate failure of the sacrificial support member 380 with a supplementary force. Thermite materials generally include a fuel such as aluminum, magnesium, titanium, zinc, silicon and boron, and also generally include an oxidizer such as boron oxide, silicon oxide, magnesium oxide iron oxide and copper oxide. The thermite material may be formed into the thermal sleeve 384, or may be contained within a tubular structure coupled to the sacrificial support member 380. Since the ignition temperature of a thermite material is generally high, in some embodiments, the thermal sleeve 384 may comprise a strip of magnesium ribbon to facilitate ignition of the thermite material. The strip of magnesium ribbon may be operatively coupled to the current source 336, communication unit 134a, and/or controller 134b for selective ignition thereof. In some exemplary embodiments, the magnesium ribbon may be selectively ignited with an electrically operated igniter (not shown), and heat generated from the ignited magnesium may be directed toward the thermite material for ignition thereof.

Although thermite materials are not generally explosive, in some embodiments, the thermal sleeve 384 may additionally or alternatively comprise an explosive material. As illustrated in FIG. 23, a controlled explosion may be induced to cause or facilitate failure of the sacrificial support member 380. In some embodiments, an explosive material may be incorporated into a thermal sleeve 384, and may include a shaped charge directed at the sacrificial support member 380. In some embodiments, a pyrotechnic pin or bolt may be employed. A pyrotechnic pin or bolt may be arranged in any manner that sacrificial support members 344 (FIGS. 17A through 17C) are arranged. The explosive material has been described herein as being incorporated into a "thermal" sleeve. However, one skilled in the art will recognize that a controlled explosion may generally impart mechanical force (pressure) to the sacrificial support member 380 to induce failure of the sacrificial support member 380, rather than inducing failure by the application of heat.

Where a controlled explosion is employed, a blast shield 388 may be coupled to the annular member 102 to isolate the effects of the explosion from the wellbore 12 (FIG. 1) and other components of the BHA 20. A first end 388a of the blast shield 388 may be pinned or longitudinally fixed with respect to the annular member 102 and a second end 388b may be coupled by a roller connection or other mechanism that allows for at least one generally longitudinal degree of freedom between the blast shield 388 and the annular member 102. Thus, the blast shield 388 will not impede deflection of the annular member 102 when the sacrificial support member 380 is caused to fail. The blast shield 388 may include, be part of, or share functionality with the protective cover 132 (FIG. 4) discussed above.

Referring now to FIG. 24A, an annular member 102 may define a plurality of bend angles $\theta_a, \theta_b, \theta_c \ldots \theta_n$ therein. Each of the bend angles $\theta_a, \theta_b, \theta_c \ldots \theta_n$ may be disposed along longitudinal axis $X_1$ and contribute to an overall or total bend angle $\theta_t$. Individual sets of upper flanges 116a, 116b, 116c . . . 116n (collectively or generally 116) and lower flanges 118a, 118b, 118c . . . 118n are provided on opposite longitudinal sides of each of the respective bend angles $\theta_a$, $\theta_b$, $\theta_c$ . . . $\theta_n$. Any of the support members described above, e.g., support members 120, 302, 320, 328, 332, 344 362, 366 380 (collectively or generally 120), may be provided between the flanges 116, 118. The longitudinally spaced support members 120 may each support a portion of a preload applied to the annular member 102.

According to at least one example simulated loading arrangement, a tensile pre-load of 50,000 lbs. may be maintained between upper and lower flanges 116a, 118a together with a tensile pre-load of 50,000 lbs. maintained between upper and lower flanges 116b, 118b. This loading arrangement may achieve a change in the total bend angle $\theta_t$ similar to the 0.4° change in the bend angle $\theta$ described above, which was achieved with the simulated tensile load of 100,000 lbs. Although the total loading is the same, localized stresses in the annular member 102 may be reduced by distributing the loading over the plurality of bend angles $\theta_a$, $\theta_b$ or over a larger longitudinal length of the annular member 102. In some exemplary embodiments, distributing the pre-load in this manner may facilitate maintaining stresses in the annular member 102 within an elastic range throughout the use of the annular member 102, and may permit larger operating loads (weight on bit, etc.) to be applied to a drill string 18 (FIG. 1). In some exemplary embodiments, distributing the loading may permit a greater total bend angle $\theta_t$ to be achieved. Also, in one or more exemplary embodiments, each of the support members 120 may be individually adjusted or induced to fail according to any of the methods and mechanisms described above such that the total bend angle bend angle $\theta_t$ may be adjusted.

As illustrated in FIG. 24B, in some exemplary embodiments a plurality of bend angles $\theta_a$, $\theta_b$, $\theta_c$ . . . $\theta_n$ may be defined in an annular member having an arrangement of nested upper and lower flanges 116, 118. At least one support member 120 is provided between upper flange 116a and lower flange 118a to maintain a pre-load in the annular member 102 and to define the bend angle $\theta_a$. Similarly, at least one support member 120 is provided between upper flange 116b and lower flange 118b to maintain a pre-load in the annular member 102 and to define the bend angle $\theta_b$. The upper flange 116b is disposed longitudinally between the upper and lower flanges 116a, 118a, and thus the support members 120 at least partially overlap in a longitudinal direction. This nested arrangement may permit the bend angles $\theta_a$, $\theta_b$, $\theta_b$, . . . $\theta_n$ to be disposed relatively close to one another in a longitudinal direction, and may permit the total bend angle $\theta_t$ to be defined in a relatively short annular member 102 with respect to the arrangement illustrated in FIG. 24A.

Figure 25A:
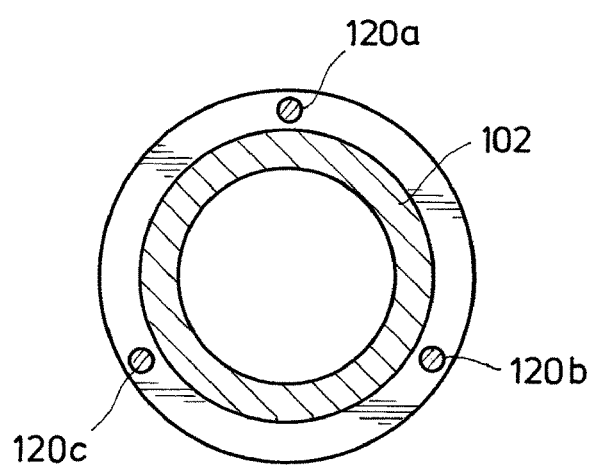
FIGS. 25A through 25D are cross-sectional top-views of a bent housing illustrating a procedure for sequentially failing a plurality of support members to in accordance with exemplary embodiments of the disclosure.

Referring now to FIGS. 25A through 25D, a plurality of radially spaced sacrificial support members 120a, 120b and 120c may be employed to influence the orientation of a bend axis $X_B$ defined in an annular member 102, and permit an adjustment of the bend angle $\theta$. Initially, as illustrated in FIG. 25A, each of the sacrificial support members 120a, 120b and 120c may be loaded in a balanced manner such that no deflection or bend angle is defined in the annular member 102. In some exemplary embodiments, each of the sacrificial support members 120a, 120b and 120c may be equally spaced around the annular member 102, and may be preloaded to impart an equal tensile load on upper and lower flanges 116, 118 (FIG. 14A). With the annular member 102 in a generally straight configuration, a vertical section 12a of a wellbore 12 (FIG. 1) may be expediently drilled.

Figure 25B:
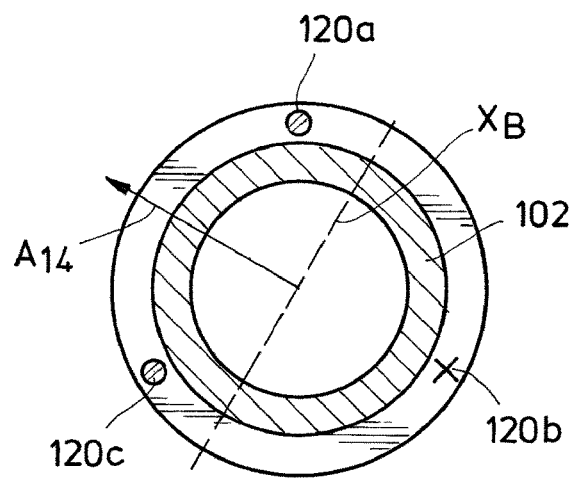

When a bend angle $\theta$ is to be defined in the annular member 102, e.g., to facilitate drilling a build section 12b of the wellbore 12 (FIG. 1), one or more of the sacrificial support members 120a, 120b and 120c may be induced to fail to thereby unbalance the pre-load on the annular member 102. For example, as illustrated in FIG. 25B, a single sacrificial support member 120b may be induced to fail (as indicated by the "X" mark) to relieve a portion of the preload on the annular member 102. Since the sacrificial support members 120a and 120c remain intact and continue to maintain a portion of the preload on the annular member 102, the annular member 102 is induced to bend about bend axis $X_B$ in a direction of arrow $A_{14}$ extending between the support members 120a, 120c. Under some loading arrangements, a first exemplary adjusted bend angle $\theta$ of about 0.7° may be established when the single sacrificial support member 120b is induced to fail. In some embodiments, the annular member 102 may be rotated (e.g. with the turntable 28 (FIG. 1) to orient the bend angle $\theta$ within the wellbore 12 (FIG. 1) to facilitate drilling in a particular direction.

Figure 25C:
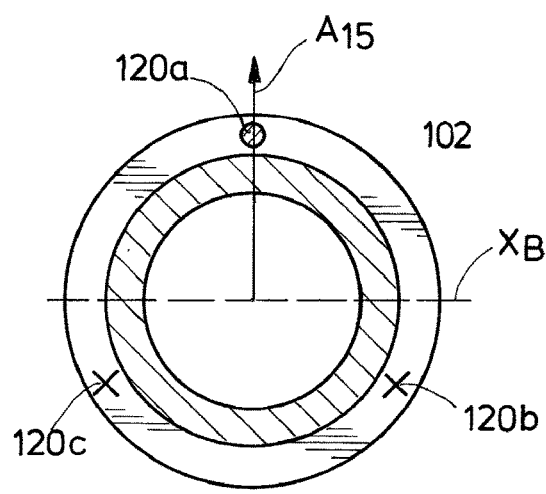
Figure 25D:
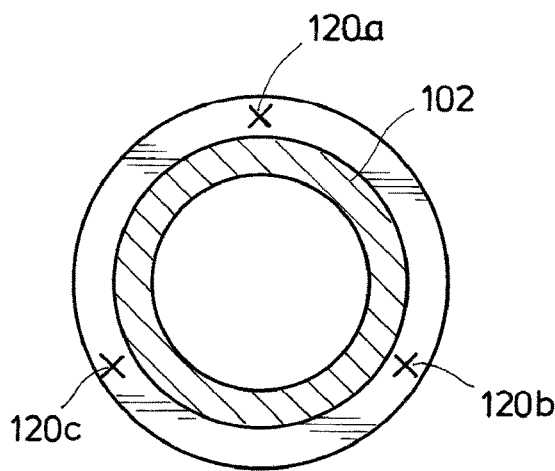

If the first adjusted bend angle $\theta$ of about 0.7° is appropriate, drilling of the build section 12b of the wellbore 12 (FIG. 1) may proceed. If the first adjusted bend angle $\theta$ of about 0.7° is too aggressive, a second exemplary adjusted bend angle $\theta$ may be established by selectively inducing a second sacrificial support member 120c to fail. As illustrated in FIG. 25C, when sacrificial support members 120b and 120c are induced to fail and sacrificial support member 120a remains intact, the annular member 102 is induced to bend about bend axis $X_B$ in a direction of arrow $A_{15}$ extending toward the support member 120a. Under some loading arrangements, the second exemplary adjusted bend angle $\theta$ may be about 0.4°. If appropriate, the build section 12b of the wellbore 12 (FIG. 1) may be drilled with the annular member 102 adjusted to the second adjusted bend angle $\theta$.

When the build section 12b of the wellbore 12 (FIG. 1) is complete, the annular member 102 may be returned to the generally straight configuration to facilitate drilling the tangent section 12c of the wellbore 12 (FIG. 1). As illustrated in 25D, each of the sacrificial support members 120a, 120b, 120c may be induced to fail to rebalance the loading on the annular member 102, e.g., by relieving the preload in each radial direction.

In some exemplary embodiments, additional sets of radially spaced sacrificial support members 120 (not shown) may be provided on an annular member 102 such that the adjustment of the bend angle $\theta$ described with reference to FIGS. 25A through 25D may be repeated. It should also be appreciated that the adjustment of the bend angle $\theta$ described with reference to FIGS. 25A through 25D may also be implemented by employing the adjustment mechanism 110 (FIG. 4) or any of the other adjustment mechanisms described above.

Figure 26A:
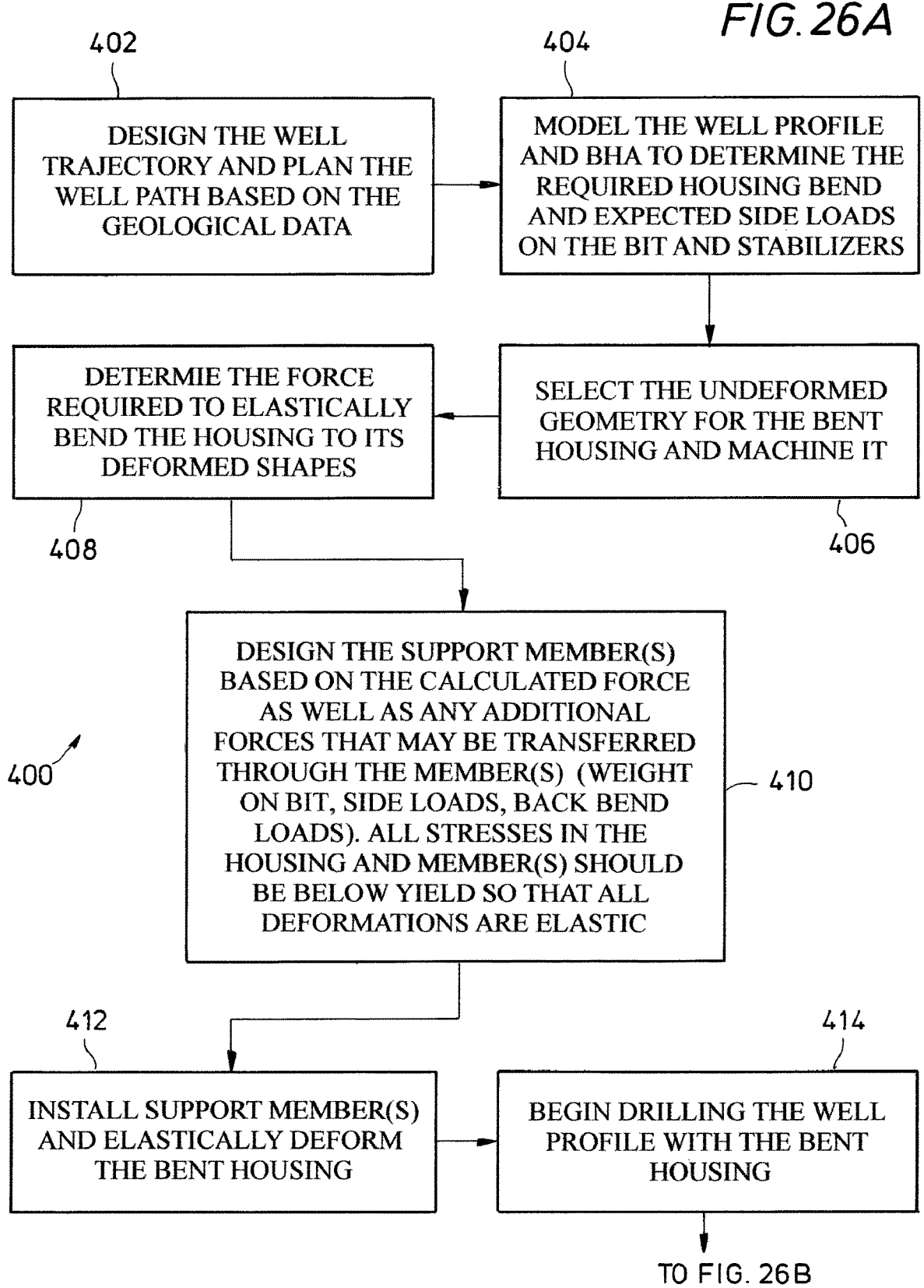
FIGS. 26A and 26B are a flowchart illustrating an operational procedure for forming and operating an adjustable drill string housing in accordance with example embodiments of the disclosure.
Figure 26B:
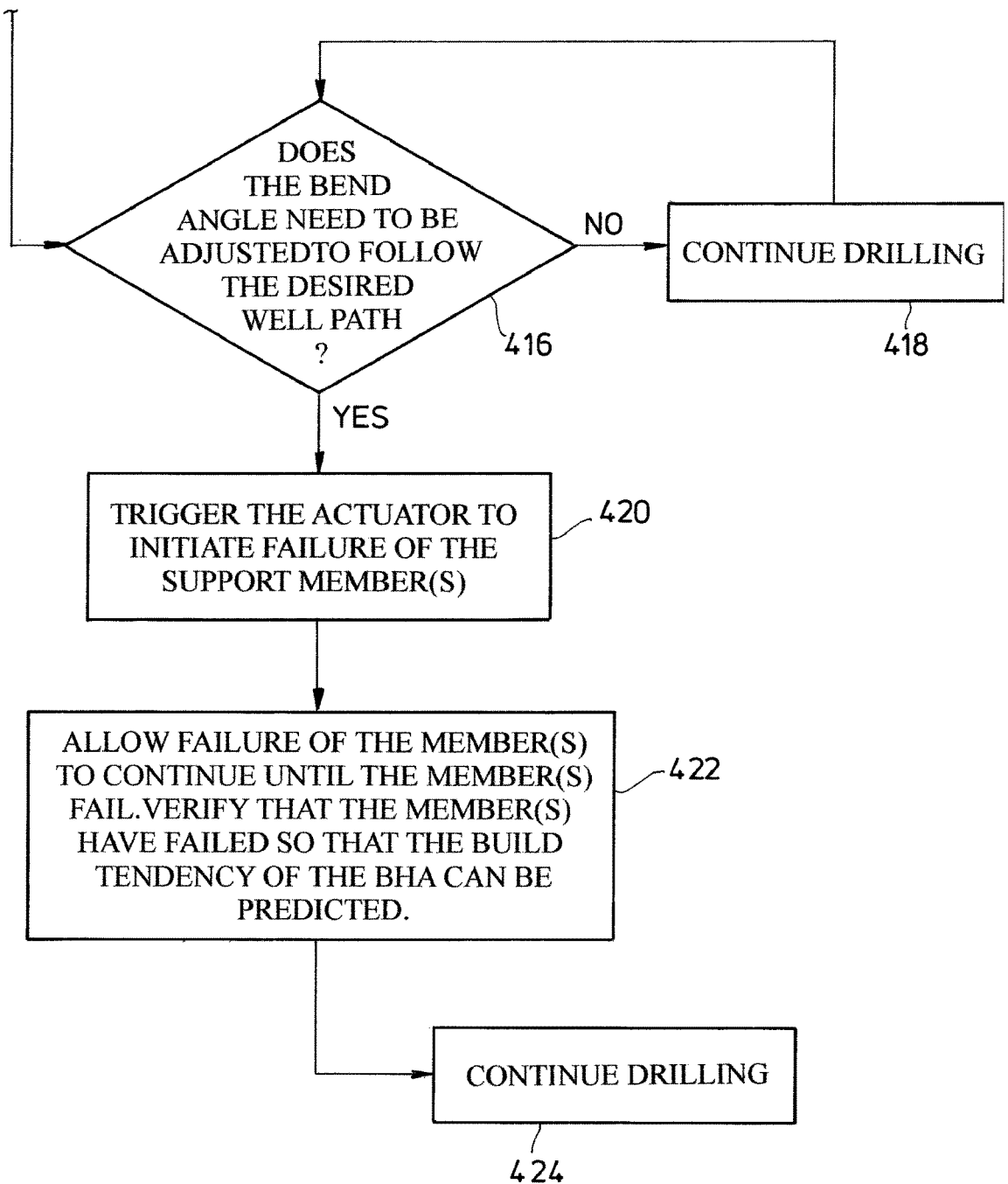

Referring now to FIGS. 26A and 26B, an operational procedure 400 illustrates example embodiments of drilling a wellbore 12 (FIG. 1) with an adjustable bent housing 100 (FIG. 2). The operational procedure 400 is similar to the operational procedure 200 (FIG. 12), but differs at least in that adjustments to the bend angle $\theta$ are implemented by selectively inducing failure in a sacrificial support member 120, or by activating another mechanism to implement an irreversible or one-time release of a preload imparted to an annular member 102.

Initially, at step 402, a well profile is planned through the geologic formation "G," and at step 404, the well profile, the a BHA 20 and the expected operational loads are modeled to determine the required bend angle θ or range of bend angles θ required for forming the wellbore 12. Next, an initial bend angle $θ_0$ for the BHA can be selected based on the planned well profile and the expected operational loads, and an annular member 102 having the selected initial bend angle $θ_0$ may be machined (step 406). Next, at step 408, the preload required to bend the annular member 102 to a deformed operational configuration shape is determined. One or more sacrificial support members 120 are designed (step 410) and installed (step 412) to maintain the annular member in the deformed operational configuration. In some embodiments, the support members 120 can be designed to maintain all forces in the support members 120 and the annular member 102 in an elastic range such that the BHA 20 may be reused.

Next, drilling may be initiated at step 414 with a drill string 18 (FIG. 1) provided with the BHA 20 supported at an end thereof. In one or more exemplary embodiments, the drilling may be initiated with the annular member 102 in the deformed operational configuration. At decision 416, the actual well profile of wellbore 12 being drilled is evaluated and compared to planned well profile to determine whether an adjustment to the bend angle θ would facilitate following the planned well profile.

When it is determined at decision 416 that no adjustment is required, the procedure 400 may proceed to step 418, where drilling continues with the annular member 102 in the deformed operational configuration. If it is determined at decision 416 that an adjustment to the bend angle θ would facilitate following the planned well profile, the procedure 400 proceeds to step 420. At step 420, an adjustment to the bend angle θ is triggered. In one or more exemplary embodiments, an adjustment mechanism is triggered to induce failure in the one or more sacrificial support members 120. The actuator may be employed to implement one or more of inducing disintegration of one or more of the disintegrating materials 302a, 302b, 302c (FIG. 13B), triggering corrosion of the disintegrable material or sacrificial support member 120 with a galvanic corrosion system 330 (FIG. 16A), mechanically cutting the sacrificial support member 120 with an electric motor 316a (FIG. 18), unlatching a latch 366a (FIGS. 21A through 21D), and/or employing any of the other mechanisms described herein. In one or more exemplary embodiments, inducing a failure in the one or more sacrificial support members 120 includes penetrating an exterior surface of the at least one sacrificial support member with a mechanical actuator, e.g., actuators 356 (FIG. 18), 358 (FIG. 19) and 360 (FIG. 20) to thereby structurally weaken or cut the sacrificial support member 120. In some exemplary embodiments a current source may be activated or interrupted to accelerate corrosion of the disintegrable material.

In some exemplary embodiments, inducing failure in the one or more sacrificial support members 120 may include applying compressive forces to the sacrificial support members 120, e.g., by employing the electric motor 124 (FIG. 4), or 172 to thereby induce buckling in the sacrificial support members. Next at step 422 the sacrificial support member 120 is permitted to fail, and the adjusted bend angle θ may be verified, e.g., by employing measurement mechanisms 138, 148. Drilling may then continue (step 424) along the planned well profile.

In some exemplary embodiments, the procedure 400 may return to decision step 416 from step 422 and/or step 424. For example, each of a plurality of sacrificial support members 120 may be individually induced to fail. A first sacrificial support member may be induced to fail while a second sacrificial support member remains intact. Subsequently, the second sacrificial support member 120 may be induced to fail to provide an additional bend angle θ, if it is determined at decision step 416 that additional adjustments are to be made.

Energy Delivery Systems for Adjustable Bent Housings

Referring now to FIG. 27, a bent drill string housing 500 includes an energy delivery system 502 for initiating or enhancing an adjustment of the bend angle θ defined by the annular member 102. To facilitate the adjustment in the bend angle θ, the energy delivery system 502 may deliver energy to a support member 504 to induce failure of the support member 504 and thereby release a preload in the annular member 102 as described above. The energy delivery system 502 comprises an energy reservoir 506 for an energy source coupled to the drill string housing 500 and disposed at a remote location with respect to a support member 504. The energy reservoir 506 may be disposed at a down-hole location with respect to the support member 504 as illustrated in FIG. 27, or any other remote location on the drill string housing 500. The remote location of the energy reservoir 506 facilitates relatively unimpeded flow of drilling mud 36 (FIG. 1) or other fluids around the drill string housing 500.

In some exemplary embodiments, the energy reservoir 506 contains a fluid such as the chemical solution "C." The chemical solution "C" may comprise a corrosion accelerant containing oxygen molecules, hydrogen ions and other metallic ions. As described above, in some exemplary embodiments, the chemical solution "C" may comprise a corrosion accelerant such as nitric acid. The energy delivery system 502 may be operable to selectively deliver the chemical solution "C" to a sealed, semi-sealed or unsealed corrosion chamber 510 defined between upper and lower flanges 116, 118. In some embodiments, protective cover 132 may form a seal or partial seal with the upper and lower flanges 116, 118.

An initiator is provided that is selectively operable to promote fluid flow through a fluid conduit 514 extending between the energy reservoir 506 and the corrosion chamber 510. In some embodiments, the initiator may include an electric pump 512 operatively coupled to communication unit 134a and controller 134b to permit selective activation of the electric pump 512 from a surface location "S" (FIG. 1).

In exemplary embodiments of operation, when an adjustment to the bend angle θ is to be implemented, an instruction signal may be transmitted from the surface location "S" (FIG. 1) to the communication unit 134a that may be recognized by the controller 134b. In response to receiving the instruction signal, the controller 134b may initiate a predetermined sequence of instructions stored thereon, which cause the electric pump 512 to operate to deliver the chemical solution "C" to the corrosion chamber 510. The rate at which the chemical solution "C" is delivered to the corrosion chamber 510 may be regulated by the electric pump 512 and controller 134b to control the rate of corrosion of the support member 504. Corrosion of the support member 504 is thereby accelerated, and the support member 504 may be permitted to fail. At least a portion of a preload maintained in the annular member 102 may thereby be released to adjust the bend angle θ. The adjusted bend angle θ may be verified, e.g., by querying a measurement mechanism 138, 148 (FIGS. 5 and 6). In response to verifying the adjustment to the bend angle θ, the predetermined sequence of instructions may adjust operation of the pump 512, e.g., to slow or cease operation thereof.

To further accelerate failure of the support member 504 by corrosion, a target area 514 may be defined on the support member 504 as illustrated in FIGS. 28A and 28B. The corrosive chemical reactions may be concentrated at the target area 514 rather than distributed over an entire surface area of the support member 504 to accelerate failure of the support member 504. The target area 504 may be arranged as an annular band circumscribing the support member 504 to facilitate corrosion in multiple directions around the support member 504. As illustrated in FIG. 28B, the annular band may be comprise a plurality of discrete regions 514a, 514b radially spaced from one another around the support member 504. In some embodiments, the target area 514 may be constructed of a material, or coated with a material, that is matched with the particular chemical solution "C" delivered by the electric pump 504. For example, the target are 514 may comprise a passive oxide layer as described above with reference to FIGS. 18-20). In some embodiments, the target area 514 may be coated with a coating that degrades when exposed to the chemical solution "C," and a remainder 516 of the surface area of the support member 504 may be coated with a material that is resistant to corrosion when exposed the chemical solution "C."

Figure 29A:
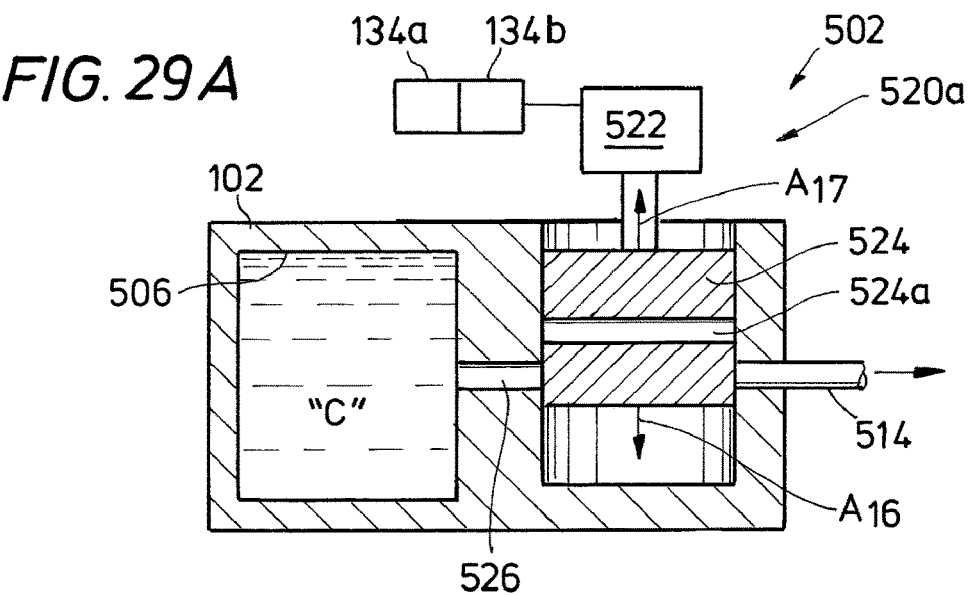
FIGS. 29A through 29C are cross-sectional schematic side-views of energy delivery systems including a gate valve operable to selectively release a fluid from a reservoir.
Figure 29B:
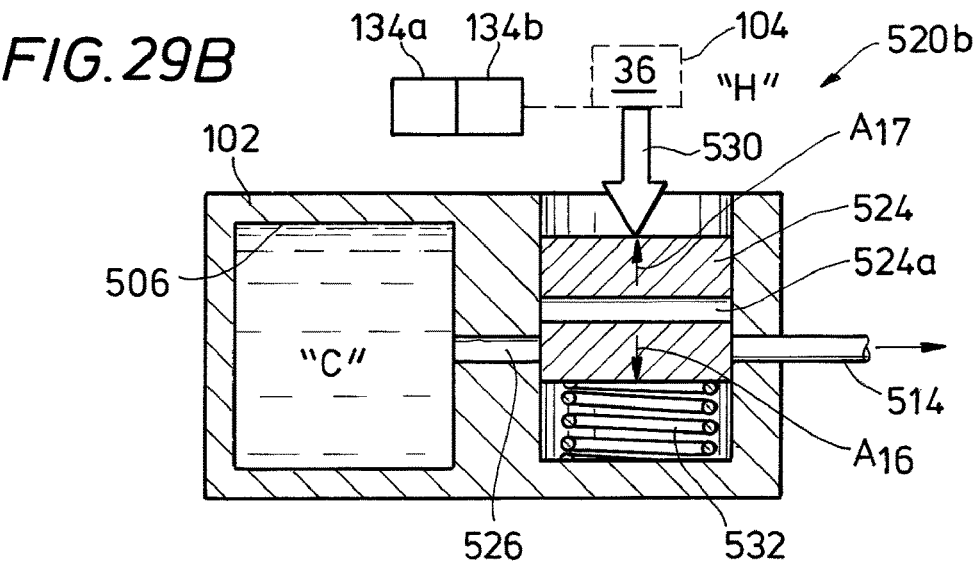
Figure 29C:
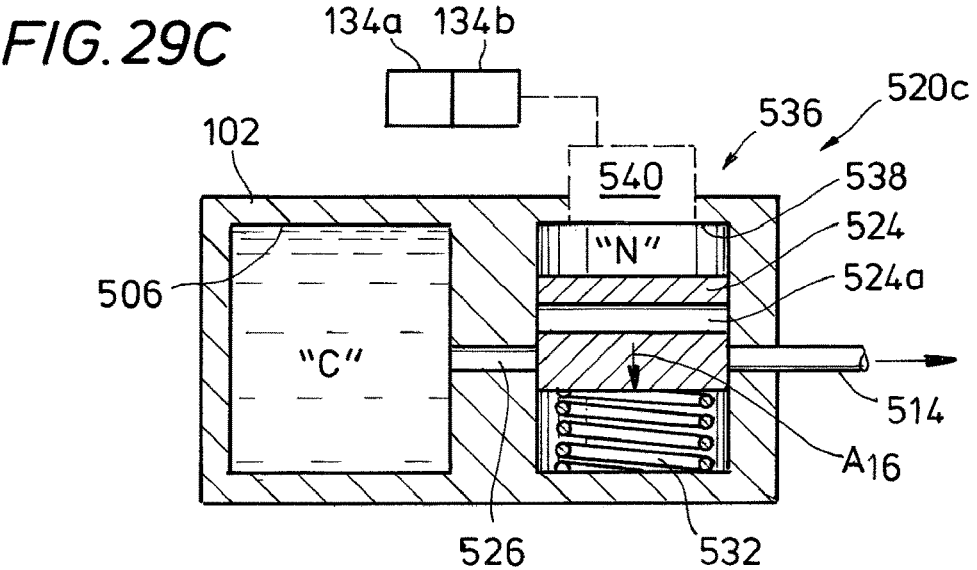

Referring to FIGS. 29A through 29C, the initiator of the energy delivery system 502 may include a remotely actuated valve 520a, 520b, 520c operable to release the chemical solution "C" from the energy reservoir 506. As illustrated in FIG. 29A, in some exemplary embodiments, the remotely actuated valve 520a may comprise an electromechanical actuator 522 operably coupled to the communication unit 134a and controller 134b for selective operation thereof. In some exemplary embodiments, the electromechanical actuator 522 may include an electric motor (not shown) coupled to a screw drive (not shown), solenoids (not shown), linear induction motors (not shown), and/or other electrically operable linear actuators recognized in the art. The electroechanical actuator 522 is operable to move a piston 524 in the directions of arrows $A_{16}$ and $A_{17}$. Thus, a channel 524a defined through the piston 524 may be moved into and out of alignment with a fluid passage 526 coupled energy reservoir 506 and the fluid conduit 514 extending to the corrosion chamber 510 (FIG. 27). In some embodiments, the chemical solution "C" is pressurized within the energy reservoir 506 such that an internal pressure drives the chemical solution "C" through the fluid conduit 514 and into the corrosion chamber 510 (FIG. 27) in response to movement of the channel 524a into alignment with the fluid passage 526 and the fluid conduit 514. In some exemplary embodiments, the movement of the chemical solution "C" through the fluid conduit 514 may be assisted by the electric pump 512 (FIG. 27).

As illustrated in FIG. 29B, in some exemplary embodiments, the remotely actuated valve 520b may comprise a hydraulic actuator 530 operable to urge the piston 524 in the direction of arrow $A_{16}$. In some exemplary embodiments, the hydraulic actuator 530 may comprise a fluidic connection to a source of hydraulic fluid "H" such as drilling mud 36 flowing through the drill string 18 (FIG. 1) and/or the annulus 40 (FIG. 1). The hydraulic fluid "H" may be in direct contact with the piston 524, or may be operably coupled thereto through an intermediate mechanism (not shown). In some exemplary embodiments, a biasing member 532 is provided to urge the piston 524 in the direction of arrow $A_{17}$. The biasing member 532 may comprise a compression spring, a stack of spring washers or other mechanisms recognized in the art.

A biasing force provided by the biasing member 532 defines the hydraulic pressure required for the hydraulic actuator 530 to move the piston 524 sufficiently in the direction of arrow $A_{16}$ to an aligned position, e.g., a position with the channel 524a aligned with the fluid passage 526 and the fluid conduit 514 in which the chemical solution "C" may be released from the energy reservoir 506. Since the pressure of the drilling mud 36 may generally be a function of the depth of the wellbore 12 (FIG. 1), the biasing force provided by biasing member 532 may be selected to induce movement of the piston 524 to the aligned position at a predetermined depth in the wellbore 12 (FIG. 1). Thus, the hydraulic actuator 530 may be operable to passively provide the chemical solution "C" to the corrosion chamber 510 (FIG. 27) thereby inducing failure of the support member 504 (FIG. 27) and effecting an adjustment of the bend angle θ. For example, delivery of the hydraulic actuator 530 to a predetermined depth in the wellbore 12 (FIG. 1) may induce the adjustment in the bend angle θ with no further instruction from an operator.

In some exemplary embodiments, the hydraulic actuator 530 may additionally or alternatively comprise a single or dual action hydraulic cylinder (not shown) coupled to communication unit 134a and controller 134b for selective movement of the piston 524 in the direction of arrows $A_{16}$ and $A_{17}$. Thus, the hydraulic actuator 530 may be actively controlled by an operator at the surface location "S" (FIG. 1).

As illustrated in FIG. 29C, in some exemplary embodiments, the remotely actuated valve 520c may comprise a thermal actuator 536. The thermal actuator 536 comprises a thermal expansion chamber 538 that is sealed or fluidly isolated within the annular member 102. The thermal expansion chamber 538 may be charged or filled with a compressible and generally inert fluid. In some embodiments, the fluid can be a liquid such as water, and in some embodiments the fluid may be a gas such as such as gaseous argon or nitrogen "N." The nitrogen "N" or other compressible fluid will expand when heated to move the piston 524 in the direction of arrow $A_{16}$ against the bias of the biasing member 532. As described above, movement of the piston 524 into alignment with the fluid passage 526 and the fluid conduit 514 releases the chemical solution "C" to the corrosion chamber 510 (FIG. 27). The nitrogen "N" or other compressible fluid may be passively heated by the down-hole environment, and/or may optionally be actively heated by a heater 540. The heater 540 may comprise an electric resistance heater operably coupled to the communication unit 134a and controller 134b for selective activation thereof.

Figure 30A:
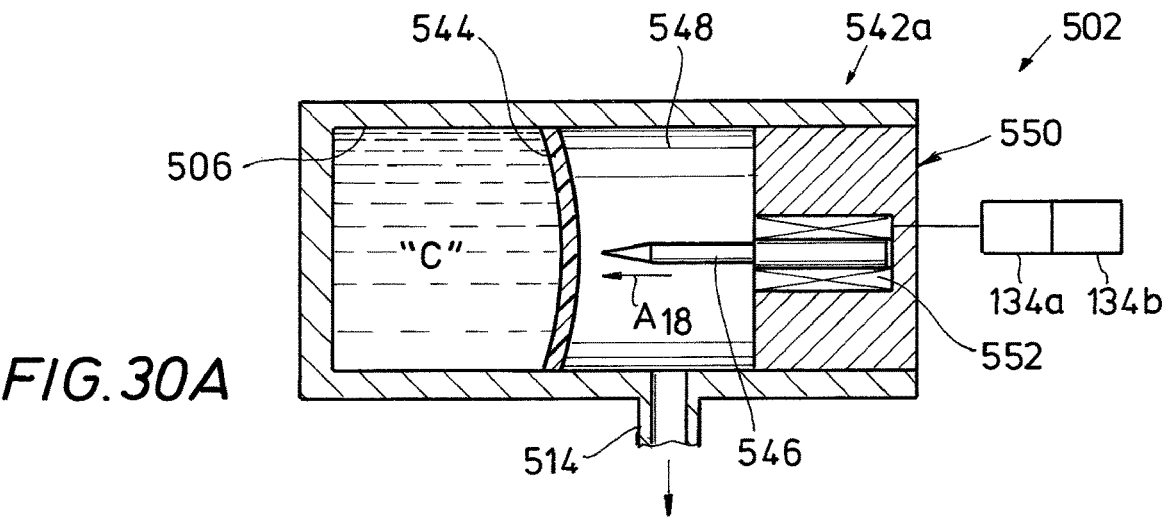
FIGS. 30A through 30C are cross-sectional schematic side-views of energy delivery systems including a puncturing tool for selectively releasing fluid from a reservoir.
Figure 30B:
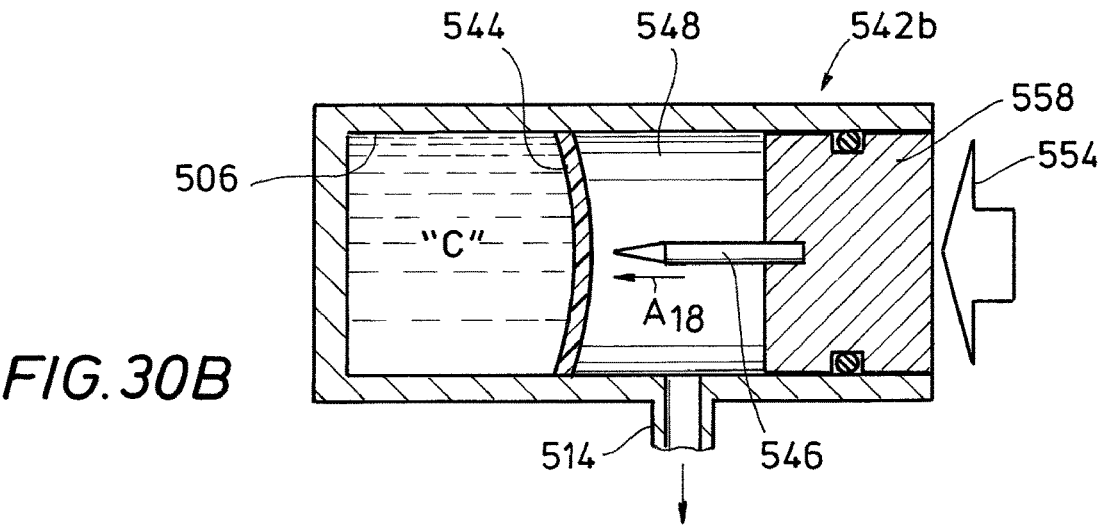
Figure 30C:
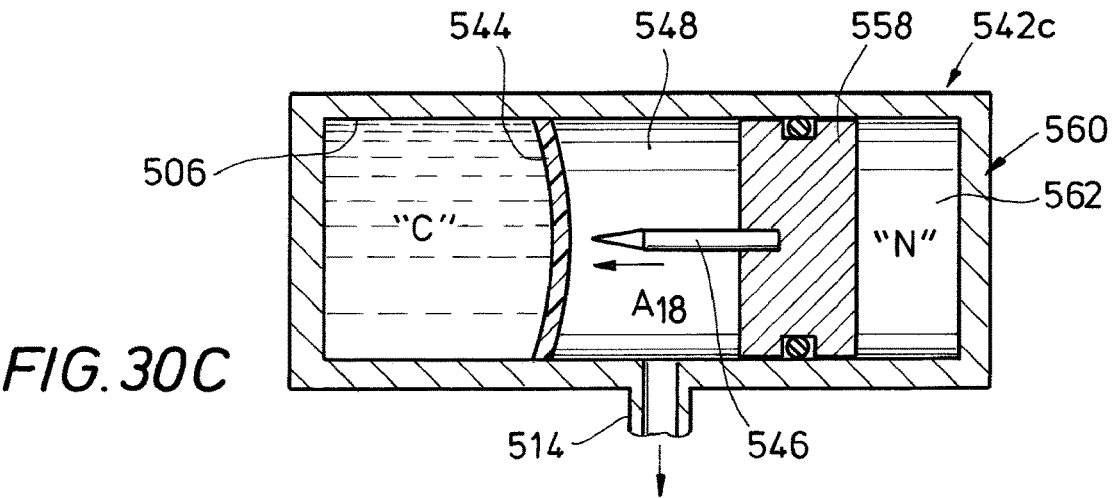

Referring to FIGS. 30A through 30C, the energy delivery system 502 may include a remotely actuated valve 542a, 542b, 542c operable to release the chemical solution "C" from the energy reservoir 506. The remotely actuated valves 542a, 542b, 542c each include a diaphragm 544 that may be selectively ruptured with a rupturing tool 546. The diaphragm 544 defines a boundary of the energy reservoir 506 and maintains the fluid within the energy reservoir 506. Rupturing the diaphragm 544 releases the chemical solution "C" into a rupture chamber 548, which is in fluid communication with the corrosion chamber 510 (FIG. 27) through fluid conduit 514. Thus, the chemical solution "C" may be selectively provided to the corrosion chamber 510 (FIG. 27) by rupturing the diaphragm 544. In some exemplary embodiments, the rupturing tool 546 may be a pin, needle or knife that is selectively movable in the direction of arrow $A_{18}$ toward the diaphragm 544.

In some exemplary embodiments, the rupturing tool 546 may be operatively coupled to any of the types of actuators described above for moving the piston 524 (FIGS. 29A through 29C). For example the rupturing tool 546 may be operatively coupled to an electromechanical actuator 550 (FIG. 30A), which may comprise a solenoid 552 coupled to the communication unit 134a and controller 134b for selectively moving the rupturing tool 546 in the direction of arrow $A_{18}$. In some other exemplary embodiments, a hydraulic actuator 554 (FIG. 30B) may be provided that is operable to move a piston 558 and the rupturing tool 546 together. The piston 558 may be exposed to a hydraulic fluid "H" such as drilling mud 36 to urge rupturing tool 546 in the direction of arrow $A_{18}$. As illustrated in FIG. 30C, a thermal actuator 560 may include a thermal expansion chamber 562 charged with a compressible fluid such a nitrogen "N." A piston 564 may be responsive to temperature increases of the nitrogen "N" to move the piston 558 and rupturing tool 546 in the direction of arrow $A_{18}$.

Figure 31A:
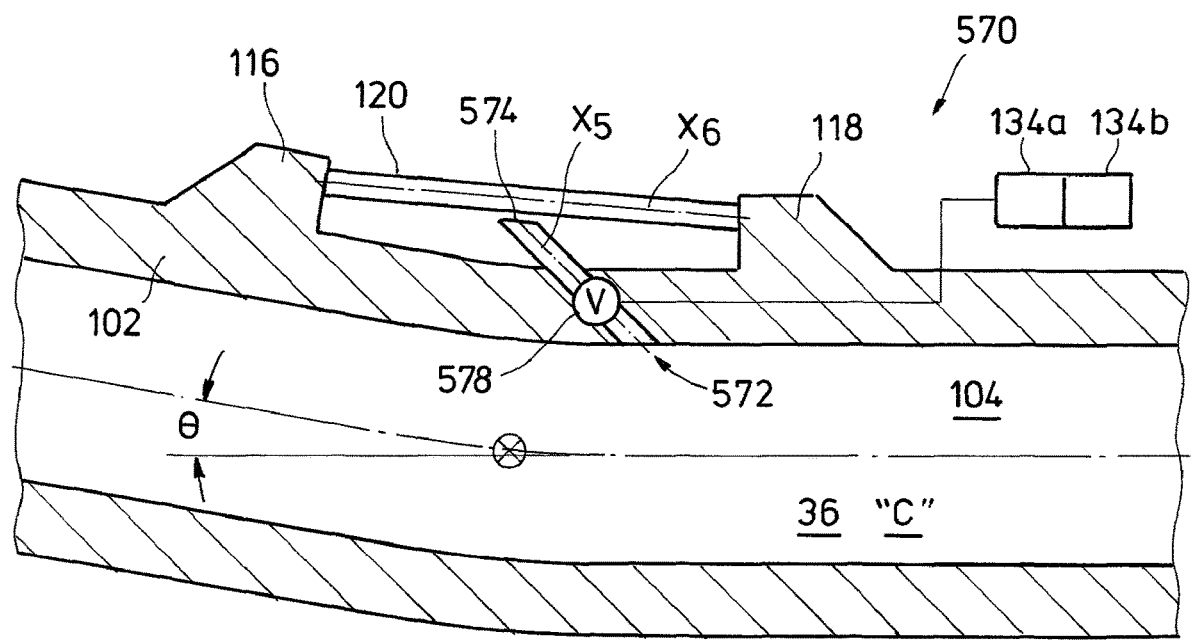
FIGS. 31A and 31B are cross-sectional schematic side-views of an energy delivery system including a check valve for selectively releasing fluid from an internal passageway of a bent housing to a target area of a support member in accordance with example embodiments of the present disclosure.
Figure 31B:
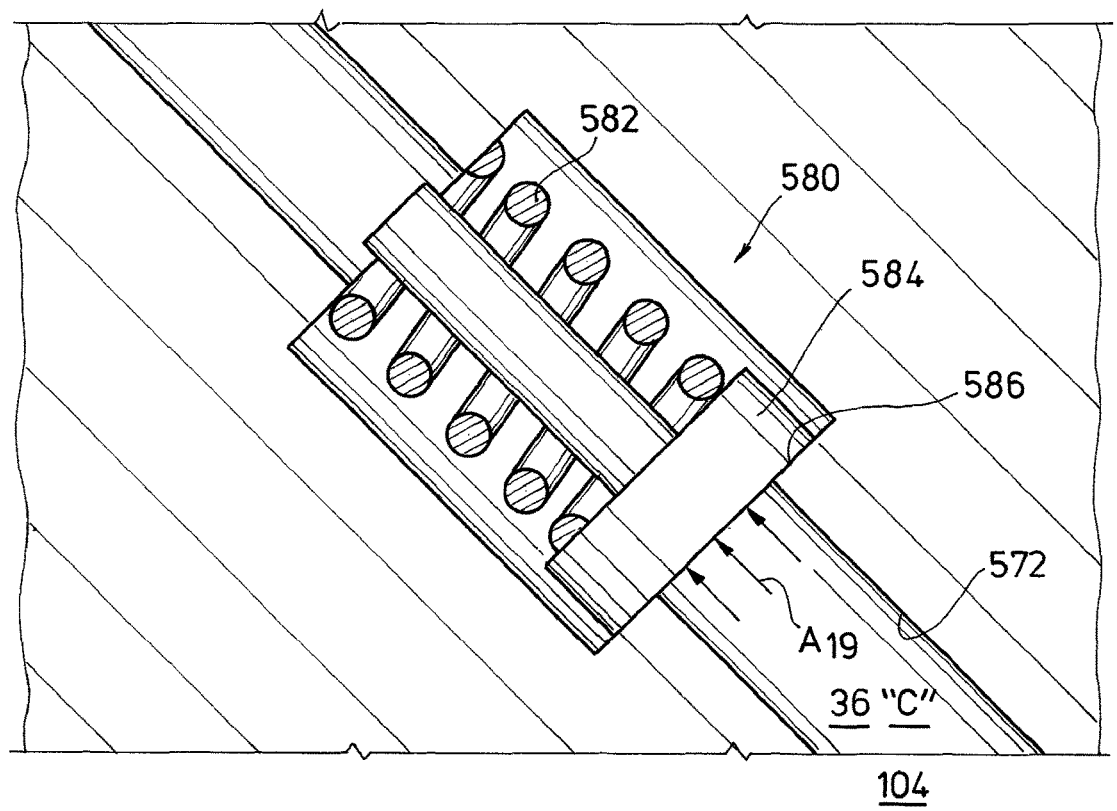

Referring to FIGS. 31A and 31B, energy delivery system 570 directs energy from the internal passageway 104 to a support member 120 to facilitate an adjustment to the bend angle θ. The energy delivery system 570 includes a radial flow passage 572 extending through a sidewall of the annular member 102. The radial flow passage 572 is a fluid conduit extending between the internal passageway 104 and an exterior of the annular member 102 between the upper and lower flanges 116, 118. In some exemplary embodiments, an axis $X_5$ of the radial flow passage 572 intersects a longitudinal axis $X_6$ of the support member 120. Drilling mud 36 and/or chemical solution "C" may be diverted from the internal passageway 104 through the radial flow passage 572 to accelerate erosion and corrosion support member 120. Generally in drilling operations, an internal pressure within the internal passageway 104 will be greater than an external pressure of the annular member 102. The energy associated with the higher pressure on fluids 36, "C" within the internal passageway 104 may be delivered to the support member 102 to abrasively erode the support member 102 or to accelerate corrosion thereof. An exit 574 of the radial flow passage 572 may include a nozzle or other flow control tool, which focuses the fluidic energy on the targeted support member 120.

An initiation valve 578 may be provided within the radial flow passage 572 to obstruct fluid flow through the radial flow passage 572 until an adjustment of the bend angle θ is to be made. In some embodiments, the initiation valve 578 may include an electronically operable valve coupled to the communication unit 134 and controller 134b such that the initiation valve 578 is responsive to an instruction signal to selectively permit and restrict fluid flow through the radial flow passage 572. In some exemplary embodiments, the initiation valve 578 may be a rupture disk responsive to an increase in pressure within the internal passageway 104. Thus, temporarily increasing the pressure within the internal passageway 104, e.g., using mud pump 38 (FIG. 1), may serve to rupture the rupture disk, and thereby divert drilling mud 36 and/or chemical solution "C" through the radial flow passage 572.

Referring to FIG. 31B, with continued reference to FIG. 31A, in some exemplary embodiments, a check valve 580 may be provided within the radial flow passage 572. The check valve 580 may include a biasing member 582 that maintains a piston 584 in a seated position within the radial flow passage 572. When an adjustment to the bend angle θ is to be made, the pressure of drilling mud 36 or chemical solution "C" may be increased within the internal passageway 104. The pressure may be increased, e.g., by operating the mud pump 38 (FIG. 1) at an increased capacity. The increased pressure in the internal passageway 104 counteracts a biasing force of the biasing member 582, and moves the piston 584 in the direction of arrow $A_{19}$. The piston 584 moves to an unseated position, e.g., away from valve seat 586, thereby permitting fluid flow through the radial flow passage 572. Erosion and/or corrosion of the support member 120 may then be facilitated by the drilling mud 36 or chemical solution "C" until the support member 102 fails, and the bend angle θ is adjusted. Once the support member 120 fails, the mud pumps 38 (FIG. 1) may be operated at lower or nominal capacity to decrease the pressure in the internal passageway 104, and return the piston 584 to the seated position under the bias of the biasing member 582. Thus, the mud pumps 38 (FIG. 1) may again operate at a nominal capacity once the support member 120 has failed, thereby permitting continued drilling under nominal operational characteristics with the bottom hole assembly 20 (FIG. 2).

Directional Drilling with Adjustable Bent Housings

Figure 32C:
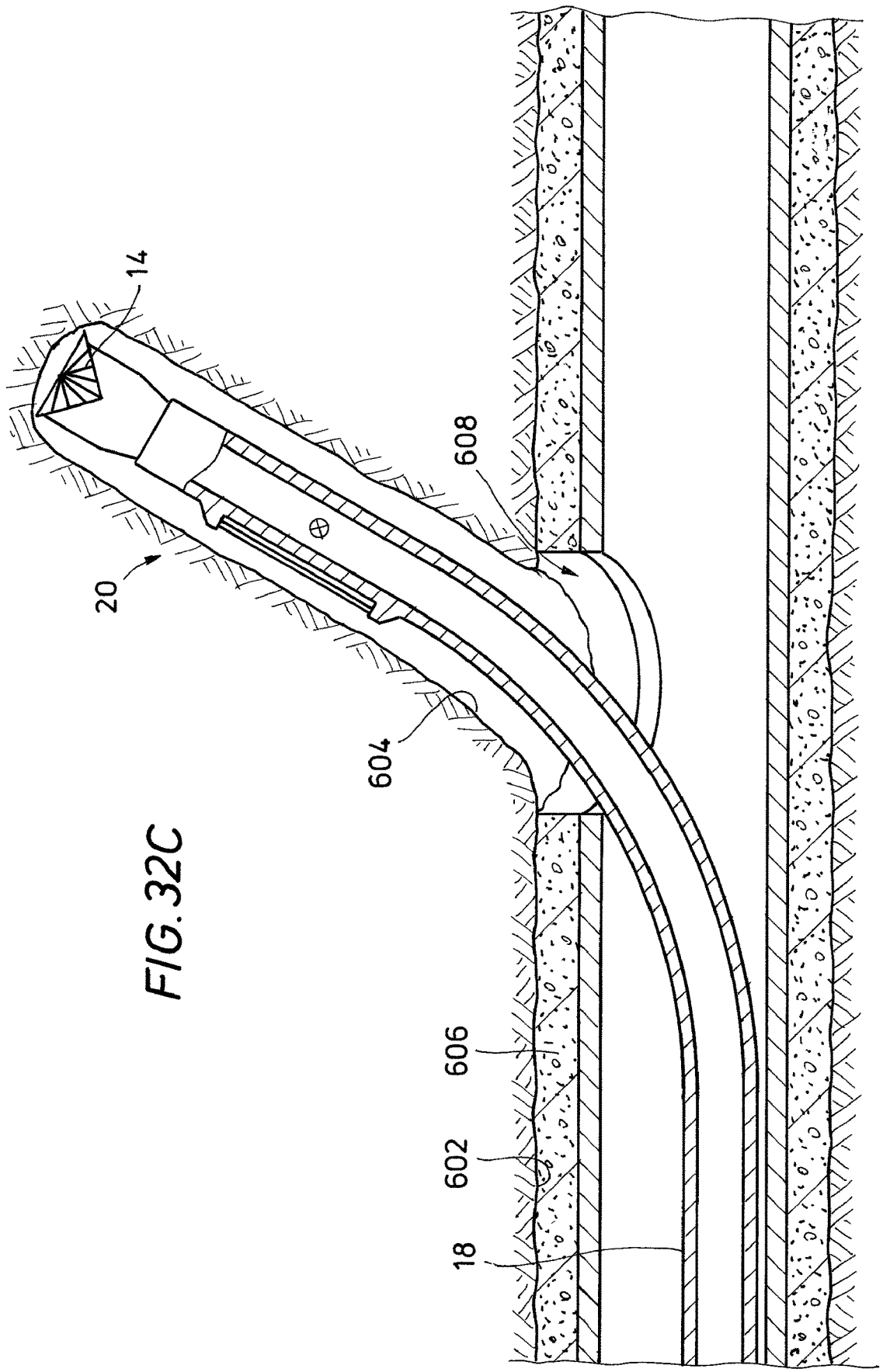

Referring to FIGS. 32A through 32C, the drill string 18 may be deployed in main wellbore 602 to form a branch wellbore 604 extending laterally therefrom. Drilling operations often include forming branch or lateral wellbores, and one difficulty in these operations encouraging a BHA 20 to extend from the main wellbore 602 at the correct location to drill the branch wellbore 604. To facilitate initiating the branch wellbore 604 at the correct location, a casing 606 having a window 608 formed therein is provided in the main wellbore 602. In some embodiments, the casing 606 is secured within the geologic formation "F" by an annular cement layer 610. The window 608 may be difficult to locate with conventional drilling equipment. However, a BHA 20 including any one of the adjustable drill string housings described herein may facilitate locating the window 608. For example, with an adjustable drill string housing, the BHA 20 may be run into the main wellbore with a relatively large or steep bend angle θ to facilitate locating the window 608, and thereafter, the bend angle θ may be reduced to relieve internal stresses in the BHA 20 and improve the reliability of the drilling operations.

The BHA 20 may be run into the main wellbore 602 on drill string 18. In some exemplary embodiments, the BHA 20 may be run into the main wellbore 602 while a lateral separation is maintained between the drill bit 14 and the casing 606, and when the BHA 20 is approaches the window 608 (FIG. 32A) an adjustment can be made to induce lateral contact between the drill bit 14 and the casing 606. For example, in some embodiments, the BHA 20 may be positioned at a location up-hole of the widow 608 when an adjustment mechanism, e.g., the adjustment mechanism 110 described above with reference to FIG. 4, may be employed to increase the bend angle θ until the drill bit 14 contacts the casing 606. In some exemplary embodiments, the bend angle θ may be increased by transmitting an instruction signal to the communication unit 134a (FIG. 4) that may be recognized by the controller 134b (FIG. 4). In response to receiving the instruction signal, the controller 134b may initiate a predetermined sequence of instructions stored thereon which cause the electric motor 124 (FIG. 4) to operate and thereby adjust an internal stress in support member 120 as described above. The change in the internal stress in the support member 120 may induce the bend angle θ to adjust until the drill bit 14 laterally contacts the casing 208. In some embodiments, the internal stresses imparted to the support member 120 induce elastic deformation such that internal stresses are reversible. In some embodiments, an actuator other than the electric motor 124 (FIG. 4) may be responsive to the instruction signal to induce the change in the internal stresses of the support member 120. For example, the actuator may include a hydraulically actuated piston 166 (FIG. 8), and/or a thermally actuated sleeve 120e" (FIG. 11). In some embodiments, an exterior-angle radial side of the annular member 102 may also contact an opposite side of the casing 606.

An operator at the surface location "S" (FIG. 1) may confirm that the drill bit 14 is in contact with the casing by 606 by moving the drill string 18, e.g., along longitudinal axis $X_7$ of the main wellbore 602. The operator may detect an increased resistance to axial motion due to the frictional contact between the drill bit 14 and the casing 606. In some other embodiments, the operator may determine that the drill bit 14 is in contact with the casing 606 by monitoring a measurement mechanism, e.g., measurement mechanism 138 (FIG. 5). For example, the measurement mechanism 138 (FIG. 5) may be queried until a predetermined bend angle θ is detected.

In some exemplary embodiments, the BHA 20 may be run into the main wellbore 602 with the drill bit 14 in lateral contact with the casing 606. For example, annular member 102 may be provided in a pre-stressed configuration maintained by a sacrificial support member 120, and the sacrificial support member 120 may maintain a bend angle θ that sufficiently large to cause the lateral contact.

With the drill bit 14 in contact with casing 606, the drill string 18 may be advanced into the main wellbore 602 in the direction of arrow $A_{20}$. In some embodiments, the drill string 18 may also be rotated, e.g., about axis $X_7$ to facilitate locating the window 608. When the drill string 18 reaches the window 608 (FIG. 32B), the drill bit 14 may deflect laterally into the window 608, thereby relieving the lateral contact between the drill bit 14 and the casing 606. The deflection of the drill bit 14 into the window 608 facilitates detection of the window 608 from the surface location "S." The relief of the lateral contact can be detected since, e.g., the resistance to axial motion will decrease, and in some embodiments, the bend angle θ may change when the drill sting 18 is no longer laterally constrained within the casing 606. The operator may expediently detect these changes to confirm that the window 608 has been reached, and that the drill bit 14 is in position for drilling the branch wellbore 604.

With the drill bit 14 within the window 608, the operator may initiate an alteration of the bend angle θ to define a direction of the branch wellbore 604. The operator may alter the bend angle θ prior to commencing drilling the branch wellbore 604, or in some embodiments, may commence drilling the branch wellbore before the bend angle θ is fully altered. The bend angle θ may be reduced to relieve internal stresses within the BHA 20 and reduce the risk of down-hole failure. In some exemplary embodiments, the adjustment mechanism 110 (FIG. 4) may be employed to adjust the bend angle θ by operating electric motor 124 (FIG. 4) as described above. In some embodiments, the galvanic corrosion system 330 (FIG. 16A) and/or energy delivery system 502 may be employed to induce a failure in the support member 120 to thereby adjust bend angle θ. In some exemplary embodiments, the support member 120 may be induced to corrode in a drilling fluid such as drilling mud 36 (FIG. 1) and/or a chemical solution "C" conveyed through the drill string 18 to commence rotation of the drill bit 14 and drilling of the branch wellbore 604. In some embodiments, the bend angle θ may be altered by inducing failure of the support member 120 by providing an electric current to the support member 120 to accelerate galvanic corrosion of the support member 120. The bend angle θ may be altered down-hole, with the drill bit 14 extending into or through the window 608, using any of the methods and mechanisms described above.

In some exemplary embodiments, the adjustment to the bend angle θ may be verified, e.g., by querying a measurement mechanism 138, 148 (FIGS. 5 and 6), and the branch wellbore 604 (FIG. 32C) may be drilled. The drill bit 14 may be turned relative to the drill string 18 by employing power unit 50 (FIG. 2), and the branch wellbore 604. The branch wellbore 604 extends laterally from the main wellbore 602. It will be appreciated that in some embodiments, the main wellbore 602 may not extend to a surface location "S" (FIG. 1), but may branch from another wellbore (not shown).

In one aspect, the present disclosure is directed to an adjustable drill string housing including an annular member, an adjustment mechanism and a measurement mechanism. The annular member has an upper end and a lower end, and the annular member defines an upper longitudinal axis extending through the upper end and a lower longitudinal axis extending through the lower end. A bend angle is defined between the upper and lower longitudinal axes. The adjustment mechanism is operable to deform the annular member between a first operational configuration wherein the bend angle defines a first bend angle and a second operational configuration wherein the bend angle defines a second bend angle different from the first bend angle. The measurement mechanism is operable to determine the bend angle of the annular member. The measurement mechanism includes a feedback device supported between the upper and lower ends of the annular member that is operable to measure a characteristic of the annular member and to provide a signal from which the bend angle is determinable.

In one or more exemplary embodiments, the feedback device is supported between upper and lower flanges extending laterally from the annular member, and the feedback device is operable to measure a linear distance between the flanges from which the bend angle is determinable. In some embodiments, the feedback device includes at least one of a potentiometer and a linear variable differential transformer.

In some exemplary embodiments, the measurement mechanism further includes a reference beam extending from the annular member in general alignment with one of the upper and lower longitudinal axes, and wherein the feedback device is supported between the reference beam and a surface of the annular member and operable to measure a distance between the reference beam and the surface of the annular member from which the bend angle is determinable. In one or more exemplary embodiments, the reference beam is disposed within an internal passageway of the annular member and the surface of the annular member is an interior surface of the annular member. In some exemplary embodiments, the adjustable drill string housing further includes a controller operable to provide instructions to the adjustment mechanism, and wherein measurement mechanism is communicatively coupled to the controller.

In another aspect, the disclosure is directed to a method of operating an adjustable drill string housing. The method includes (a) providing an annular member defining a bend angle therein about a bend axis, the bend angle defined between upper and lower longitudinal axes extending through respective upper and lower ends of the annular member, (b) deploying the annular member into a wellbore in a first operational configuration wherein the bend angle defines a first bend angle, (c) inducing, with the annular member in the wellbore, the annular member to move to a second operational configuration in the wellbore wherein the bend angle defines a second bend angle different from the first bend angle, (d) measuring, with the annular member in the wellbore, a characteristic of the annular member with a feedback device supported on the annular member, and (e) determining the bend angle from a signal provided by the feedback device from measuring the characteristic of the annular member.

In some exemplary embodiments, measuring the characteristic of the annular member includes measuring a distance between upper and lower flanges extending laterally from the annular member. In some exemplary embodiments, inducing the annular member to move to the second operational configuration comprises inducing a change in an internal stress of a support member extending between the upper and lower flanges. In one or more exemplary embodiments, measuring the characteristic of the annular member includes measuring a distance between a reference beam extending from the annular member in general alignment with one of the upper and lower longitudinal axes and a surface of the annular member.

In one or more exemplary embodiments, the method further includes communicating the signal provided by the feedback device to a surface location. In some exemplary embodiments, the method further includes communicating the signal provided by the feedback device to a controller operable to induce change in the bend angle based on receiving the signal. In some embodiments, deploying the annular member into the wellbore includes conveying the annular member into the wellbore on a drill string, and the method further includes drilling a first portion of the wellbore with the drill string with the annular member in the first operational configuration and drilling a second portion of the wellbore with the drill string having the annular member in the second operational configuration.

In another aspect, the present disclosure is directed to an adjustable drill string housing including an annular member, an adjustment mechanism and a measurement mechanism. The annular member has an upper end and a lower end, and the annular member defines an upper longitudinal axis extending through the upper end and a lower longitudinal axis extending through the lower end. A bend angle is defined between the upper and lower longitudinal axes. The adjustment mechanism is operable to deform the annular member between a first operational configuration wherein the bend angle defines a first bend angle and a second operational configuration wherein the bend angle defines a second bend angle different from the first bend angle. The measurement mechanism is operable to determine the bend angle of the annular member and includes a feedback device supported by the annular member and operable to measure a distance that changes corresponding to changes in the bend angle.

In some exemplary embodiments, the distance that changes corresponding to changes in the bend angle is a distance between upper and lower flanges extending laterally from the annular member. In some embodiments, the adjustment mechanism is operable to change an internal stress in a support member extending between the upper and lower flanges to thereby deform the annular member between the first and second operational configurations, and the feedback device is operable to measure a length of the support member.

In one or more exemplary embodiments, the measurement mechanism further includes a substantially rigid reference beam extending from the annular member in general alignment with one of the upper and lower longitudinal axes, and the distance that changes corresponding to changes in the bend angle is a distance between the reference beam and a surface of the annular member. In some embodiments, the substantially rigid reference beam is supported within an internal passageway of the annular member and the surface of the annular member is an interior surface of the annular member.

In some exemplary embodiments, the annular member is constructed monolithically of a single continuous piece of material. In some other exemplary embodiments, the annular member is constructed of two or more bodies coupled to one another by a coupling mechanism. In some embodiments the coupling mechanism is a threaded connector, and in some embodiments, the coupling mechanism includes a weld between the two or more bodies.

Moreover, any of the methods described herein may be embodied within a system including electronic processing circuitry to implement any of the methods, or a in a computer-program product including instructions which, when executed by at least one processor, causes the processor to perform any of the methods described herein.

The Abstract of the disclosure is solely for providing the United States Patent and Trademark Office and the public at large with a way by which to determine quickly from a cursory reading the nature and gist of technical disclosure, and it represents solely one or more embodiments.

While various embodiments have been illustrated in detail, the disclosure is not limited to the embodiments shown. Modifications and adaptations of the above embodiments may occur to those skilled in the art. Such modifications and adaptations are in the spirit and scope of the disclosure.

What is claimed is:

1. An adjustable drill string housing, comprising: an annular member having an upper end and a lower end, the annular member defining an upper longitudinal axis extending through the upper end and a lower longitudinal axis extending through the lower end, wherein a bend angle is defined about a bend axis extending through an intersection between the upper and lower longitudinal axes; an adjustment mechanism operable to deform the annular member between a first operational configuration wherein the bend angle defines a first bend angle and a second operational configuration wherein the bend angle defines a second bend angle different from the first bend angle; and a measurement mechanism for determining the bend angle of the annular member, the measurement mechanism comprising a reference member supported in a fixed relation to a first one of the upper end and lower ends of the annular member at a first end of the reference member and longitudinally overhanging the bend axis such that a second end of the reference member is in a movable relation to the other one of the upper and lower ends of the annular member, and a feedback device supported by the other one of the upper and lower ends of the annular member, the feedback device operable to measure a distance related to the reference member and to thereby provide a signal from which the bend angle is determinable.

2. The adjustable drill string housing of claim 1, wherein the feedback device is supported between upper and lower flanges extending from the annular member, and wherein the feedback device is operable to measure a linear distance between the upper and lower flanges from which the bend angle is determinable.

3. The adjustable drill string housing of claim 2, wherein the feedback device comprises at least one of a potentiometer and a linear variable differential transformer.

4. The adjustable drill string housing of claim 1, wherein the reference member further comprises a substantially rigid reference beam extending from the first one of the upper end and lower ends of the annular member in a fixed general alignment with one of the upper and lower longitudinal axes, and wherein the feedback device is supported between the substantially rigid reference beam and a surface of the other one of the upper and lower ends of the annular member and operable to measure a distance between the substantially rigid reference beam and the surface from which the bend angle is determinable.

5. The adjustable drill string housing of claim 4, wherein the substantially rigid reference beam is disposed within an internal passageway of the annular member and the surface of the other one of the upper and lower ends of the annular member is an interior surface of the annular member.

6. The adjustable drill string housing of claim 1, further comprising a controller operable to provide instructions to the adjustment mechanism, and wherein measurement mechanism is communicatively coupled to the controller.

7. A method of operating an adjustable drill string housing, comprising:
providing an annular member defining a bend angle therein about a bend axis, the bend angle defined between upper and lower longitudinal axes extending through respective upper and lower ends of the annular member;
providing a reference member supported in a fixed relation to a first one of the upper end and lower ends of the annular member at a first end thereof of the reference member and overhanging the bend axis to extend to the other one of the upper end and the lower end such that a second end of the reference member is in a movable relation to and establishes a variable distance relationship with the other one of the upper end and lower ends corresponding to the bend angle;
deploying the annular member into a wellbore in a first operational configuration wherein the bend angle defines a first bend angle;
inducing, with the annular member in the wellbore, the annular member to move to a second operational configuration in the wellbore wherein the bend angle defines a second bend angle different from the first bend angle;
measuring, with the annular member in the wellbore, a characteristic of the annular member indicative of a distance defined between the reference member and the other one of the upper end and the lower end with a feedback device supported on the annular member; and
determining the bend angle from a signal provided by the feedback device from measuring the characteristic of the annular member.

8. The method of claim 7, wherein measuring the characteristic of the annular member comprises measuring a distance between upper and lower flanges extending laterally from the annular member.

9. The method of claim 8, wherein inducing the annular ember to move to the second operational configuration comprises inducing a change in an internal stress of a support member extending between the upper and lower flanges.

10. The method of claim 7, wherein measuring the characteristic of the annular member comprises measuring a distance between a reference beam extending from the first one of the upper end and lower ends of the annular member in general alignment with one of the upper and lower longitudinal axes and a surface of the other one of the upper and lower ends of the annular member.

11. The method of claim 7, further comprising communicating the signal provided by the feedback device to a surface location.

12. The method of claim 7, further comprising communicating the signal provided by the feedback device to a controller operable to induce change in the bend angle based on receiving the signal.

13. The method of claim 7, wherein deploying the annular member into the wellbore comprises conveying the annular member into the wellbore on a drill string, and wherein the method further comprises drilling a first portion of the wellbore with the drill string with the annular member in the first operational configuration and drilling a second portion of the wellbore with the drill string having the annular member in the second operational configuration.

14. An adjustable drill string housing, comprising:
an annular member having an upper end and a lower end, the annular member defining an upper longitudinal axis extending through the upper end and a lower longitudinal axis extending through the lower end, wherein a bend angle is defined between the upper and lower longitudinal axes;
an adjustment mechanism operable to deform the annular member between a first operational configuration wherein the bend angle defines a first bend angle and a second operational configuration wherein the bend angle defines a second bend angle different from the first bend angle; and
a measurement mechanism for determining the bend angle of the annular member, the measurement mechanism comprising a reference member supported in a fixed relation to a first one of the upper end and lower ends of the annular member at a first end of the reference member and overhanging the bend axis such that a second end of the reference member is in a movable relation to the other one of the upper end and the lower end and to establish a variable distance between the other one of the upper end and lower ends that changes corresponding to changes in the bend angle, and a feedback device supported by the annular member and operable to measure the distance that changes corresponding to changes in the bend angle.

15. The adjustable drill string housing of claim 14, wherein the distance that changes corresponding to changes in the bend angle is a distance between upper and lower flanges extending laterally from the annular member.

16. The adjustable drill string housing of claim 15, wherein the adjustment mechanism is operable to change an internal stress in a support member extending between the upper and lower flanges to thereby deform the annular member between the first and second operational configurations, and wherein the feedback device is operable to measure a length of the support member.

17. The adjustable drill string housing of claim 14, wherein the measurement mechanism further comprises a substantially rigid reference beam extending from the first one of the upper end and lower end of the annular member in general alignment with a corresponding one of the upper and lower longitudinal axes, and wherein the distance that changes corresponding to changes in the bend angle is a distance between the substantially rigid reference beam and a surface of the annular member.

18. The adjustable drill string housing of claim 17, wherein the substantially rigid reference beam is supported within an internal passageway of the annular member and the surface of the annular member is an interior surface of the annular member.

19. The adjustable drill string housing of claim 14, wherein the annular member is constructed monolithically of a single continuous piece of material.

* * * * *

UNITED STATES PATENT AND TRADEMARK OFFICE
CERTIFICATE OF CORRECTION

| | | |
|---|---|---|
| PATENT NO. | : 10,563,498 B2 | Page 1 of 1 |
| APPLICATION NO. | : 15/551890 | |
| DATED | : February 18, 2020 | |
| INVENTOR(S) | : Gustav Lange and Kennedy John Kirkhope | |

It is certified that error appears in the above-identified patent and that said Letters Patent is hereby corrected as shown below:

In the Claims

Column 35, Line 61 change "ember" to -- member --

Signed and Sealed this
Twelfth Day of May, 2020

Andrei Iancu
*Director of the United States Patent and Trademark Office*